(12) United States Patent
Matsumura et al.

(10) Patent No.: US 7,421,080 B2
(45) Date of Patent: Sep. 2, 2008

(54) METHOD OF RECONSTRUCTING A SECRET, SHARED SECRET RECONSTRUCTION APPARATUS, AND SECRET RECONSTRUCTION SYSTEM

(75) Inventors: Yasuko Matsumura, Tokyo (JP); Satoshi Nakagawa, Tokyo (JP); Kohei Endo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 708 days.

(21) Appl. No.: 10/798,578

(22) Filed: Mar. 12, 2004

(65) Prior Publication Data

US 2004/0179686 A1 Sep. 16, 2004

(30) Foreign Application Priority Data

Mar. 13, 2003 (JP) ............................. 2003-067834

(51) Int. Cl.
*H04L 9/00* (2006.01)
(52) U.S. Cl. ..................... 380/277; 380/42; 380/283
(58) Field of Classification Search .................. 380/277
See application file for complete search history.

(56) References Cited

U.S. PATENT DOCUMENTS

| | | | | |
|---|---|---|---|---|
| 5,764,767 | A * | 6/1998 | Beimel et al. ................ | 713/180 |
| 6,436,154 | B1 * | 8/2002 | Halverson et al. ........... | 23/302 T |
| 6,810,122 | B1 * | 10/2004 | Miyazaki et al. ............. | 380/30 |
| 2002/0012433 | A1 * | 1/2002 | Haverinen et al. .......... | 380/247 |
| 2003/0046202 | A1 * | 3/2003 | Knapp ........................ | 705/35 |
| 2003/0088782 | A1 * | 5/2003 | Forrest ....................... | 713/186 |
| 2003/0221131 | A1 * | 11/2003 | Mori et al. .................. | 713/202 |
| 2006/0023887 | A1 * | 2/2006 | Agrawal et al. ............. | 380/277 |

FOREIGN PATENT DOCUMENTS

WO PCT/US99/31053 * 12/1999

OTHER PUBLICATIONS

Zheng et al., "Reusing shares in secret sharing schemes," The Computer Journal. vol. 37, issue 3. 1994. pp. 1-14.*
Wylie, Jay J. et al., "Survivable Information Storage Systems," IEEE Computer, Aug. 2000. http://citeseer.ist.psu.edu/wylie00survivable.html. □□.*
"Gendai Ango (Modern Codes)" pp. 209-238, Tatsuaki Okamoto et al., published by Sangyo Tosho on Jun. 30, 1997.

* cited by examiner

*Primary Examiner*—T. B. Truong
*Assistant Examiner*—Randal D Moran
(74) *Attorney, Agent, or Firm*—Venable LLP; Michael A. Sartori; Catherine M. Voorhees

(57) ABSTRACT

Secret information is shared by a group of members by giving each member a first share of the information. To reconstruct the secret information, a subgroup consisting of some or all of the members generate second shares from their first shares, and distribute the second shares to the other members of the subgroup. Each member of the subgroup performs an operation on the second shares it receives and one second share it generated itself to obtain an intermediate result. The intermediate results are transmitted to one or more members of the subgroup, or to a central facility, where the original secret information is obtained from a further operation performed on the intermediate results. The original secret information can thereby be obtained without compromising the secrecy of the first shares, and without forcing the members to reveal their identities.

22 Claims, 21 Drawing Sheets

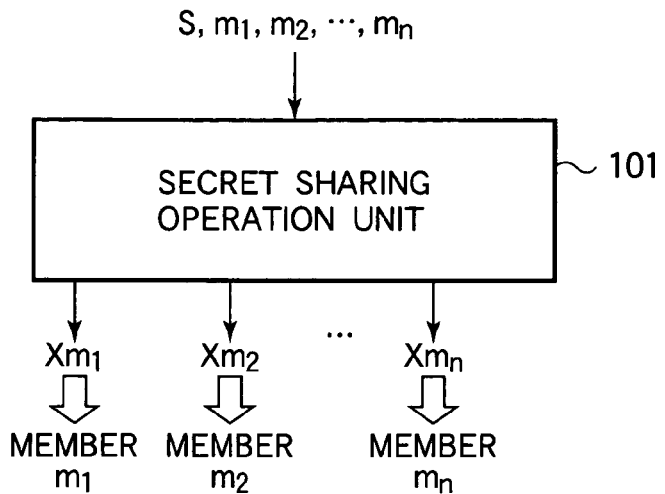
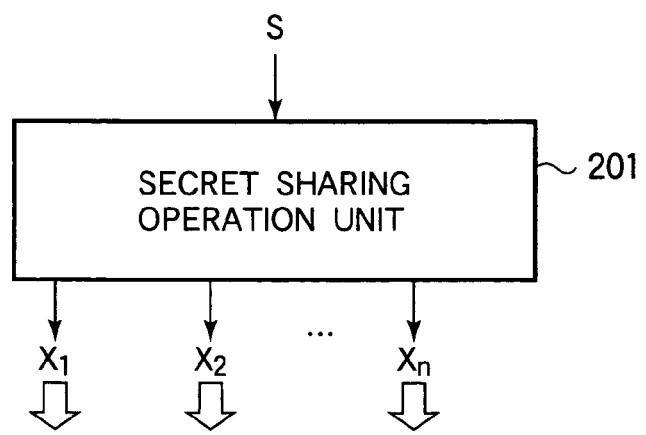
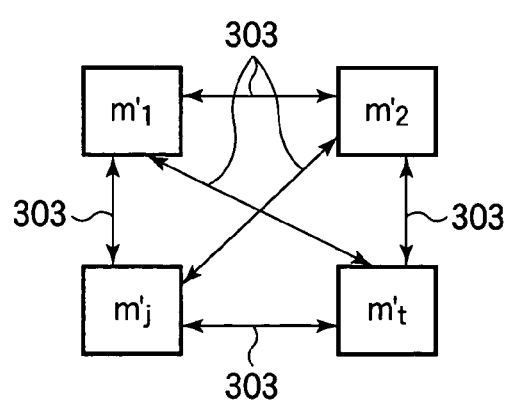

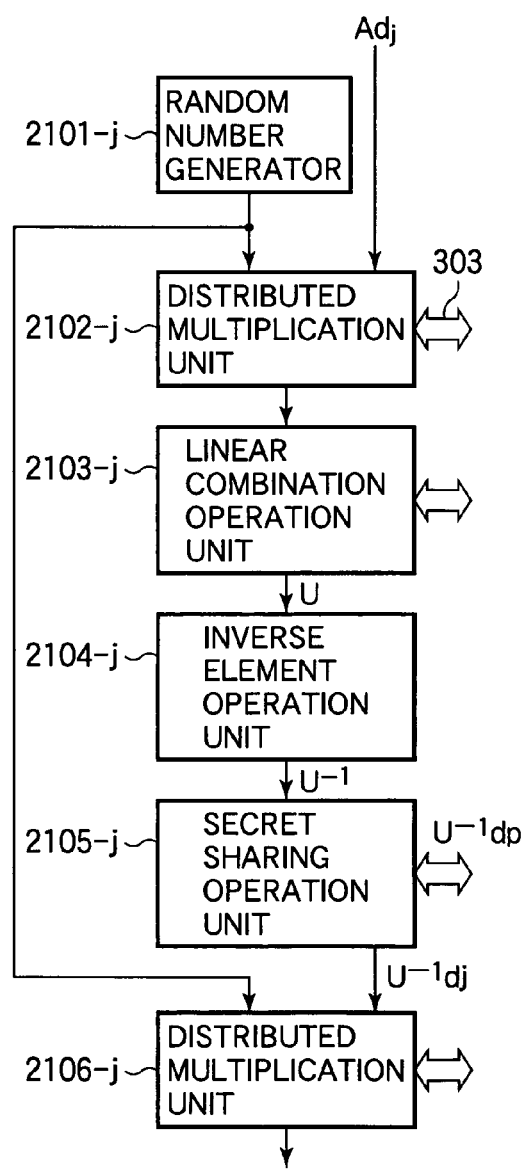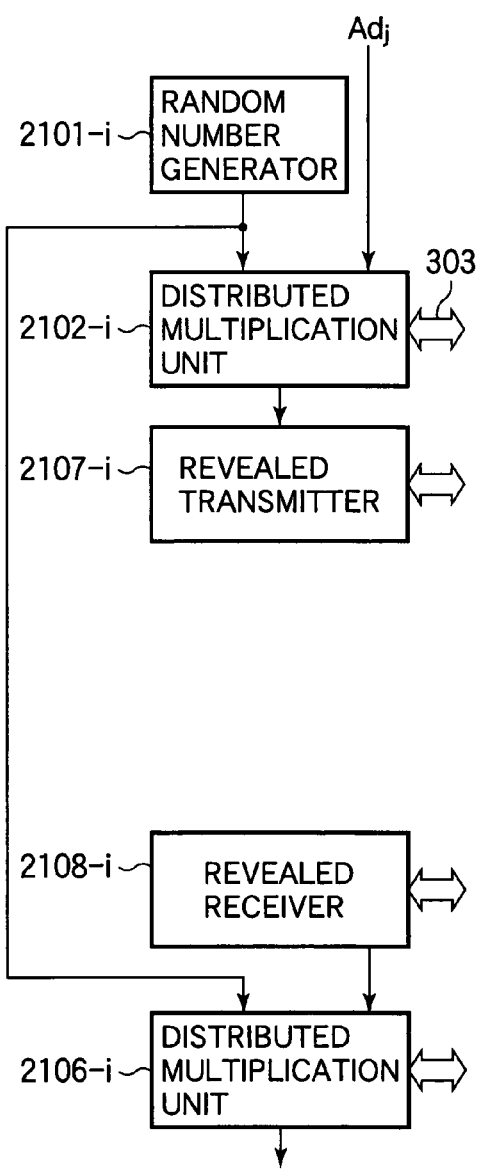

US 7,421,080 B2

METHOD OF RECONSTRUCTING A SECRET, SHARED SECRET RECONSTRUCTION APPARATUS, AND SECRET RECONSTRUCTION SYSTEM

BACKGROUND OF THE INVENTION

1. Field of the Invention

The present invention relates to a method of reconstructing secret information shared by a group of members, a shared secret reconstruction apparatus that can be used to carry out this method, and a secret reconstruction system that includes the shared secret reconstruction apparatus.

2. Description of the Related Art

When important secret information, such as a secret key used for encrypting information to protect its security or secret information used for authentication, is stored, there is a risk that the secret information may be lost, destroyed, or stolen. One way of preventing the loss or destruction of secret information is to make and store copies of the information, but copying the secret information increases the risk that it may be stolen. Secret sharing provides a solution to this problem. In a secret sharing scheme, a secret sharing apparatus (a processor) encrypts the original secret information and thereby generates a plurality of secret shares, which ate distributed to the participants in the secret sharing scheme. Each participant is a computing device comprising a processor and memory. When the secret information is needed, a secret reconstruction apparatus (a processor) collects shares from a necessary number of members and reconstructs (recovers) the secret information from the collected shares.

One secret sharing scheme, referred to as Shamir's method, is the (k, n) threshold secret sharing scheme described in for example, *Gendai Ango* (Modern Codes) by Okamoto et al., published by Sangyo Tosho. In this scheme, the secret information is encrypted as n shares, where n is an integer equal to or greater than two, in such a way that the original secret information can be recovered from any k shares, where k is an integer equal to or less than n, but nothing can be found out about the original secret information from any set of fewer than k shares.

This scheme makes use of polynomial interpolation. More specifically, the secret information is shared by using polynomials $f(x)$ of degree $k-1$ having the form shown in the equation (1) below, in which S is the original secret information and $R_1, R_2, \ldots, R_{k-1}$ are random numbers determined by the distributor.

$$f(x) = S + R_1 x + R_2 x^2 + \ldots + R_{k-1} x^{k-1} \quad (1)$$

If the n members to whom shares will be distributed have member IDs $m_1, m_2, \ldots, m_n$, the share $Xm_j$ ($j=1, 2, \ldots, n$) for the member with ID $m_j$ (hereinafter, member ID_$m_j$) can be calculated from the above equation (1) as shown in the following equation (2).

$$Xm_j = f(m_j) = S + R_1 m_j + R_2 (m_j)^2 + \ldots + R_{k-1}(m_j)^{k-1} \quad (2)$$

FIG. 1 illustrates the operation of a secret sharing operation unit 101 that carries out a secret sharing operation based on the (k, n) threshold secret sharing scheme. As shown in FIG. 1, the secret sharing operation unit 101 receives the original secret information S and the member IDs $m_j$ ($j=1, 2, \ldots, n$) of all members to whom shares of the secret information S will be distributed, generates a polynomial $f(x)$ equivalent to the above equation (1) on the basis of the secret information S, and then generates and outputs the shares $Xm_j$ corresponding to the member IDs $m_j$ by using the above equation (2). The output shares $Xm_j$ are secretly distributed to the members having the corresponding member IDs.

When the original secret information S is reconstructed from the shares distributed to the members, any t ($k \leq t \leq n$) members of the n members are collected, their member IDs $m'_1, m'_2, \ldots, m'_t$ and shares $Xm'_1, Xm'_2, \ldots, Xm'_t$ are gathered, and the secret information S is computed using the following equations (3) and (4).

$$S = rm'_1 Xm'_1 + rm'_2 Xm'_2 + \ldots + rm'_t Xm'_t \quad (3)$$

$$= \sum_{j=1}^{t} rm'_j Xm'_j$$

$$rm'_j = (m'_1 \times m'_2 \times \ldots \times m'_t / m'_j) / ((m'_1 - m'_j) \times (m'_2 - m'_j) \times \ldots \times \quad (4)$$

$$(m'_{j-1} - m'_j) \times (m'_{j+1} - m'_j) \times \ldots \times (m'_t - m'_j))$$

$$= \prod_{\substack{i=1 \\ i \neq j}}^{t} m'_i / (m'_i - m'_j)$$

When the original secret information S is reconstructed by the method described above, however, the secret information S cannot be computed without revealing the member IDs $m'_1, m'_2, \ldots, m'_t$ and shares $Xm'_1, Xm'_2, \ldots, Xm'_t$ of the collected members. Even if there is a trustworthy central secret reconstruction facility that carries out the reconstruction of secret information, the secret information S cannot be computed without providing that central facility with the collected member IDs $m'_1, m'_2, \ldots, m'_t$ and shares $Xm'_1, Xm'_2, \ldots, Xm'_t$. That is, the conventional method is unable to compute the secret information S while the collected members remain anonymous.

If there is no such central secret reconstruction facility, the secret information S cannot be obtained unless the shares $Xm'_1, Xm'_2, \ldots, Xm'_t$ held by the collected members are revealed to a possibly non-trustworthy party. That is, once the original secret information is reconstructed, the shares distributed to the members have been compromised and cannot be reused. It is then necessary to repeat the process of sharing the secret information.

SUMMARY OF THE INVENTION

An object of the present invention is to provide a method of reconstructing secret information from shares held by a group of members, in which the members can remain anonymous and no member has to reveal the shares it holds.

Another object of the invention is to provide a shared secret reconstruction apparatus with which the invented method can be carried out.

Still another object is to provide a secret reconstruction system including the above shared secret reconstruction apparatus.

In the invented method of reconstructing secret information, a secret sharing scheme is used to generate n first shares from the secret information ($2 \leq n$) in such a way that, after the first shares are distributed to a group having n members, the original secret information can be reconstructed by a collection of any t members ($2 \leq t \leq n$). Each of the t members uses the secret sharing scheme to generate t second shares from its first share, and distributes the t second shares to the t collected members. Each of the t collected members then performs part of a distributed computation by using a second share it generated itself and $t-1$ second shares received from the other collected members to generate an intermediate result. The original secret information is reconstructed from the t intermediate results generated by the t collected members.

The original secret information can be reconstructed in this way without forcing the members to reveal their first shares or their member IDs.

BRIEF DESCRIPTION OF THE DRAWINGS

In the attached drawings:

FIG. 1 illustrates the basic structure of a (k, n) threshold secret sharing scheme;

FIG. 2 illustrates a structure for carrying out the secret sharing scheme in a first embodiment of the invention;

FIG. 3 illustrates members and secure channels in the first embodiment;

FIGS. 24A and 24B constitute a block diagram illustrating the structure of a distributed inverse element calculation unit used in a secret reconstruction method according to a fifth embodiment of the invention;

DETAILED DESCRIPTION OF THE INVENTION

Figure 4:
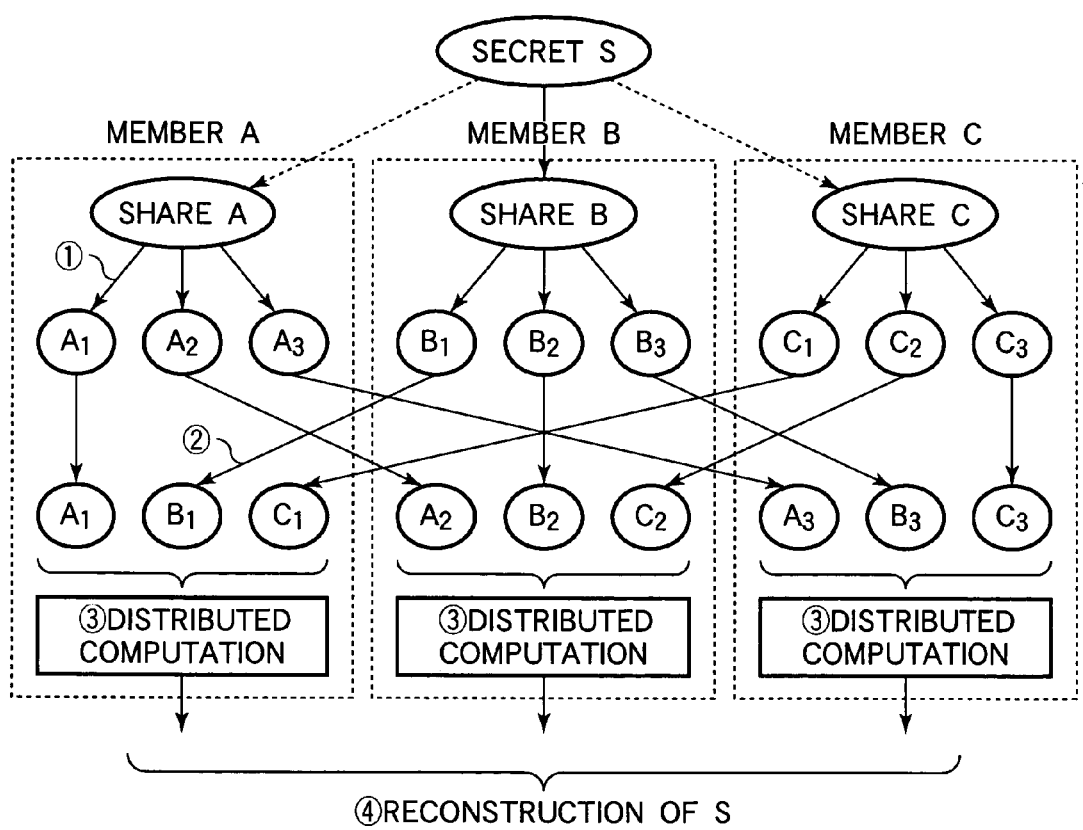
FIG. 4 is a drawing depicting a secret reconstruction method according to the first embodiment of the invention.

Embodiments of the invention will now be described with reference to the attached drawings, in which like elements are indicated by like reference characters.

First Embodiment

General Description

In the first embodiment, secret information S is reconstructed from shares held by a plurality of members by executing a multiparty protocol in which the members do not reveal their shares. The reconstruction process is carried out by a secret reconstruction system comprising a plurality of distributed secret reconstruction operation units operated by the members and a secret reconstruction operation unit operated by one or more of the members or by a central facility. The members are typically computing devices with computing and memory facilities.

Multiparty Protocol

A general description of a multiparty protocol will now be given. A multiparty protocol, also referred to (in the reference cited above, for example) as a distributed computation, is a scheme in which a collection of members cooperatively compute a mathematical function without revealing the values they input to the function. There are two main types of multiparty protocols. In the first type, any two of the collected members have a secure channel over which they can communicate without revealing the content of their communication to any of the other members. In the second type, there is also an oblivious transfer channel. In the reference cited above, the second type of multiparty protocol is carried out by binary operations (NOT and AND). Further details on the second type of multiparty protocol will be given in the description of the fourth embodiment.

A multiparty protocol of the first type in which finite field elements are added and multiplied will be described here. It will be assumed that the multiparty protocol is executed by t members holding member IDs $m_j$ (j=1, 2, ..., t) and respective secret information $Xm_j$ (j=1, 2, ..., t), to compute the value Y of the mathematical function f in the following equation (5).

$$Y = f(Xm_1, Xm_2, \ldots, Xm_t) \qquad (5)$$

In this computation, the values of the member IDs $m_j$ and secret information $Xm_j$ (j=1, 2, ..., t) are selected from a finite (Galois) field GF(q), where q is a prime number or a power of a prime number. The computation of the mathematical function f in the above equation (5) is also carried out in the finite field GF(q), so the function value Y is an element in the finite field GF(q).

In the multiparty protocol, to compute the function value Y without revealing the secret information $Xm_j$ (j=1, 2, ..., t) held by each member, shares are generated from the secret information $Xm_j$ (j=1, 2, ..., t) by using a (k, t) threshold secret sharing scheme, and these shares are distributed to the members. If the member having member ID $m_j$ holds the secret information $Xm_j$, the member generates polynomials $fm_j(x)$ of degree k−1 (k≦t) having the form shown in the following equation (6):

$$fm_j(x) = Xm_j + Rm_{j,1}x + Rm_{j,2}x^2 + \ldots + Rm_{j,k-1}x^{k-1} \qquad (6)$$

where $Rm_{j,1}$, $Rm_{j,2}$, ... $Rm_{j,k-1}$ are k−1 random elements selected from the finite field GF(q).

When shares are generated from the secret information $Xm_j$ by using the secret sharing scheme, the share $Xm_{j,p}$ that will be distributed to the member having member ID $m_p$ can be calculated using the above equation (6), as shown in the following equation (7).

$$Xm_{j,p} = fm_j(m_p) = Xm_j + Rm_{j,1}(m_p) + Rm_{j,2}(m_p)^2 + \ldots + Rm_{j,k-1}(m_p)^{k-1} \quad (7)$$

This share $Xm_{j,p}$ is distributed to the member having member ID $m_p$ through a secure channel so that the share $Xm_{j,p}$ is kept secret from the other members.

The additions and multiplications in the above equations (6) and (7) are carried out in the finite field GF(q). Accordingly, the resulting shares $Xm_{j,p}$ (j=1, 2, ..., t; p=1, 2, ..., t) are also values in the finite field GF(q). In the descriptions below, all computations will be carried out in the finite field GF(q) unless otherwise stated.

As a result of the process described above, each member holds a share $Xm_{j,p}$ of the secret information $Xm_j$. After all t members have carried out this process, the member having member ID $m_j$ holds t shares ($Xm_{1,j}$, $Xm_{2,j}$, ..., $Xm_{t,j}$) including shares distributed by the other members and one share of its own secret information.

Shared addition in the multiparty protocol will now be described. As an example, it will be assumed that the above equation (5) has a form in which two inputs $Xm_A$ and $Xm_B$ are added, as in the following equation (8).

$$Y = f(Xm_1, Xm_2, \ldots, Xm_t) = Xm_A + Xm_B \quad (8)$$

In this multiparty protocol, each member obtains a share $Ym_j$ (j=1, 2, ..., t) of the computational result Y by adding its two shares of the inputs $Xm_A$ and $Xm_B$. More specifically, since the member having member ID $m_j$ has shares $Xm_{A,j}$ and $Xm_{B,j}$ of the inputs $Xm_A$ and $Xm_B$, this member obtains a share $Ym_j$ of the computational result Y by the following equation (9).

$$Ym_j = Xm_{A,j} + Xm_{B,j} \quad (9)$$

Distributed multiplication in the multiparty protocol will be described next. It will now be assumed, for the sake of an example, that the mathematical function given by the above equation (5) has a form in which two inputs $Xm_A$ and $Xm_B$ are multiplied as in the following equation (10).

$$Y = f(Xm_1, Xm_2, \ldots, Xm_t) = Xm_A \times Xm_B \quad (10)$$

In this case, in the multiparty protocol, each member carries out the following steps S101 to S103. In the first step S101, the member multiplies its two shares of the inputs $Xm_A$ and $Xm_B$ together. In the following step S102, shares are generated from the multiplication result and are distributed to the members. In the last step S103, each member reconstructs a share $Ym_j$ (j=1, 2, ..., t) of the computational result Y from the received shares. In a distributed multiplication in the first type of multiparty protocol, it is necessary for the threshold k of the secret sharing scheme to satisfy the condition given by the following equation (11).

$$k \leq (t+1)/2 \quad (11)$$

The condition in the above equation (11) is computed with normal integers and fractions in the real number field, not in the finite field GF(q). If the member having member ID $m_j$ holds shares $Xm_{A,j}$ and $Xm_{B,j}$ of the respective inputs $Xm_A$ and $Xm_B$, first the calculation in the following equation (12) is carried out to obtain an intermediate result $Y'm_j$, which corresponds to the above step S101.

$$Y'm_j = Xm_{A,j} \times Xm_{B,j} \quad (12)$$

Next, this intermediate result $Y'm_j$ is shared by using a polynomial as shown in the following equation (13), which corresponds to the above step S102:

$$f'm_j(x) = Y'm_j + R'm_{j,1}x + R'm_{j,2}x^2 + \ldots + R'm_{j,k-1}x^{k-1} \quad (13)$$

where, $R'm_{j,1}$, $R'm_{j,2}$, ..., $R'm_{j,k-1}$ are k−1 random elements selected from the finite field GF(q).

The share $Y'm_{j,p}$ of the intermediate result $Y'm_j$, which is distributed to the member having member ID $m_p$ (p=1, 2, ..., t), is calculated using the above equation (13) as shown in the following equation (14).

$$X'm_{j,p} = f'm_j(m_p) = Y'm_j + R'm_{j,1}(m_p) + R'm_{j,2}(m_p)^2 + \ldots + R'm_{j,k-1}(m_p)^{k-1} \quad (14)$$

This share is distributed to the member having member ID $m_p$ (p=1, 2, ..., t) through a secure channel and remains secret from the other members. As a result of the operations in the above equation (14), the member having member ID $m_j$ receives the t shares $Y'm_{1,j}$, $Y'm_{2,j}$, ..., $Y'm_{t,j}$.

The member having member ID $m_j$ computes a share $Ym_j$ of the multiplication result Y from these shares $Y'm_{1,j}$, $Y'm_{2,j}$, ..., $Y'm_{t,j}$ as shown in the following equations (15) and (16).

$$Ym_j = rm_1 Y'm_{1,j} + rm_2 Y'm_{2,j} + \ldots + rm_n Y'm_{n,j} \quad (15)$$

$$= \sum_{i=1}^{t} rm_i Y'm_{i,j}$$

$$rm_j = (m_1 \times m_2 \times \ldots \times m_t / m_j) / ((m_1 - m_j) \times (m_2 - m_j) \times \ldots \times \quad (16)$$

$$(m_{j-1} - m_j) \times (m_{j+1} - m_j) \times \ldots \times (m_t - m_j))$$

$$= \prod_{\substack{i=1 \\ i \neq j}}^{t} m_i / (m_i - m_j)$$

This computation, which corresponds to the above step S103, is similar to the computation for reconstructing the secret information described in equation (3).

As described above, in a multiparty protocol, any two of the members have a secure channel over which they can communicate without revealing the content of their communication to any of the other members. The members generate shares of their secret information $Xm_j$, use the secure channels to distribute the shares to other members, and then use the shares they receive from other members (and shares they retain themselves) to calculate shares of the value of a mathematical function of the secret information $Xm_j$. The value of the function can then be calculated from these without revealing the secret information $Xm_j$.

Structure of the First Embodiment

In the first embodiment, the original secret information S is shared by using a secret sharing scheme with simple addition and subtraction operations instead of the (k, n) threshold secret sharing scheme, and the generated shares are secretly distributed to a group comprising a plurality of members (e.g., devices with computing and memory facilities). The secret sharing scheme is used as shown in FIG. 2, which illustrates the operation of a secret sharing operation unit 201 that executes the secret sharing scheme. The secret sharing operation unit 201 operates differently from the conventional secret sharing operation unit 101, as will be described below. In the following descriptions, the original secret information input to the secret sharing operation unit 201 is denoted S, which is an element in the finite field GF(q), and the number of members holding the distributed shares is denoted n. First, n−1 random elements $X_1, X_2, \ldots, X_{n-1}$ are selected from the finite field GF(q) by the secret sharing operation unit 201. Next, an n-th element $X_n$ of the finite field GF(q) is obtained by the following equation (17).

$$X_n = S - (X_1 + X_2 + \ldots + X_{n-1}) \quad (17)$$

The computation of the above equation (17) is carried out in the finite field GF(q), as are all computations in the descriptions below, unless otherwise stated. The secret sharing operation unit 201 outputs the values $X_1, X_2, \ldots, X_n$ including the value obtained from the above equation (17), and distributes each of the values to a different member as its share of the secret information S. Some of the values $X_1, X_2, \ldots, X_n$ may be equal.

When the original secret information S is shared by using the secret sharing scheme as described above, the secret information S cannot be reconstructed unless all n members holding the distributed shares are collected. The secret information S can then be reconstructed by the following equation (18).

$$S = X_1 + X_2 + \ldots + X_n \quad (18)$$

The secret sharing scheme described above will be referred to below as the 'summation secret sharing scheme'. In the first embodiment, shares that are generated by using the summation secret sharing scheme described above are distributed to members, who hold the distributed shares in secret. When the original secret information S is needed, although it could be reconstructed by the above equation (18), in the secret reconstruction method according to the first embodiment, the secret information S is reconstructed without revealing the shares held in secret by the collected members by using a multiparty protocol.

In the first embodiment, the shares generated from the original secret information S by using the secret sharing scheme described above (using equation (17) above) are secretly distributed to the members of the group as first shares. Assuming that there are n members in the group, the first shares are denoted $X_j$ (j=1, 2, . . . , n).

In the first embodiment, all n members are collected to reconstruct the secret information S. Any two of the members have a secure channel over which they can communicate without revealing the content of their communication to any of the other members. FIG. 3 illustrates secure channels 303 used for communication between the members in the first embodiment. In FIG. 3, the rectangular boxes indicate the collected members, the symbols $m'_1, m'_2, \ldots, m'_j, \ldots, m'_t$ indicate the member IDs, and the bi-directional arrows indicate the secure channels 303 over which any two of the members can communicate without revealing the content of their communication to any of the other members.

The secret reconstruction method according to the first embodiment will be outlined below with reference to FIG. 4. FIG. 4 illustrates a case in which there are three members holding respective shares A, B, and C generated from the original secret information S by using the summation secret sharing scheme. When the original secret information S is reconstructed, the first shares A, B, C held by the members are further shared by using the summation secret sharing scheme to generate second shares from shares A, B, C. More specifically, as indicated by the circled reference numeral 1 in FIG. 4, shares $A_1, A_2, A_3$ are generated from share A, shares $B_1, B_2, B_3$ from share B, and shares $C_1, C_2, C_3$ from share C. Subsequently, as indicated by the circled reference numeral 2, the second shares generated from shares A, B, C are distributed to the other members. Each member receives shares of share A, B, C, i.e., shares $A_1, B_1, C_1$, shares $A_2, B_2, C_2$, or shares $A_3, B_3, C_3$. The member carries out its part of a distributed computation on the basis of these shares and outputs the result as indicated by the circled reference numeral 3. Finally, as indicated by the circled reference numeral 4, the original secret information S is reconstructed by collecting the results of the distributed computations carried out using shares $A_1, B_1, C_1$, shares $A_2, B_2, C_2$, and shares $A_3, B_3, C_3$, instead of using shares A, B, and C directly.

Figure 5:
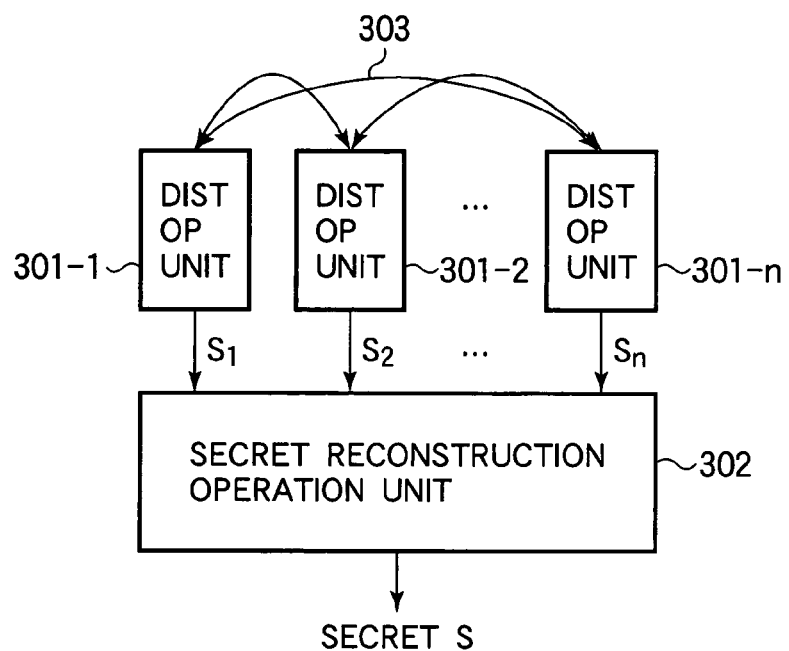
FIG. 5 is a block diagram of a secret reconstruction system for carrying out the secret reconstruction method in the first embodiment.

FIG. 5 is a block diagram illustrating a structure embodying the method of reconstructing secret information according to the first embodiment (a secret reconstruction system according to the first embodiment). The secret reconstruction method according to the first embodiment will be described with reference to FIG. 5. As shown in FIG. 5, each of the n collected members (n devices with computing and memory facilities) has a distributed secret reconstruction operation unit (DIST OP UNIT) 301 (301-1, 301-2, . . . , 301-n), which corresponds to shared secret reconstruction apparatus according to the first embodiment and carries out an operation leading to the reconstruction of the secret information. Reference numeral 301-j (j=1, 2, . . . , n) indicates the distributed secret reconstruction operation unit 301 provided in member j. The distributed secret reconstruction operation unit 301-j (j=1, 2, . . . , n) in member j is connected to the distributed secret reconstruction operation units 301 in the other members through secure channels 303 similar to the ones shown in FIG. 3. The outputs from the distributed secret reconstruction operation units 301-j (j=1, 2, . . . , n) obtained from the members are input as intermediate results to a secret reconstruction operation unit 302.

The secret reconstruction operation unit 302 receives the n intermediate results output from the members' distributed secret reconstruction operation units 301-j (j=1, 2, . . . , n), uses them to reconstruct the secret information, and outputs the reconstructed secret information. If the intermediate results output from the members' distributed secret reconstruction operation units 301-j (j=1, 2, . . . , n) are denoted $S_j$ (j=1, 2, . . . , n), the original secret information S can be obtained from the following equation (19).

$$S = S_1 + S_2 + \ldots + S_n \quad (19)$$

$$= \sum_{j=1}^{n} S_j$$

The computation of the above equation (19) is carried out in the finite field GF(q).

Each of the distributed secret reconstruction operation units 301-j (j=1, 2, . . . , n) is operated by a different member, and the content of the operation is not revealed to the other members. The secret reconstruction operation unit 302 may be operated by a central facility (a processor separate from the members) that is specialized for this operation, or may be operated by one or a plurality of the collected members. It is preferable for the secret reconstruction operation unit 302 to be operated by the member or members who need the secret information S.

Figure 6:
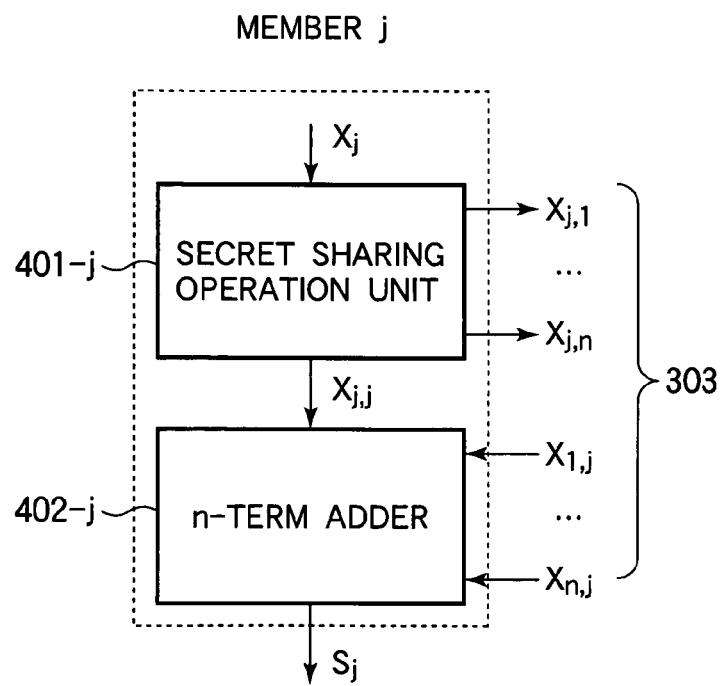
FIG. 6 is a block diagram illustrating the structure of the distributed secret reconstruction operation unit in FIG. 5.

FIG. 6 is a block diagram illustrating the structure of the distributed secret reconstruction operation unit 301-j (j=1, 2, . . . , n) in FIG. 5. The distributed secret reconstruction operation unit 301-j will be described with reference to FIG. 6. As shown in FIG. 6, the distributed secret reconstruction operation unit 301-j comprises a secret sharing operation unit 401-j having one input and n outputs, and an n-term adder 402-j having n inputs and one output. One of the outputs ($x_{j,j}$) from the secret sharing operation unit 401-j is input to the n-term adder 402-j. The output of the n-term adder 402-j becomes the intermediate result output by the distributed secret reconstruction operation unit 301-j.

A share $X_j$ of the original secret information S, which is held by a member j, is input to the secret sharing operation unit 401-j. Second shares are generated from the share $X_j$ input to the secret sharing operation unit 401-j by using the summation secret sharing scheme, and are distributed via the secure channels 303 that communicate with the other members. The shares $X_{j,n}$ of share $X_j$ are obtained by selecting n−1 random elements from the finite field GF(q) as shares $X_{j,1}$, $X_{j,2}$, . . . , $X_{j,n-1}$ and then calculating share $X_{j,n}$ by the following equation (20).

$$X_{j,n} = X_j - (X_{j,1} + X_{j,2} + \ldots + X_{j,n-1}) \quad (20)$$

Among these shares $X_{j,1}$, $X_{j,2}$, . . . , $X_{j,n}$, member j's own share $X_{j,j}$ is output to the n-term adder 402-j and the other shares $X_{j,p}$ (p=1, 2, . . . , n, p≠j) are distributed through the secure channels 303 to the other members.

The n-term adder 402-j thus receives the share $X_{j,j}$ of the share $X_j$ of the original secret information from the secret sharing operation unit 401-j. In addition, the n-term adder 402-j receives the shares $X_{1,j}$, . . . , $X_{j-1,j}$, $X_{j+1,j}$, . . . , $X_{n,j}$ of the shares $X_p$ (p=1, 2, . . . , n, p≠j) of the original secret information S, which are distributed from the other members via the secure channels 303. Using these n second shares $X_{p,j}$ (p=1, 2, . . . , n) of the first shares of the original secret information S, a third share $S_j$ of the original secret information S is computed and output as an intermediate result. It should be noted here that the share $S_j$ which is used when the secret information S is reconstructed differs from the share $X_j$ which is obtained when the secret information S is shared. The n-term adder 402-j carries out the computation shown in the following equation (21) and outputs the share $S_j$ of the secret information S.

$$S_j = X_{1,j} + X_{2,j} + \ldots + X_{n,j} \quad (21)$$

$$= \sum_{p=1}^{n} X_{p,j}$$

Operation of the First Embodiment

Figure 7:
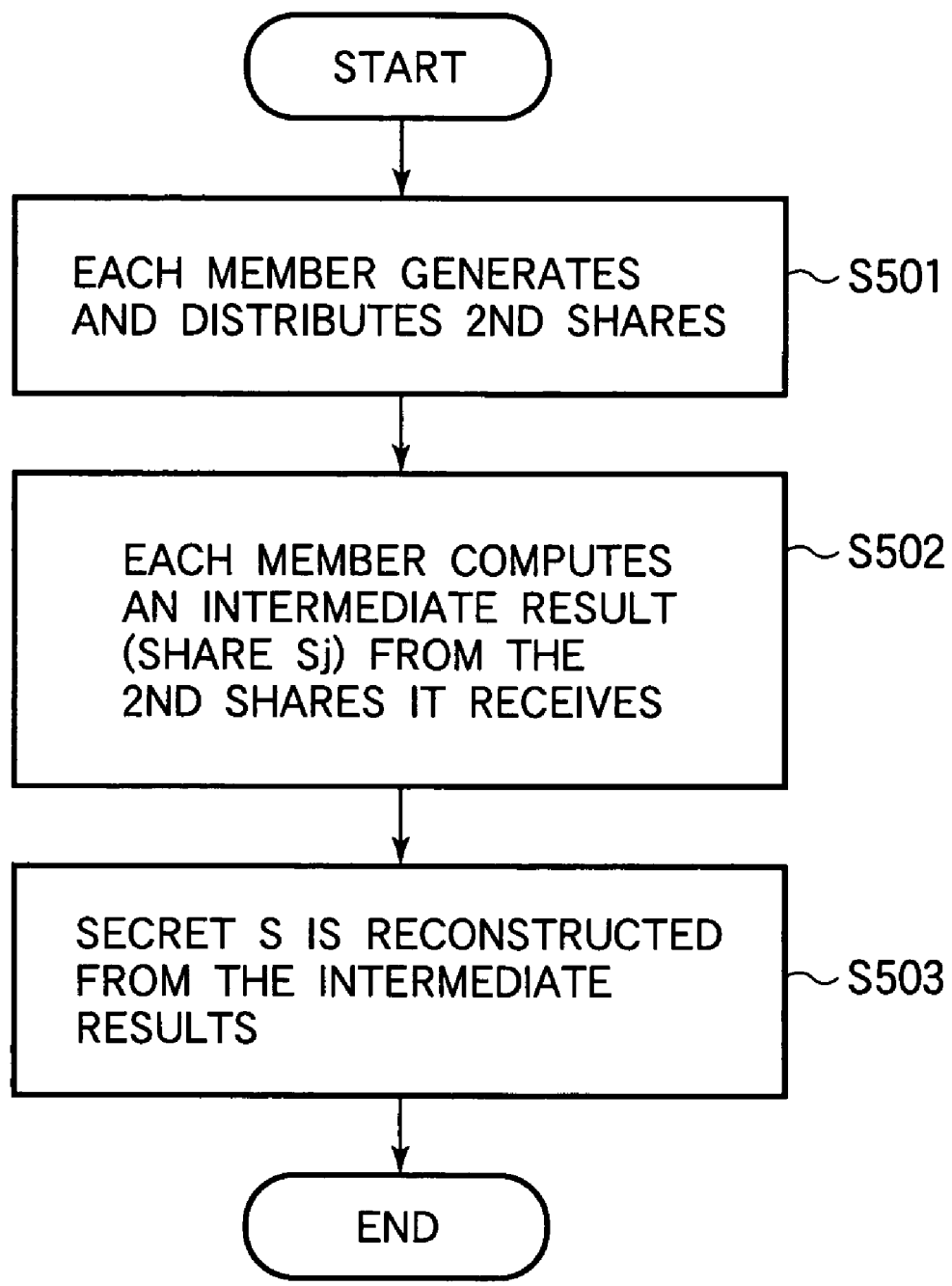
FIG. 7 is a flowchart illustrating the secret reconstruction method according to the first embodiment.

FIG. 7 is a flow chart showing the operation of the secret reconstruction method according to the first embodiment. To reconstruct the original secret information S, all members (n members) are collected. The first shares held by the collected members will again be denoted $X_1, X_2, \ldots, X_n$.

First, second shares are generated from each of the shares $X_1, X_2, \ldots, X_n$ held by the n members by using the summation secret sharing scheme and are distributed to the members (step S501). Step S501 indicates the operation of the secret sharing operation unit 401-j in FIG. 6, in which second shares $X_{j,p}$ (p=1, 2, . . . , n) are obtained from the first share $X_j$ by generating random elements and performing the calculation in the above equation (20), and the second shares are distributed to the members.

Next, each member carries out the computation using the second share $X_{j,j}$ it generated itself and the second shares $X_{p,j}$ (p=1, 2, . . . , n, p≠j) it received from the other members to obtain a share $S_j$ of the original secret information S (step S502) as an intermediate result. Step S502 indicates the operation of the n-term adder 402-j in FIG. 6, in which a member j carries out the computation in the above equation (21) on the second shares $X_{p,j}$ (p=1, 2, . . . , n) to obtain the intermediate result $S_j$.

Next, the original secret information S is reconstructed from the intermediate results $S_j$ computed by the members in step S502 (step S503). This operation is carried out by the secret reconstruction operation unit 302 in FIG. 5. The original secret information S is obtained from the intermediate results $S_j$ (j=1, 2, . . . , n) computed by the members j, using the above equation (19).

Effects of the First Embodiment

As described above, according to the first embodiment, the original secret information S can be reconstructed without revealing the shares $X_j$ held secretly by the collected members to any other member or any third party. Accordingly, the shares $X_j$ held by the members can be reused the next time the secret information is reconstructed. In addition, these effects can be obtained without the need for a central secret reconstruction facility. In the first embodiment, although the original secret information S cannot be reconstructed without collecting all members holding shares $X_j$, the members can remain anonymous and in addition the amounts of both computation and communication can be reduced because it suffices for the members to communicate with each other only once to distribute the second shares when the secret information is reconstructed.

Further, if a member (a device with computing and memory facilities) not holding a share $X_j$ of the secret information S tries to participate in the reconstruction of the secret information S, the reconstruction will fail. Therefore, the first embodiment provides an authentication scheme that can determine whether all members in a group comprising a plurality of collected members are valid members or not, thereby determining whether they are the members to whom the shares $X_j$ of the secret information S were previously distributed or not. Furthermore, in the first embodiment, since the shares $X_j$ are reusable as described above, the authentication scheme can be used repeatedly without updating the shares $X_j$ of the secret information S. The authentication scheme is also very robust under attack by an attacker who pretends to be a member by wiretapping. The authentication scheme described above has features that cannot be achieved by simply combining the secret reconstruction features of the secret sharing scheme and the shared operation features of the multiparty protocol. The above authentication scheme makes use of the original secret information S as registered information that is compared with the reconstruction result to decide if the authentication is valid or not, so it is not necessary for the original secret information S to be kept secret from the members.

Second Embodiment

General Description

In the second embodiment, as in the first embodiment, secret information S is reconstructed from shares held by a plurality of members by executing a multiparty protocol in which the members do not reveal their shares. The reconstruction process is carried out by a secret reconstruction system comprising a plurality of distributed secret reconstruction operation units operated by the members and a secret reconstruction operation unit operated by one or more of the members or by a central facility.

In the first embodiment, shares of the secret information S are generated by using the summation secret sharing scheme and secretly distributed to a group of members, all of whom must cooperate in order to reconstruct the original secret information S. In contrast, in the second embodiment, shares of the original secret information S are generated by using the (k, n) threshold secret sharing scheme and secretly distributed to a group of members. The original secret information S can be reconstructed by k members (k≦n), so participation of all n members in the reconstruction process is not necessarily required.

When the original secret information S is reconstructed, the shares held by t collected members (t≧k) are used to reconstruct the original secret information S by the method of equation (3), except that the original secret information is reconstructed by using a multiparty protocol, without revealing the shares held secretly by the collected members.

Structure of the Second Embodiment

In the second embodiment, shares of the original secret information S are generated by using the (k, n) threshold secret sharing scheme, and the shares are secretly distributed to a group of n members (devices with computing and memory facilities). The n members in the group have member IDs denoted $m_1, m_2, \ldots, m_n$, which are used when the secret information S is shared. The share of the secret information S distributed to the member having member ID $m_j$ (j=1, 2, ..., n), is denoted $Xm_j$ (j=1, 2, ..., n). When t members (t≧k) are collected to reconstruct the original secret information S, the member IDs and shares held by the collected members are denoted $m'_1, m'_2, m'_t$, and $Xm'_1, Xm'_2, \ldots, Xm'_t$, respectively. Any two of the collected members have a secure channel similar to the one in FIG. 3, over which they can communicate without revealing the content of their communication to any of the other members. It will be assumed that the member IDs $m'_1, m'_2, \ldots, m'_t$ given to the t collected members are revealed values.

Figure 8:
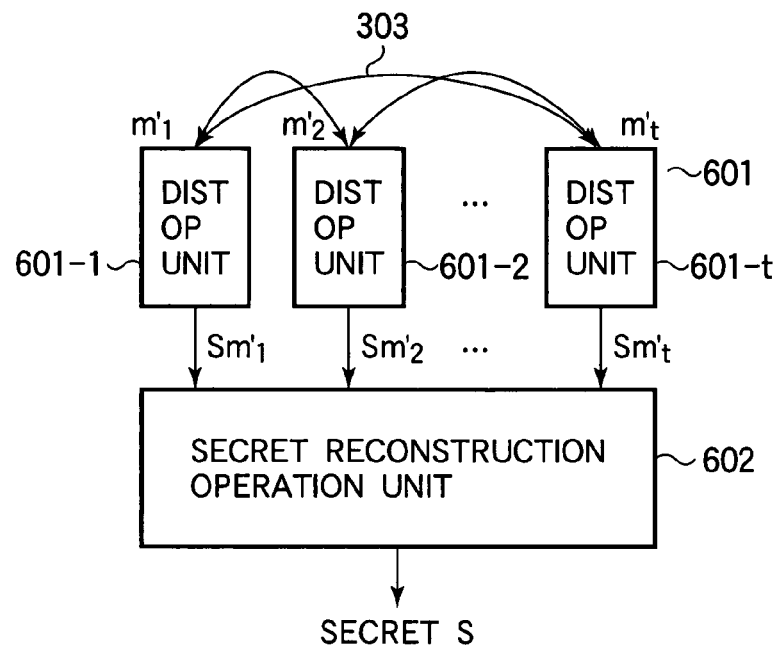
FIG. 8 is a block diagram of a secret reconstruction system for carrying out secret reconstruction in a second embodiment of the invention.

FIG. 8 is a block diagram illustrating a structure embodying the method of reconstructing secret information according to the second embodiment (a secret reconstruction system according to the second embodiment). The secret reconstruction method of the second embodiment will be described with reference to FIG. 8. As shown in FIG. 8, the t collected members (t devices with computing and memory facilities) having the member IDs $m'_1, m'_2, \ldots, m'_t$ possess distributed secret reconstruction operation units 601-1, 601-2, ..., 601-t (shared secret reconstruction apparatus according to the second embodiment), which are means for reconstructing the secret information by a sharing operation. The distributed secret reconstruction operation unit 601-j (j=1, 2, ..., t) is operated by the member having member ID $m'_j$. Each distributed secret reconstruction operation unit 601-j (j=1, 2, ..., t) is connected to the other distributed secret reconstruction operation units 601 through secure channels 303 similar to the ones shown in FIG. 3. The output from each distributed secret reconstruction operation unit 601-j (j=1, 2, ..., t) is input to a secret reconstruction operation unit 602. The structure and operation of the distributed secret reconstruction operation units 601 and secret reconstruction operation unit 602 differ from those of the distributed secret reconstruction operation units 301 and secret reconstruction operation unit 302 in the first embodiment.

The secret reconstruction operation unit 602 receives the t values output from the members' distributed secret reconstruction operation units 601j (j=1, 2, ..., t), uses them as t shares to reconstruct the secret information, and outputs the reconstructed secret information. If the values output from the members' distributed secret reconstruction operation units 601-j (j=1, 2, ..., t) are denoted $Sm'_j$, the original secret information S can be obtained from the following equations (22) and (4), equation (22) being obtained by replacing $Xm'_j$ in equation (3) with $Sm'_j$.

$$S = rm'_1 Sm'_1 + rm'_2 Sm'_2 + \ldots + rm'_t Sm'_t \quad (22)$$

$$= \sum_{j=1}^{t} rm'_j Sm'_j$$

$$rm'_j = (m'_1 \times m'_2 \times \ldots \times m'_t / m'_j) / ((m'_1 - m'_j) \times (m'_2 - m'_j) \times \ldots \times \quad (4)$$

$$(m'_{j-1} - m'_j) \times (m'_{j+1} - m'_j) \times \ldots \times (m'_t - m'_j))$$

$$= \prod_{\substack{i=1 \\ i \neq j}}^{t} m'_i / (m'_i - m'_j)$$

The computation of the above equation (22) is carried out in a finite field GF(q), as noted above.

Each of the distributed secret reconstruction operation units 601-j (j=1, 2, ..., t) is operated by a different member, and the content of the operation is not revealed to the other members. The secret reconstruction operation unit 602 may be operated by a central facility (a processor separate from the members) that is specialized for this operation, or by one or more of the collected members, preferably by the member or members who need the secret information S.

Figure 9:
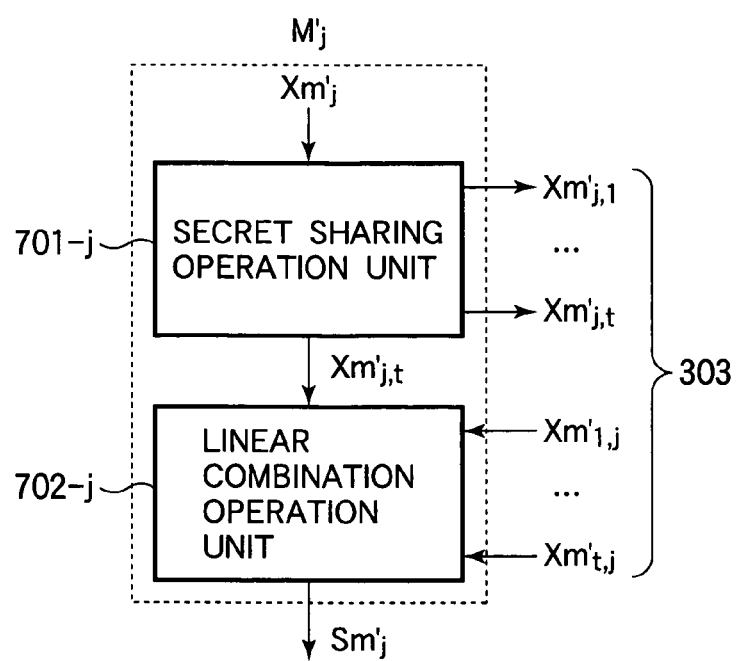
FIG. 9 is a block diagram illustrating the structure of the distributed secret reconstruction operation unit in FIG. 8.

FIG. 9 is a block diagram illustrating the structure of the distributed secret reconstruction operation unit 601-j (j=1, 2, ..., t) in FIG. 8. The distributed secret reconstruction operation unit 601-j will be described with reference to FIG. 9. As shown in FIG. 9, the distributed secret reconstruction operation unit 601-j comprises a secret sharing operation unit 701-$j$ and a linear combination operation unit 702-$j$. One of the outputs from the secret sharing operation unit 701-$j$ is input to the linear combination operation unit 702-$j$. The output of the linear combination operation unit 702-$j$ becomes the intermediate result output by the distributed secret reconstruction operation unit 601-$j$.

The share $Xm'_j$ of the original secret information S held by the member having member ID $m'_j$, is input to the secret sharing operation unit 701-$j$. The secret sharing operation unit 701-$j$ generates shares from the share $Xm'_j$ by using the (k', t) threshold secret sharing scheme, where k' is equal to or less than t, and distributes them to the other members through the secure channels 303. In this sharing operation, polynomials of degree k'-1 are generated by replacing $m_j$ and k in the above equation (6) with $m'_j$ and k', respectively, as shown in the following equation (23).

$$fm'_j(x) = Xm'_j + Rm'_{j,1}x + Rm'_{j,2}x^2 + \ldots + Rm'_{j,k'-1}x^{k'-1} \qquad (23)$$

In this equation, $Rm'_{j,1}, Rm'_{j,2}, \ldots, Rm'_{j,k'-1}$, are k'-1 random elements selected from the finite field GF(q).

The share $Xm'_{j,p}$ that will be distributed to the member having member ID $m'_p$ (p=1, 2, ..., t) can be calculated using the above equation (23), as shown in the following equation (24) (see the above equation (7)).

$$Xm'_{j,p} = fm'_j(m'_p) = Xm'_j + Rm'_{j,1}(m'_p) + Rm'_{j,2}(m'_p)^2 + \ldots + Rm'_{j,k'-1}(m'_p)^{k'-1} \qquad (24)$$

The share $Xm'_{j,j}$, which a member j generated itself, is input to the linear combination operation unit 702-$j$, and the other shares $Xm'_{j,p}$ (p=1, 2, ..., t, p≠j) are distributed to the other members through the secure channels 303.

The linear combination operation unit 702-$j$ thus receives a share $Xm'_{j,j}$ of the share $Xm'_j$ of the original secret information from the secret sharing operation unit 701-$j$. In addition, the linear combination operation unit 702-$j$ receives shares $Xm'_{1,j}, \ldots, Xm'_{j-1,j}, Xm'_{j+1,j}, \ldots, Xm'_{t,j}$ of the shares $Xm'_p$ (p=1, 2, ..., t, p≠j) of the original secret information S, which are sent by the other members via the secure channels 303. Using these t second shares $Xm'_{p,j}$ (p=1, 2, ..., t) of the first shares $Xm'_p$ of the original secret information S, a third share $Sm'_j$ of the original secret information S is computed and output as an intermediate result. It should be noted here that the share $Sm'_j$ which is used when the secret information S is reconstructed differs from the share $Xm'_j$ which is obtained when the secret information S is shared. The linear combination operation unit 702-$j$ carries out the computations shown in the following equations (25) and (26) to obtain the third share $Sm'_j$ or the intermediate result.

$$Sm'_j = rm'_1 Xm'_{1,j} + rm'_2 Xm'_{2,j} + \ldots + rm'_t Xm'_{t,j} \qquad (25)$$

$$= \sum_{p=1}^{t} rm'_p Xm'_{p,j}$$

$$rm'_p = (m'_1 \times m'_2 \times \ldots \times m'_t / m'_p) / ((m'_1 - m'_p) \times (m'_2 - m'_p) \times \ldots \times \qquad (26)$$
$$(m'_{p-1} - m'_p) \times (m'_{p+1} - m'_p) \times \ldots \times (m'_t - m'_p))$$

$$= \prod_{\substack{i=1 \\ i \neq p}}^{t} m'_i / (m'_i - m'_p)$$

In the above equation (26), since $m'_1, m'_2, \ldots, m'_t$ are revealed values, it is possible to calculate $rm'_p$.

Operation of the Second Embodiment

Figure 10:
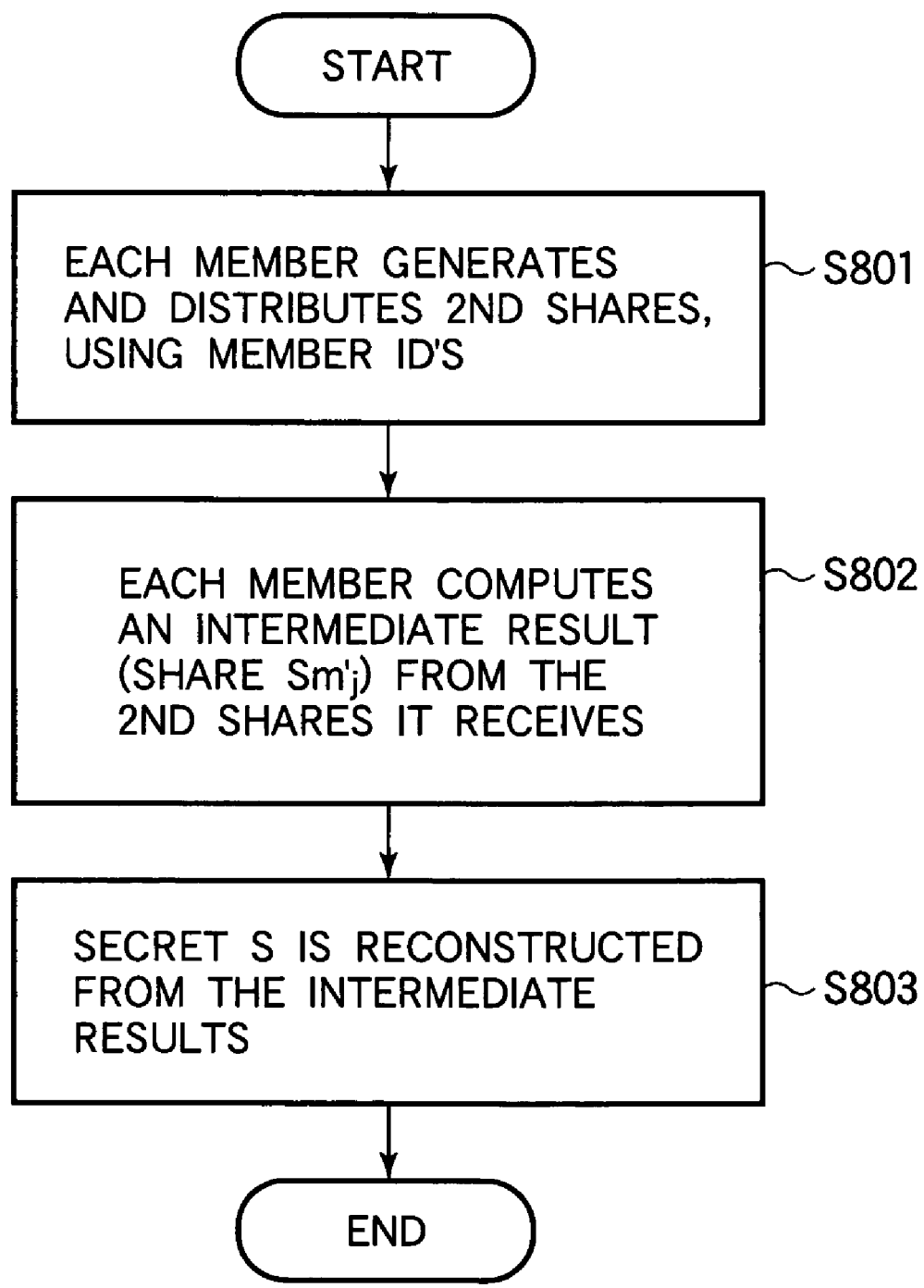
FIG. 10 is a flowchart illustrating the secret reconstruction method according to the second embodiment.

FIG. 10 is a flowchart illustrating the operation of the secret reconstruction method according to the second embodiment. To reconstruct the original secret information S, t members are collected. The member IDs and first shares held by the collected members will again be denoted $m'_1, m'_2, \ldots, m'_t$ and $Xm'_1, Xm'_2, \ldots, Xm'_t$, respectively.

Second shares are generated from each of the first shares held by the t members by using the (k', t) threshold secret sharing scheme, and are distributed to the members (step S801). Step S801 indicates the operation of the secret sharing operation unit 701-$j$ in FIG. 9, in which the first share $Xm'_j$ held by the member having member ID $m'_j$ (j=1, 2, ..., t) is shared by using equation (23) above, and the second shares $Xm'_{j,p}$, which are calculated by equation (24) are distributed to the members having member IDs $m'_p$ (p=1, 2, ..., t).

Next, each member carries out a computation using the second share $Xm'_{j,j}$ it generated itself and the second shares $Xm'_{p,j}$ (p=1, 2, ..., t, p≠j) it received from the other members to obtain a share $Sm'_j$ of the original secret information S (step S802) as an intermediate result. Step S802 indicates the operation of the linear combination operation unit 702-$j$ in FIG. 9, in which a member j carries out the computation in the above equation (25) on the second shares $Xm'_{p,j}$ (p=1, 2, ..., t) and the revealed member IDs $m'_p$ (p=1, 2, ..., t) to obtain the intermediate result $Sm'_j$.

Finally, the original secret information S is reconstructed from the intermediate results $Sm'_j$ computed by the members in step S802 (step S803). Step S803 indicates the operation of the secret reconstruction operation unit 602 in FIG. 8, in which the original secret information S is obtained from the intermediate results $Sm'_j$ (j=1, 2, ..., t) computed by the members j in step S802 by using the above equation (22).

Effects of the Second Embodiment

As described above, according to the second embodiment, the original secret information S can be reconstructed without revealing the shares held secretly by the collected members to any other member or any third party as in the first embodiment. Accordingly, the shares held by the members can be reused the next time the secret information is reconstructed. In addition, these effects can be obtained without the need for a central secret reconstruction facility.

In the first embodiment described above, since the original secret information S is shared by the summation secret sharing scheme, it cannot be reconstructed unless all n members are collected. In contrast, in the second embodiment, the original secret information S can be reconstructed by any collection of k members or more, where k may be less than n.

As described above, in the second embodiment, although the collected members cannot remain anonymous because their member IDs, which are distributed when the original secret information S is shared, are revealed, the amounts of both computation and communication can be reduced because it suffices for the members to communicate with each other only once to distribute the second shares when the secret information is reconstructed, and because each member has to communicate only with k other members, where k may be less than the full number of members (n).

Further, in the second embodiment, if a member (a device with computing and memory facilities) not holding a share of the secret information S tries to participate in the reconstruction of the secret information S, the reconstruction will fail as in the first embodiment. Therefore, the second embodiment provides an authentication scheme that can determine whether all members in a group comprising a plurality of collected members are valid members or not, thereby determining whether they are members to whom the shares of the secret information S were previously distributed or not. Furthermore, in the second embodiment, since the first shares are reusable as described above, the authentication scheme can be used repeatedly without updating the first shares of the secret information S. The authentication scheme is also very robust under attack by an attacker who pretends to be a member by wiretapping.

The authentication scheme described above has features that cannot be achieved by simply combining the secret reconstruction features of the secret sharing scheme and the shared operation features of the multiparty protocol. The above authentication scheme makes use of the original secret information S as registered information that is compared with the reconstruction result to decide if the authentication is valid or not, so it is not necessary for the original secret information S to be kept secret from the members.

Third Embodiment

General Description

In the third embodiment, as in the first and second embodiments, secret information S is reconstructed from shares held by a group of n members (n being an integer greater than one) by executing a multiparty protocol of the first type, in which the members do not reveal their shares. The reconstruction process is carried out by a secret reconstruction system comprising a temporary ID generator, a plurality of distributed secret reconstruction operation units operated by the members, and a secret reconstruction operation unit operated by one or more of the members or by a central facility.

In the third embodiment, as in the second embodiment, shares of the original secret information S are generated by using the (k, n) threshold secret sharing scheme. The original secret information S can therefore be reconstructed by any collection of k members (k≦n), not necessarily requiring the participation of all n members. In the second embodiment, the member IDs of the collected members are revealed in order to reconstruct the secret information, but in the third embodiment, the secret information is reconstructed without revealing either the shares held by the members or their member IDs.

Structure of the Third Embodiment

In the third embodiment, as in the second embodiment, a group of n members hold shares of the original secret information S. The shares are generated by using the (k, n) threshold secret sharing scheme and secretly distributed to the members. It will be assumed that the n members in the group have member IDs $m_1, m_2, \ldots, m_n$, which are used when the secret information S is shared. The share of the secret information S distributed to the member having member ID $m_j$ (j=1, 2, ..., n) is denoted $Xm_j$. When the original secret information S is reconstructed by t collected members (t≧k), their member IDs will be denoted $m'_1, m'_2, \ldots, m'_t$ and their shares $Xm'_1, Xm'_2, \ldots, Xm'_t$. As in the first and second embodiments, any two of the collected members have a secure channel over which they can communicate without revealing the content of their communication to any of the other members (see FIG. 3). The third embodiment, however, differs from the second embodiment in that the member IDs $m'_1, m'_2, \ldots, m'_t$ of the collected members are not revealed, so it is impossible to know which collected member holds which member ID. In the computations below, arithmetic operations (addition, subtraction, multiplication, division) are carried out in a finite field GF(q).

Figure 11:
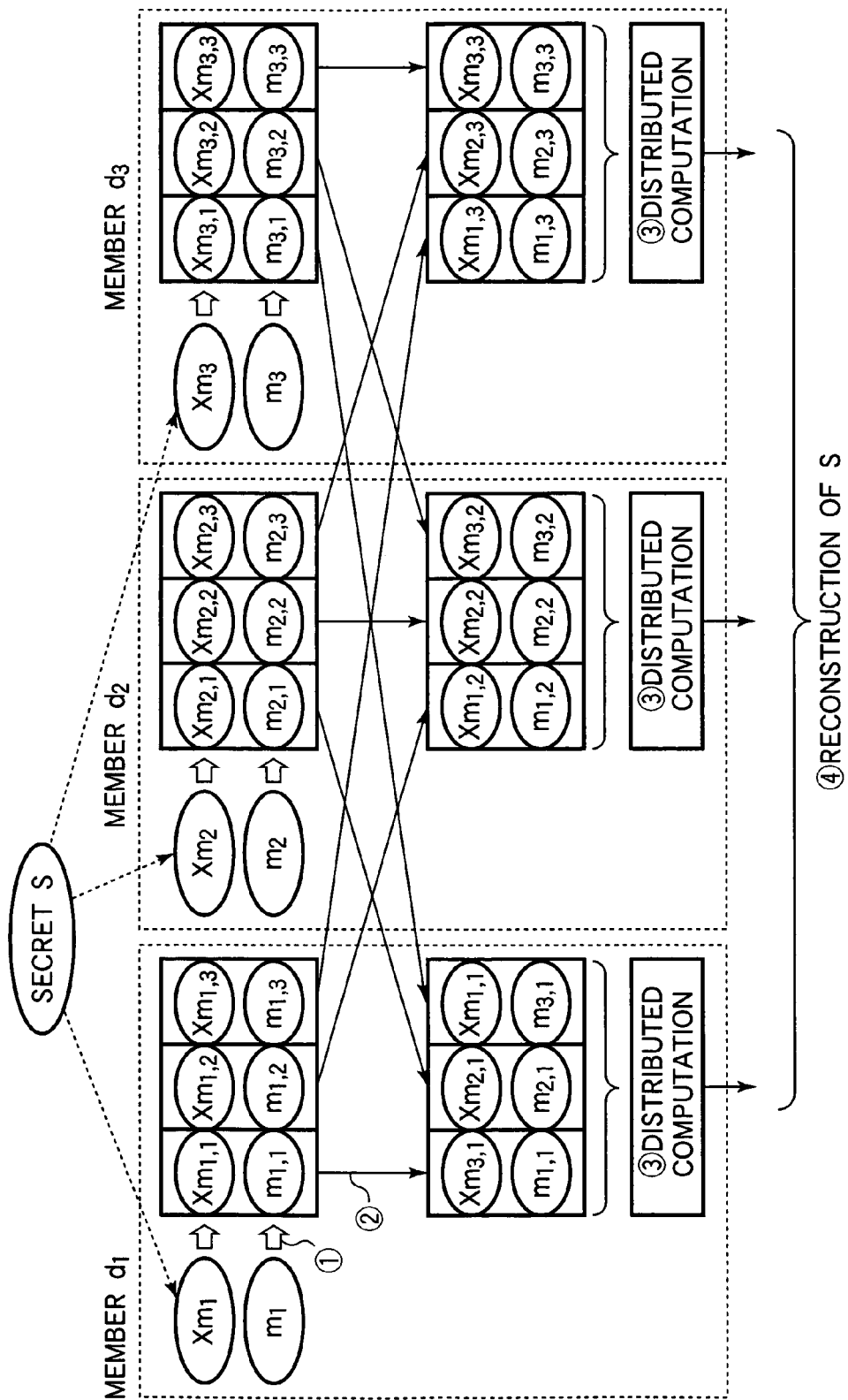
FIG. 11 is a drawing to depicting a secret reconstruction method according to a third embodiment of the invention.

The secret reconstruction method according to the third embodiment will be outlined below with reference to FIG. 11. FIG. 11 illustrates a case in which there are three members (three devices with computing and memory facilities) holding respective shares $Xm_1, Xm_2,$ and $Xm_3$ generated from the original secret information S by using a threshold secret sharing scheme, and holding respective member IDs $m_1, m_2, m_3$. When the original secret information S is reconstructed, the first shares $Xm_1, Xm_2,$ and $Xm_3$ held by the members are further shared by using the threshold secret sharing scheme to generate second shares from shares $Xm_1, Xm_2,$ and $Xm_3$. More specifically, as indicated by the circled reference numeral 1 in FIG. 11, the secret sharing scheme is used to generate shares $Xm_{1,1}, Xm_{1,2}, Xm_{1,3}$ from share $Xm_1$, shares $Xm_{2,1}, Xm_{2,2}, Xm_{2,3}$ from share $Xm_2$, and shares $Xm_{3,1}, Xm_{3,2}, Xm_{3,3}$ from share $Xm_3$. In addition, the secret sharing scheme is used to generate shares $m_{1,1}, m_{1,2}, m_{1,3}$ from member ID $m_1$, shares $m_{2,1}, m_{2,2}, m_{2,3}$ from member ID $m_2$, and shares $m_{3,1}, m_{3,2}, m_{3,3}$ from member ID $m_3$. The second shares generated from shares $Xm_1, Xm_2, Xm_3$ are distributed to the other members as indicated by the circled reference numeral 2. Each member receives shares of shares $Xm_1, Xm_2, Xm_3$, i.e., shares $Xm_{1,1}, Xm_{2,1}, Xm_{3,1}$, shares $Xm_{1,2}, Xm_{2,2}, Xm_{3,2}$, or shares $Xm_{1,3}, Xm_{2,3}, Xm_{3,3}$, and in addition receives shares of member IDs $m_1, m_2, m_3$, i.e., shares $m_{1,1}, m_{2,1}, m_{3,1}$, shares $m_{1,2}, m_{2,2}, m_{3,2}$, or shares $m_{1,3}, m_{2,3}, m_{3,3}$. The member carries out part of a distributed computation on the basis of these shares and outputs the result as indicated by the circled reference numeral 3. Finally, as indicated by the circled reference numeral 4, the original secret information S is reconstructed by collecting the results of the distributed computation carried out using shares $Xm_{1,1}, Xm_{2,1}, Xm_{3,1}$ and $m_{1,1}, m_{2,1}, m_{3,1}$, shares $Xm_{1,2}, Xm_{2,2}, Xm_{3,2}$ and $m_{1,2}, m_{2,2}, m_{3,2}$, and shares $Xm_{1,3}, Xm_{2,3}, Xm_{3,3}$ and $m_{1,3}, m_{2,3}, m_{3,3}$, instead of using shares $Xm_1, Xm_2, Xm_3$ and member IDs $m_1, m_2, m_3$ directly.

Figure 12:
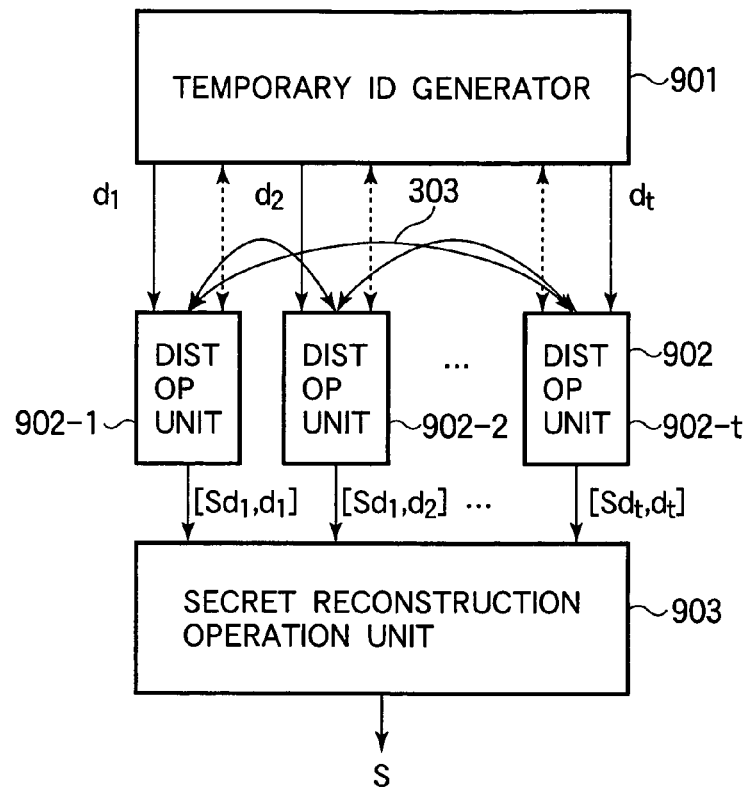
FIG. 12 is a block diagram of a secret reconstruction system for carrying out secret reconstruction in the third embodiment.

FIG. 12 is a block diagram illustrating a structure embodying the method of reconstructing secret information according to the third embodiment (a secret reconstruction system according to the third embodiment). The secret reconstruction method of the third embodiment will be described with reference to FIG. 12. As shown in FIG. 12, the t collected members (t devices with computing and memory facilities) having the member IDs $m'_1, m'_2, \ldots, m'_t$ possess distributed secret reconstruction operation units 902-1, 902-2, ..., 902-t (shared secret reconstruction apparatus according to the third embodiment), which are means for reconstructing the secret information by a sharing operation. The secret reconstruction system further comprises a temporary ID generator 901 and a secret reconstruction operation unit 903. The structures and operations of the distributed secret reconstruction operation units 902 and secret reconstruction operation unit 903 differ from those of the distributed secret reconstruction operation units 301, 601, and secret reconstruction operation units 302, 602 in the first and second embodiments. The temporary ID generator 901 is connected to the distributed secret reconstruction operation units 902-$j$ ($j=1, 2, \ldots, t$) of the collected members. Each distributed secret reconstruction operation unit 902-$j$ ($j=1, 2, \ldots, t$) is connected to the other distributed secret reconstruction operation units 902 through secure channels 303 similar to the ones shown in FIG. 3. The output from each distributed secret reconstruction operation unit 902-$j$ ($j=1, 2, \ldots, t$) is input to the secret reconstruction operation unit 903.

The temporary ID generator 901 generates t mutually distinct values $d_1, d_2, \ldots, d_t$ for the collected t members and outputs them to the distributed secret reconstruction operation units 902-$j$ ($j=1, 2, \ldots, t$) as temporary member IDs. If t mutually distinct values such as internet protocol (IP) addresses are available for use, it is possible to make use of these values as the temporary member IDs $d_1, d_2, \ldots, d_t$ by requesting the distributed secret reconstruction operation units 902-$j$ ($j=1, 2, \ldots, t$) to provide these values instead of by generating them. It will be assumed that these temporary member IDs $d_1, d_2, \ldots, d_t$ are revealed, so the collected members know which member holds which temporary member ID. An exemplary method of revealing this information is for each distributed secret reconstruction operation unit 902-$j$ ($j=1, 2, \ldots, t$) to report whether it corresponds to temporary member ID $d_j$ by using a control signal. The control signals are indicated by dashed lines in FIG. 12. The temporary ID generator 901 then assigns and reveals the temporary member IDs $d_1, d_2, \ldots, d_t$.

Each distributed secret reconstruction operation unit 902-$j$ ($j=1, 2, \ldots, t$) is operated by the member having temporary member ID $d_j$ so as to receive its own temporary member ID from the temporary ID generator 901 and output its share of the result of the distributed computation described below, together with its temporary member ID $d_j$, to the secret reconstruction operation unit 903.

The secret reconstruction operation unit 903 thus receives the t results from the distributed secret reconstruction operation units 902-$j$ ($j=1, 2, \ldots, t$), reconstructs the secret information by a computation using these t results as t shares, and outputs the reconstructed secret information. If the value output from each of the distributed secret reconstruction operation units 902-$j$ ($j=1, 2, \ldots, t$) is denoted $Sd_j$ ($j=1, 2, \ldots, t$) and the corresponding temporary member ID is denoted $d_j$, the original secret information S can be obtained by replacing $m'_j$ and $Sm'_j$ in the above equations (22) and (4) with $d_j$ and $Sd_j$, respectively, and calculating the values S and $rd_j$ given by the following equations (27) and (28) in the finite field GF(q).

$$S = rd_1 Sd_1 + rd_2 Sd_2 + \ldots + rd_t Sd_t \tag{27}$$

$$= \sum_{j=1}^{t} rd_j Sd_j$$

$$rd_j = (d_1 \times d_2 \times \ldots \times d_t / d_j) / ((d_1 - d_j) \times (d_2 - d_j) \times \ldots \times \tag{28}$$

$$(d_{j-1} - d_j) \times (d_{j+1} - d_j) \times \ldots \times (d_t - d_j))$$

$$= \prod_{\substack{i=1 \\ i \neq j}}^{t} d_i / (d_i - d_j)$$

Each of the distributed secret reconstruction operation units 902-$j$ ($j=1, 2, \ldots, t$) is operated by a different member, and the content of the operations it performs is not revealed to the other members. The temporary ID generator 901 and secret reconstruction operation unit 903 may be operated by a central facility (a processor separate from the members) that is specialized for this operation, or may be operated by one or a plurality of the collected members, preferably by the member or members who need the secret information S.

Figure 13:
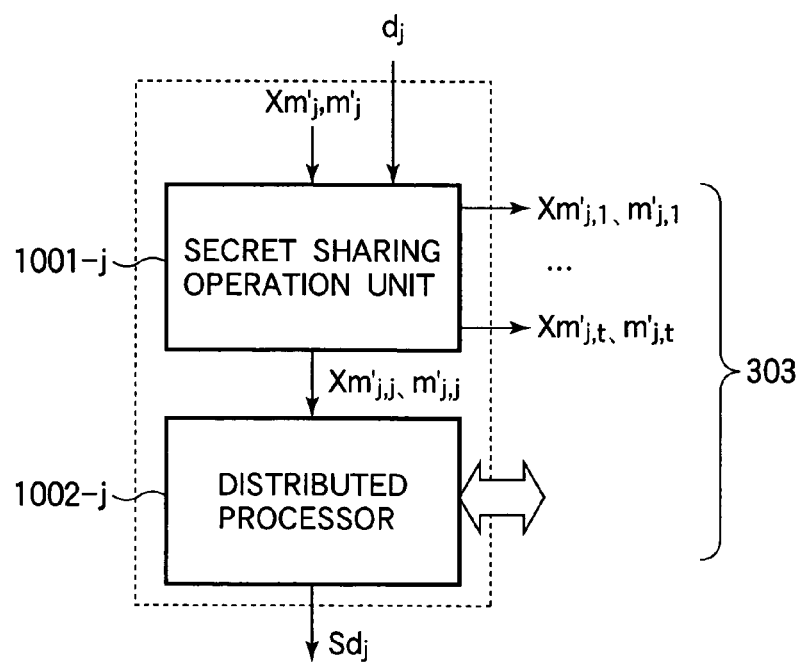
FIG. 13 is a block diagram illustrating the structure of the distributed secret reconstruction operation unit in FIG. 12.

FIG. 13 is a block diagram illustrating the structure of the distributed secret reconstruction operation unit 902-$j$ ($j=1, 2, \ldots, t$) in FIG. 12. The distributed secret reconstruction operation unit 902-$j$ ($j=1, 2, \ldots, t$) will be described with reference to FIG. 13. As shown in FIG. 13, the distributed secret reconstruction operation unit 902-$j$ comprises a secret sharing operation unit 1001-$j$ and a distributed processor 1002-$j$. The inputs to the distributed secret reconstruction operation unit 902-$j$ are supplied to the secret sharing operation unit 1001-$j$, and one of the outputs from the secret sharing operation unit 1001-$j$ is input to the distributed processor 1002-$j$. The output of the distributed processor 1002-$j$ becomes the intermediate result output by the distributed secret reconstruction operation unit 902-$j$. The temporary member ID $d_j$ output from the temporary ID generator 901 in FIG. 12 is input to the secret sharing operation unit 1001-$j$. The member ID $m'_j$ held by the member having the temporary member ID $d_j$ and that member's share $Xm'_j$ of the original secret information S are also input to the secret sharing operation unit 1001-$j$. In the secret sharing operation unit 1001-$j$, the received share $Xm'_j$ and member ID $m'_j$ are shared by using the (k', t) threshold secret sharing scheme and the generated shares are distributed to the other members via the secure channels 303. The third embodiment differs from the second embodiment in that the third embodiment needs to perform distributed multiplication. Therefore, it is necessary for the threshold k' of the secret sharing scheme to satisfy the condition given by the following inequality (29) (see the above equation (11)).

$$k' \leq (t+1)/2 \tag{29}$$

The condition in the above inequality (29) is computed with normal integers and fractions in the real number field, not in the finite field GF(q).

As in the second embodiment, to calculate second shares of the input shares $Xm'_j$, polynomials of degree k'−1 similar to the above equation (23) are generated as shown in the following equation (29').

$$f_1 d_j(x) = Xm'_j + R_1 d_{j,1} x + R_1 d_{j,2} x^2 + \ldots + R_1 d_{j,k'-1} x^{k'-1} \tag{29'}$$

In this calculation, the temporary member IDs $d_p$ ($p=1, 2, \ldots, t$) are used in place of the member IDs $m'_p$ ($p=1, 2, \ldots, t$), which are kept secret. $R_1 d_{j,1}, R_1 d_{j,2}, \ldots, R_1 d_{j,k'-1}$ are k'−1 random elements selected from the finite field GF(q).

The share $Xm'_{j,p}$ distributed to the member having temporary member ID $d_p$ ($p=1, 2, \ldots, t$) is calculated using the above equation (29') as in the following equation (30).

$$Xm'_{j,p} = f_1 d_j(d_p) \tag{30}$$

$$= Xm'_j + R_1 d_{j,1}(d_p) + R_1 d_{j,2}(d_p)^2 + \ldots + R_1 d_{j,k'-1}(d_p)^{k'-1}$$

Similarly, to share the input member ID $m'_j$, polynomials of degree k'−1 shown in the equation (31) below are generated, in which $R_2 d_{j,1}, R_2 d_{j,2}, \ldots, R_2 d_{j,k'-1}$ are k'−1 random elements selected from the finite field GF(q).

$$f_2 d_j(x) = m'_j + R_2 d_{j,1} x + R_2 d_{j,2} x^2 + \ldots + R_2 d_{j,k'-1} x^{k'-1} \tag{31}$$

The share $m'_{j,p}$ distributed to the member having temporary member ID $d_p$ (p=1, 2, ..., t) is calculated using the above equation (31) as in the following equation (32).

$$m'_{j,p} = f_2 d_j(d_p) \quad (32)$$
$$= m'_j + R_2 d_{j,1}(d_p) + R_2 d_{j,2}(d_p)^2 + \ldots + R_2 d_{j,k'-1}(d_p)^{k'-1}$$

The shares $Xm'_{j,j}$ and $m'_{j,j}$, both of which member j generated itself, are output to the distributed processor 1002-*j*, whereas the other shares $Xm'_{j,p}$ and $m'_{j,p}$ (p=1, 2, ..., t, p≠j) are distributed to the other members' distributed processors 1002-*p* (p=1, 2, ..., t, p≠j) through the secure channels 303.

The distributed processor 1002-*j* thus receives a share $m'_{j,j}$ of the member ID and a share $Xm'_{j,j}$ of the share of the original secret information S from the secret sharing operation unit 1001-*j*. In addition, the distributed processor 1002-*j* receives the shares $m'_{1,j}, m'_{2,j}, \ldots, m'_{t,j}$ of the other members' IDs and shares $Xm'_{1,j}, Xm'_{2,j}, \ldots, Xm'_{t,j}$ of the shares of the original secret information S, all of which are distributed from the other members' secret sharing operation units 1001-*p* (p=1, 2, ..., t, p≠j) through the secure channels 303. Using these shares $m'_{p,j}$ (p=1, 2, ..., t) of the member IDs and second shares $Xm'_{p,j}$ (p=1, 2, ..., t) of the first shares of the original secret information S, a third share $Sd_j$ of the original secret information S is computed and output as an intermediate result. That is, the sharing operations are carried out using the above equation (3) while the member IDs $m'_1, m'_2, \ldots, m'_t$ and shares $Xm'_1, Xm'_2, \ldots, xm'_t$ of the collected members are kept secret. As a result of the sharing operations, the members hold the shared secret information $Sd_1, Sd_2, \ldots, Sd_t$ as the intermediate results.

Figure 14:
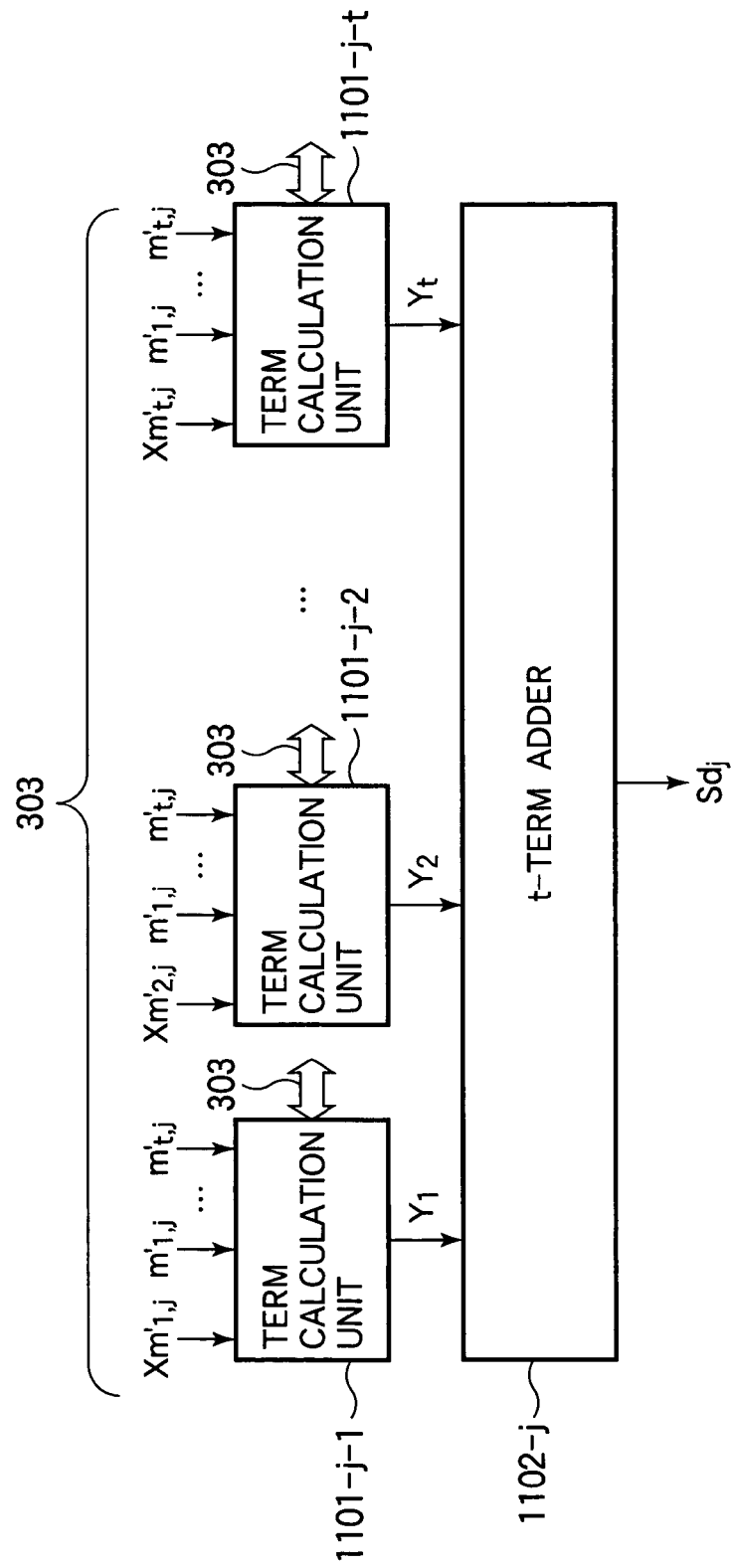
FIG. 14 is a block diagram illustrating the structure of the distributed processor in FIG. 13.

FIG. 14 is a block diagram illustrating the structure of the distributed processor 1002-*j* (j=1, 2, ..., t) in FIG. 13. The distributed processor 1002-*j* (j=1, 2, ..., t) will be described with reference to FIG. 14. As shown in FIG. 14, the distributed processor 1002-*j* comprises t term calculation units 1101-*j*-*a* (a=1, 2, ..., t) and a t-term adder 1102-*j* receiving t inputs of information. The shares $Xm'_{j,j}$ and $m'_{j,j}$, both of which are output from the secret sharing operation unit 1001-*j*, and the shares $m'_{1,j}, m'_{2,j}, \ldots, m'_{t,j}$ of the other members' IDs and shares $Xm'_{1,j}, Xm'_{2,j}, \ldots, Xm'_{t,j}$ of the shares of the original secret information S, all of which are distributed from the other members' secret sharing operation units 1001-*p* (p=1, 2, ..., t, p≠j) through the secure channels 303, are input to the term calculation units 1101-*j*-*a* (a=1, 2, ..., t). The outputs from the term calculation units 1101-*j*-*a* (a=1, 2, ..., t) are input to the t-term adder 1102-*j*. The output of the t-term adder 1102-*j* becomes the intermediate result output by the distributed processor 1002-*j*. Each term calculation unit 1101-*j*-*a* has secure channels 303 that communicate with the other members' secret sharing operation units 1001-*p* and term calculation units 1101-*p*-*a* (p=1, 2, ..., t, p≠j).

The t-term adder 1102-*j* receives t outputs in total from the term calculation units 1101-*j*-*a* (a=1, 2, ..., t) and adds all of them. That is, if the output from the term calculation unit 1101-*j*-*a* is denoted $Y_a$ (a=1, 2, ..., t), the t-term adder 1102-*j* carries out the calculation shown in the following equation (33) and outputs the result $Sd_j$.

$$Sd_j = Y_1 + Y_2 + \ldots + Y_t \quad (33)$$

Figure 15:
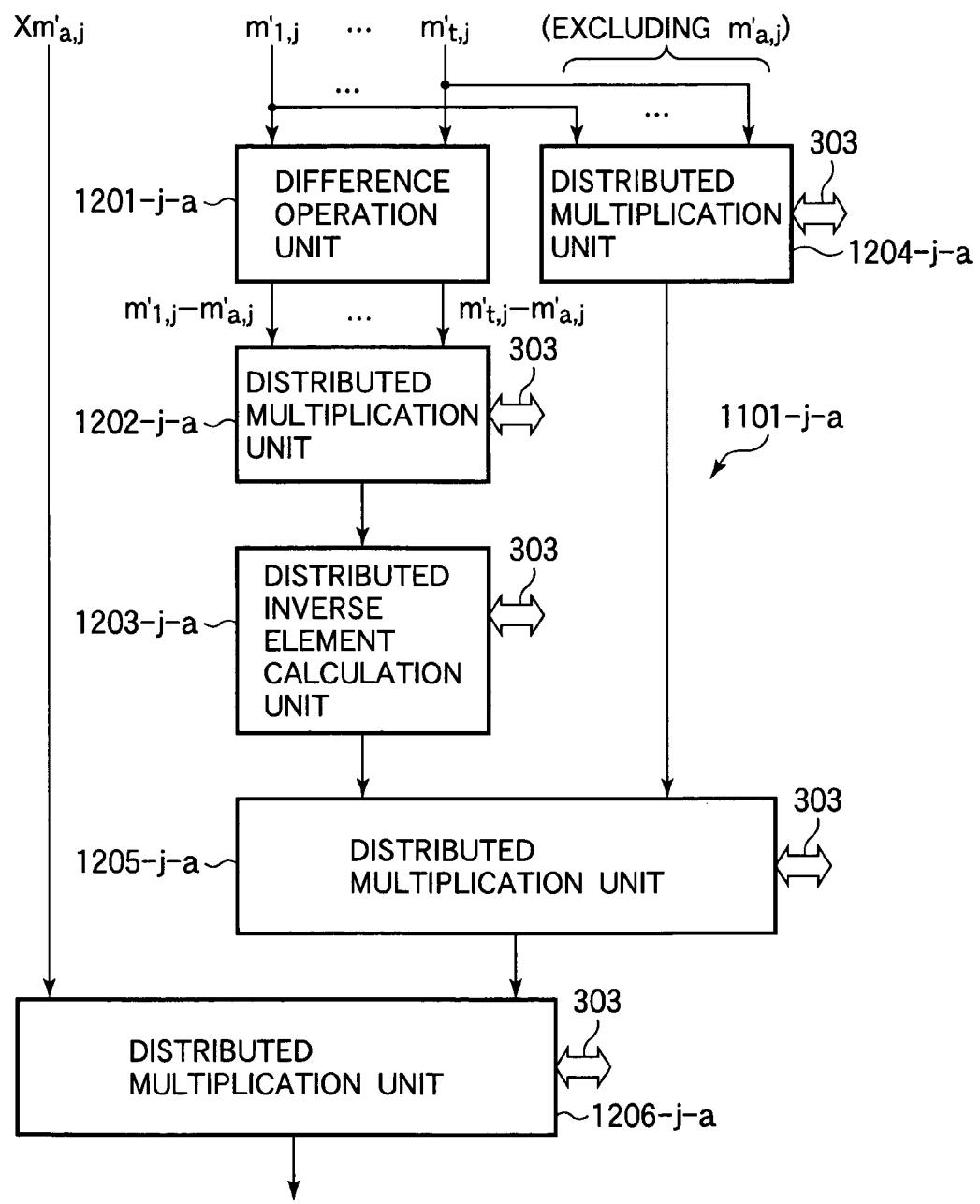
FIG. 15 is a block diagram illustrating the structure of the term calculation unit in FIG. 14.

FIG. 15 is a block diagram illustrating the structure of the term calculation units 1101-*j*-*a* (a=1, 2, ..., t) in FIG. 14. The structure of the term calculation units will now be described with reference to FIG. 15. Each term calculation unit 1101-*j*-*a* (a=1, 2, ..., t) comprises: a difference operation unit 1201-*j*-*a*; a distributed multiplication unit 1202-*j*-*a* receiving t−1 inputs of information; a distributed multiplication unit 1204-*j*-*a* receiving t−1 inputs of information; a distributed inverse element calculation unit 1203-*j*-*a*; a distributed multiplication unit 1205-*j*-*a* receiving two inputs of information; and another distributed multiplication unit 1206-*j*-*a* receiving two inputs of information. The shares $m'_{1,j}, m'_{2,j}, \ldots, m'_{t,j}$ input to the term calculation units 1101-*j*-*a* (a=1, 2, ..., t) via the secure channels 303 or directly from the secret sharing operation unit 1001-*j* (in case of $m'_{j,j}$) are input to the difference operation unit 1201-*j*-*a*. The outputs from the difference operation unit 1201-*j*-*a* are input to the distributed multiplication unit 1202-*j*-*a*. The output from the distributed multiplication unit 1202-*j*-*a* is input to the distributed inverse element calculation unit 1203-*j*-*a* and the output from the distributed inverse element calculation unit 1203-*j*-*a* is input to the distributed multiplication unit 1205-*j*-*a*. The shares $m'_{1,j}, m'_{2,j}, \ldots, m'_{t,j}$ input to the term calculation unit 1101-*j*-*a* (a=1, 2, ..., t) via the secure channels 303 and directly from the secret sharing operation unit 1001-*j* are also input to the distributed multiplication unit 1204-*j*-*a* except for $m'_{a,j}$. The output from the distributed multiplication unit 1204-*j*-*a* is input to the distributed multiplication unit 1205-*j*-*a* together with the output from the distributed inverse element calculation unit 1203-*j*-*a*. The output from the distributed multiplication unit 1205-*j*-*a* is input to the distributed multiplication unit 1206-*j*-*a* together with $Xm'_{m,j}$ which is input through the secure channel 303 or directly from the secret sharing operation unit 1001-*j* (in case of $Xm'_{j,j}$) to the term calculation unit 1101-*j*-*a* (a=1, 2, ..., t). The output of the distributed multiplication unit 1206-*j*-*a* becomes a share of the intermediate result output by the term calculation unit 1101-*j*-*a*. The distributed multiplication units 1202-*j*-*a*, 1204-*j*-*a*, distributed inverse element calculation unit 1203-*j*-*a*, and distributed multiplication units s 1205-*j*-*a*, 1206-*j*-*a* have secure channels 303 over which they can communicate with the other members' distributed multiplication units 1202-*p*-*a*, 1204-*p*-*a*, 1205-*p*-*a*, 1206-*p*-*a* and distributed inverse element calculation unit 1203-*p*-*a* (p=1, 2, ..., t, p≠j).

The difference operation unit 1201-*j*-*a* receives the member IDs $m'_{1,j}, m'_{2,j}, \ldots, m'_{t,j}$ input to the term calculation unit 1101-*j*-*a*, and calculates the differences between $m'_{a,j}$ and each of the member IDs $m'_{1,j}, m'_{2,j}, \ldots, m'_{t,j}$ except $m'_{a,j}$. That is, t−1 differences are calculated: $(m'_{1,j} - m'_{a,j}), (m'_{2,j} - m'_{a,j}), \ldots, (m'_{(a-1),j} - m'_{a,j}), (m'_{(a+1),j} - m'_{a,j}), \ldots, (m'_{t,j} - m'_{a,j})$. These t−1 results are output to distributed multiplication unit 1202-*j*-*a*.

Distributed multiplication units 1202-*j*-*a* and 1204-*j*-*a* have the same internal structure: each of them receives t−1 inputs, carries out distributed multiplication of t−1 elements using the t−1 inputs and the information received through the secure channels 303, and outputs the result. The values input to each of the distributed multiplication units 1202-*j*-*a* and 1204-*j*-*a* will be denoted $A_{1,j}, A_{2,j}, \ldots, A_{(t-1),j}$. If the original secret, which is reconstructed by the t values $A_{i,p}$ (p=1, 2, ..., t) comprising $A_{i,j}$ input to the distributed multiplication units 1202-*j*-*a* and 1204-*j*-*a* and $A_{i,p}$ (p=1, 2, ..., t, p≠j) input to the other members' distributed multiplication units 1202-*p*-*a* and 1204-*p*-*a*, is denoted $A_i$ (i=1, 2, ..., t−1), each of the distributed multiplication units 1202-*j*-*a* and 1204-*j*-*a* calculates a share $B_j$ of the product B of all of the $A_i$ (i=1, 2, ..., t−1), i.e., $B = A_1 \times A_2 \times \ldots \times A_{t-1}$, which becomes the share obtained by the member having temporary member ID $d_j$. Distributed multiplication unit 1202-*j*-*a* receives the t−1 outputs from the difference operation unit 1201-*j*-*a*, carries out a calculation using the received data, and outputs the result to the distributed inverse element calculation unit 1203-$j$-$a$. Distributed multiplication unit 1202-$j$-$a$ also exchanges necessary information with the other members' distributed multiplication units 1202-$p$-$a$ ($p$=1, 2, ..., t, $p \neq j$) via the secure channels 303. Distributed multiplication unit 1204-$j$-$a$ receives the inputs $m'_{1,j}, m'_{2,j}, \ldots, m'_{t,j}$ to the term calculation unit 1101-$j$-$a$, excluding $m'_{a,j}$, carries out a calculation using the received data, and outputs the result to distributed multiplication unit 1205-$j$-$a$. Distributed multiplication unit 1204-$j$-$a$ also exchanges necessary information with the other members' distributed multiplication units 1204-$p$-$a$ ($p$=1, 2, ..., t, $p \neq j$) via the secure channels 303.

The distributed inverse element calculation unit 1203-$j$-$a$ receives the output from distributed multiplication unit 1202-$j$-$a$, carries out the an operation on the received data and information received through the secure channels 303, and outputs the result to distributed multiplication unit 1205-$j$-$a$. If the output of distributed multiplication unit 1202-$j$-$a$ is denoted $A_j$ and the secret reconstructable from the t values $A_p$ ($p$=1, 2, ..., t), of which $A_j$ is input to distributed inverse element calculation unit 1203-$j$-$a$ and the other $A_p$ ($p$=1, 2, ..., t, $p \neq j$) are input to the other members' distributed inverse element calculation units 1203-$p$-$a$, is denoted $A_p$ the distributed inverse element calculation unit 1203-$j$-$a$ calculates a share $B_j$ of the inverse element of A in the finite field GF(q), i.e., $B=A^{-1}$, which becomes the share obtained by the member having temporary member ID $d_j$. The distributed inverse element calculation unit 1203-$j$-$a$ also exchanges necessary information with the other members' distributed inverse element calculation units 1203-$p$-$a$ ($p$=1, 2, ..., t, $p \neq j$) via the secure channels 303.

Distributed multiplication units 1205-$j$-$a$ and 1206-$j$-$a$ have the same internal structure: each of them receives two inputs, carries out a distributed multiplication of two elements using the two inputs and information received through the secure channels 303, and outputs the result. The values input to distributed multiplication units 1205-$j$-$a$ and 1206-$j$-$a$ will now be denoted $A_{1,j}, A_{2,j}$. If the secret reconstructable from the t values $A_{i,p}$ ($p$=1, 2, ..., t), of which $A_{i,j}$ is input to distributed multiplication units 1205-$j$-$a$ and 1206-$j$-$a$ and the other $A_{i,p}$ ($p$=1, 2, ..., t, $p \neq j$) are input to the other members' distributed multiplication units 1205-$p$-$a$ and 1206-$p$-$a$, is denoted $A_i$ ($i$=1, 2), each of the distributed multiplication units 1205-$j$-$a$ and 1206-$j$-$a$ calculates a share $B_j$ of the product $B = A_1 \times A_2$, which becomes the share obtained by the member having temporary member ID $d_j$. Distributed multiplication unit 1205-$j$-$a$ receives the outputs from distributed multiplication unit 1204-$j$-$a$ and the distributed inverse element calculation unit 1203-$j$-$a$, carries out a calculation using the received data, and outputs the result to distributed multiplication unit 1206-$j$-$a$. Distributed multiplication unit 1205-$j$-$a$ also exchanges necessary information with the other members' distributed multiplication units 1205-$p$-$a$ ($p$=1, 2, ..., t, $p \neq j$) via the secure channels 303. Distributed multiplication unit 1206-$j$-$a$ receives the output from distributed multiplication unit 1205-$j$-$a$ and the value $Xm'_{a,j}$ input to the term calculation unit 1101-$j$-$a$, carries out a calculation using these received data, and outputs the result. Distributed multiplication unit 1206-$j$-$a$ also exchanges necessary information with the other members' distributed multiplication units 1206-$p$-$a$ ($p$=1, 2, ..., t, $p \neq j$) via the secure channels 303.

Figure 16:
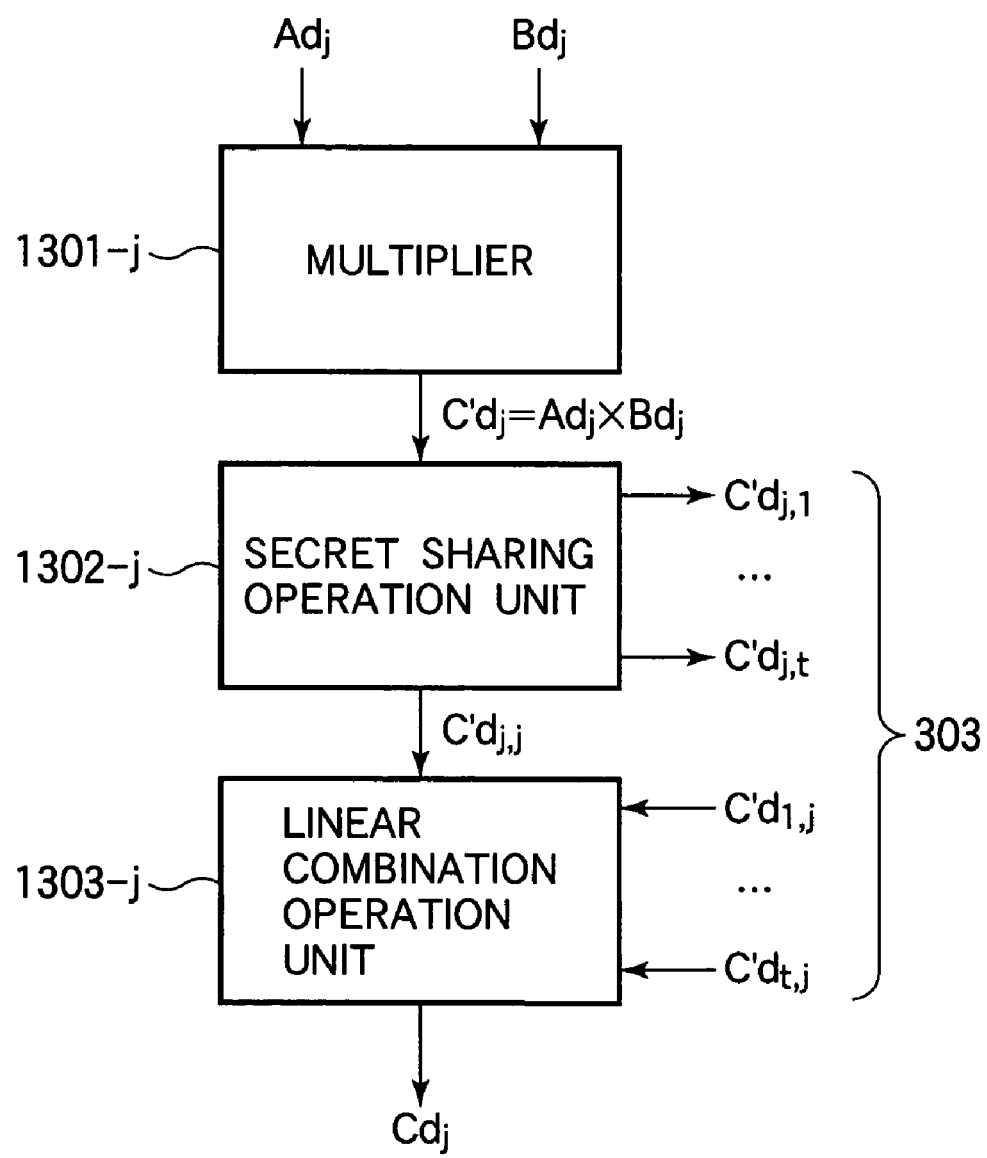
FIG. 16 is a block diagram illustrating the structure of a distributed multiplication unit in FIG. 15.

FIG. 16 is a block diagram illustrating the structure of the distributed multiplication units 1205-$j$-$a$ and 1206-$j$-$a$ ($j$=1, 2, ..., t, $a$=1, 2, ..., t) in FIG. 15. The distributed multiplication units 1205-$j$-$a$, 1206-$j$-$a$ will be described with reference to FIG. 16. The two inputs to each of the distributed multiplication units 1205-$j$-$a$, 1206-$j$-$a$ are denoted $Ad_j$ and $Bd_j$, and the output from each of them is denoted $Cd_j$. Each of the distributed multiplication units 1205-$j$-$a$ and 1206-$j$-$a$ comprises a multiplier 1301-$j$, a secret sharing operation unit 1302-$j$, and a linear combination operation unit 1303-$j$. The above-mentioned $Ad_j$ and $Bd_j$ are input to the multiplier 1301-$j$, the product output from the multiplier 1301-$j$ is input to the secret sharing operation unit 1302-$j$, and the output from the secret sharing operation unit 1302-$j$ is input to the linear combination operation unit 1303-$j$. The output of the linear combination operation unit 1303-$j$ becomes the output from each of the distributed multiplication units 1205-$j$-$a$ and 1206-$j$-$a$.

The multiplier 1301-$j$ receives the values $Ad_j$ and $Bd_j$ input to each of the distributed multiplication units 1205-$j$-$a$ and 1206-$j$-$a$, and multiplies the received data as shown in the following equation (34).

$$C'd_j = Ad_j \times Bd_j \tag{34}$$

This result $C'd_j$ is output to the secret sharing operation unit 1302-$j$.

The secret sharing operation unit 1302-$j$ has the same internal structure as the secret sharing operation unit 701-$j$ in FIG. 9 in the second embodiment, in which the input value is shared using the ($k'$, t) threshold secret sharing scheme and the generated shares are output. As described above, since distributed multiplication needs to be carried out in the third embodiment, the threshold $k'$ in the secret sharing scheme must satisfy the following condition computed with normal integers and fractions in the real number field, not in the finite field GF(q).

$$k' \leq (t+1)/2 \tag{29}$$

In the third embodiment, since the member IDs $m'_1, m'_2, \ldots, m'_t$ used for generating the shares are kept secret, the temporary member IDs $d_1, d_2, \ldots, d_t$ are used. To generate the shares, first, polynomials of degree $k'-1$ are generated using the value $C'd_j$ input to the secret sharing operation unit 1302-$j$ as shown in the equation (35) below, in which $R_3 d_{j,1}, R_3 d_{j,2}, \ldots, R_3 d_{j,k'-1}$ are $k'-1$ random elements selected from the finite field GF(q).

$$f_3 d_j(x) = C'd_j + R_3 d_{j,1} x + R_3 d_{j,2} x^2 + \ldots + R_3 d_{j,k'-1} x^{k'-1} \tag{35}$$

The share $C'd_{j,p}$ distributed to the member holding temporary member ID $d_p$ ($p$=1, 2, ..., t) is calculated using the above equation (35) as shown in the following equation (36).

$$\begin{aligned} C'd_{j,p} &= f_3 d_j(d_p) \\ &= C'd_j + R_3 d_{j,1}(d_p) + R_3 d_{j,2}(d_p)^2 + \ldots + R_3 d_{j,k'-1}(d_p)^{k'-1} \end{aligned} \tag{36}$$

The share $C'd_{j,j}$ the secret sharing operation unit 1302-$j$ generated itself is output to the linear combination operation unit 1303-$j$, and the other shares $C'd_{j,p}$ ($p$=1, 2, ..., t, $p \neq j$) are distributed to the other members' linear combination operation units 1303-$p$ ($p$=1, 2, ..., t, $p \neq j$) through the secure channels 303.

The linear combination operation unit 1303-$j$ has the same internal structure as the linear combination operation unit 702-$j$ in FIG. 9 in the second embodiment. In the third embodiment, however, since the member IDs $m'_1, m'_2, \ldots, m'_t$ necessary for the calculation are secret, the temporary member IDs $d_1, d_2, \ldots, d_t$ are used instead. As described above, the linear combination operation unit 1303-$j$ receives the share $C'd_{j,j}$ from the secret sharing operation unit 1302-$j$. In addition, it receives the shares $C'd_{1,j}, C'd_{2,j}, \ldots, C'd_{p,j}$ distributed from the other members' secret sharing operation units $1302\text{-}i$ ($i=1, 2, \ldots, t, i\neq j$) through the secure channels 303. The linear combination operation unit $1303\text{-}j$ then carries out a calculation using these t shares $C'd_{p,j}$ ($p=1, 2, \ldots, t$) as shown in the following equations (37) and (38), and outputs $Cd_j$.

$$Cd_j = rd_1 C' d_{1,j} + rd_2 C' d_{2,j} + \ldots + rd_t C' d_{t,j} \quad (37)$$

$$= \sum_{p=1}^{t} rd_p C' d_{p,j}$$

$$rd_p = (d_1 \times d_2 \times \ldots \times d_t / d_p) / ((d_1 - d_p) \times (d_2 - d_p) \times \ldots \times \quad (38)$$

$$(d_{p-1} - d_p) \times (d_{p+1} - d_p) \times \ldots \times (d_t - d_p))$$

$$= \prod_{\substack{i=1 \\ i \neq p}}^{t} d_i / (d_i - d_p)$$

The value $rd_p$ in the above equation (38) can be calculated because the temporary IDs $d_1, d_2, \ldots, d_t$ are revealed and thus known.

Figure 17:
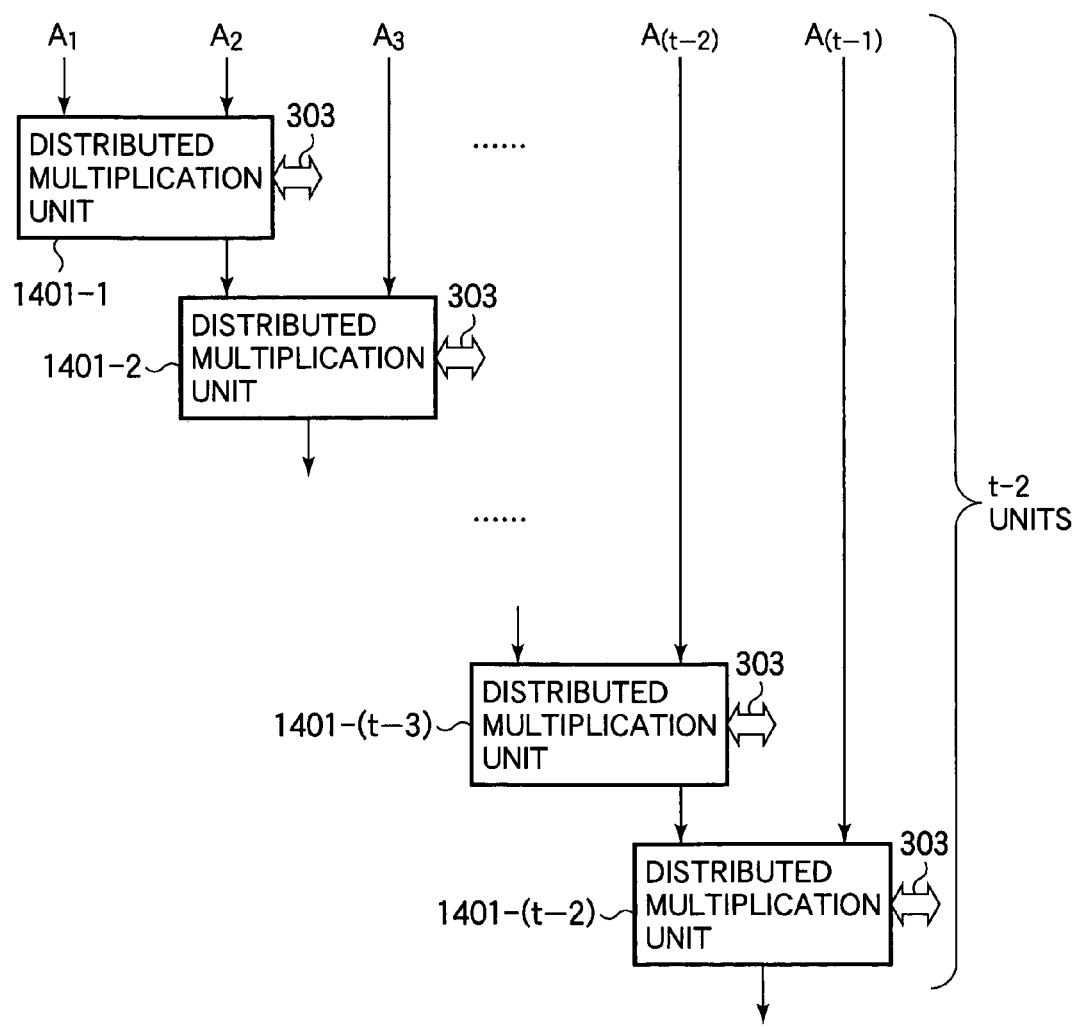
FIG. 17 is a block diagram illustrating the structure of another distributed multiplication unit in FIG. 15.

FIG. 17 is a block diagram illustrating the structure of the distributed multiplication units $1202\text{-}j\text{-}a$ and $1204\text{-}j\text{-}a$ ($j=1, 2, \ldots, t, a=1, 2, \ldots, t$) in FIG. 15. The distributed multiplication units $1202\text{-}j\text{-}a$, $1204\text{-}j\text{-}a$ will be described with reference to FIG. 17. The t−1 inputs to each of the distributed multiplication units $1202\text{-}j\text{-}a$ and $1204\text{-}j\text{-}a$ will be denoted $A_1, A_2, \ldots, A_{t-1}$. Each of the distributed multiplication units $1202\text{-}j\text{-}a$ and $1204\text{-}j\text{-}a$ comprises t−2 distributed multiplication units $1401\text{-}i$ ($i=1, 2, \ldots, t-2$). The t−2 distributed multiplication units $1401\text{-}i$ are staged so that the output from distributed multiplication unit $1401\text{-}i$ ($i=1, 2, \ldots, t-2$) becomes one of the inputs to the next distributed multiplication unit $1401\text{-}(i+1)$. Two inputs $A_1, A_2$ to the distributed multiplication unit $1202\text{-}j\text{-}a$ or $1204\text{-}j\text{-}a$ are input to distributed multiplication unit $1401\text{-}1$, and the output from distributed multiplication unit $1401\text{-}1$ is input to distributed multiplication unit $1401\text{-}2$ together with input $A_3$ to the distributed multiplication units $1202\text{-}j\text{-}a$ or $1204\text{-}j\text{-}a$. Distributed multiplication unit $1401\text{-}i$ ($i=2, 3, \ldots, t-2$) receives the output from distributed multiplication unit $1401\text{-}(i-1)$ and input $A_{(i+1)}$ to the distributed multiplication units $1202\text{-}j\text{-}a$ or $1204\text{-}j\text{-}a$, and the output from distributed multiplication unit $1401\text{-}i$ ($i=1, 2, \ldots, t-3$) is input to distributed multiplication unit $1401\text{-}(i+1)$. Finally, the output of distributed multiplication unit $1401\text{-}(t-2)$ becomes the output from the distributed multiplication unit $1202\text{-}j\text{-}a$ or $1204\text{-}j\text{-}a$.

The distributed multiplication units $1401\text{-}i$ ($i=1, 2, \ldots, t-2$) have the same structure as the distributed multiplication units $1205\text{-}j\text{-}a$, $1206\text{-}j\text{-}a$ described above, and communicate with the other members' distributed multiplication units $1401\text{-}i$ ($i=1, 2, \ldots, t-2$) through the secure channels 303.

Figure 18:
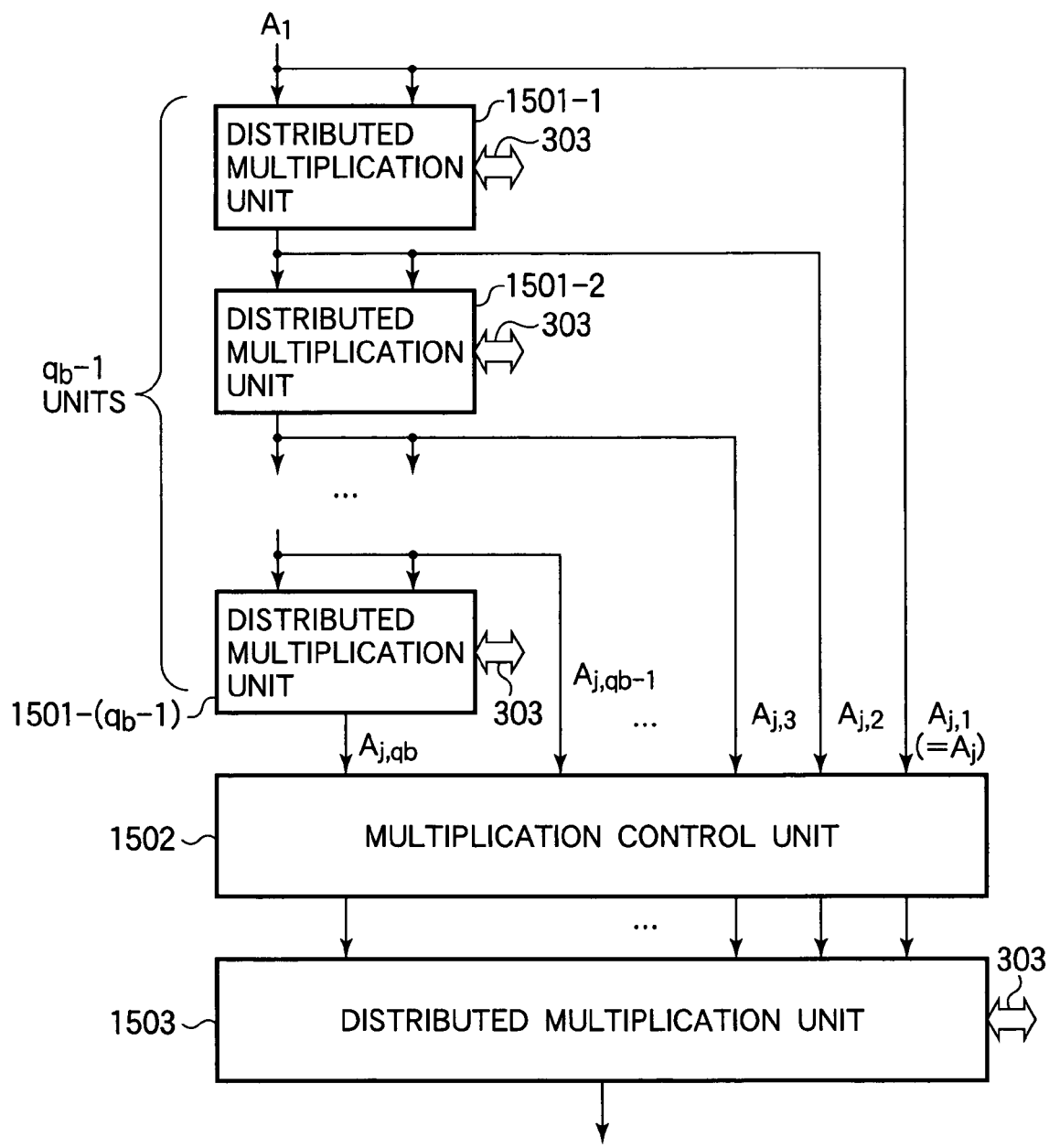
FIG. 18 is a block diagram illustrating the structure of the distributed inverse element calculation unit in FIG. 15.

FIG. 18 is a block diagram illustrating the structure of the distributed inverse element calculation unit $1203\text{-}j\text{-}a$ ($j=1, 2, \ldots, t, a=1, 2, \ldots, t$) in FIG. 15. The distributed inverse element calculation unit $1203\text{-}j\text{-}a$ will be described with reference to FIG. 18. The distributed inverse element calculation unit $1203\text{-}j\text{-}a$ comprises $q_b-1$ distributed multiplication units $1501\text{-}i$ ($i=1, 2, \ldots, q_b-1$) with two inputs each, a multiplication control unit 1502, and a distributed multiplication unit 1503 with $q_b$ inputs. The value $q_b$ is obtained by subtracting 2 from the order q of the finite field GF(q) used in the third embodiment and then taking the logarithm to base two as in the following equation (39):

$$q_b = \mathrm{ceil}((\log_2(q-2)) \quad (39)$$

where ceil(X) indicates the ceiling computation in which a number X is rounded up to the least integer equal to or greater than X, and $\log_2(X)$ indicates the logarithm of X to base two. The above equation (39) is computed with normal integers and real numbers, not in the finite field GF(q). If the input to the distributed inverse element calculation unit $1203\text{-}j\text{-}a$ is denoted $A_j$ and the secret, which is reconstructed by the t values $A_p$ ($p=1, 2, \ldots, t$) comprising the input $A_j$ and the inputs $A_p$ ($p=1, 2, \ldots, t, p\neq j$) to the other members' distributed inverse element calculation units $1203\text{-}p\text{-}a$, is denoted A, the distributed inverse element calculation unit $1203\text{-}j\text{-}a$ calculates and outputs a share $B_j$ of the inverse element of $B=A^{-1}$ in the finite field GF(q), which becomes the share obtained by the member holding temporary member ID $d_j$. From the properties of finite fields, the following equation (40) is satisfied by any element A in the finite field GF(q).

$$A^{-1} = A^{q-2} \quad (40)$$

Therefore, in the distributed inverse element calculation unit $1203\text{-}j\text{-}a$, $A_j$ is raised to the (q−2)-th power by distributed multiplication.

The $q_b-1$ distributed multiplication units $1501\text{-}i$ ($i=1, 2, \ldots, q_{b-1}$) are cascaded so that the output from distributed multiplication unit $1501\text{-}i$ becomes both inputs of the next distributed multiplication unit $1501\text{-}(i+1)$. The input $A_j$ to the distributed inverse element calculation unit $1203\text{-}j\text{-}a$ is input to the distributed multiplication unit $1501\text{-}1$, and the output from the distributed multiplication unit $1501\text{-}1$ is input to the next distributed multiplication unit $1501\text{-}2$. The input $A_j$ to the distributed inverse element calculation unit $1203\text{-}j\text{-}a$ and the outputs from distributed multiplication units $1501\text{-}i$ ($i=1, 2, \ldots, q_b-1$), which number $q_b$ values in all, are input to the multiplication control unit 1502, and values output from the multiplication control unit 1502 are input to distributed multiplication unit 1503. Finally, the output of the distributed multiplication unit 1503 becomes the output from the distributed inverse element calculation unit $1203\text{-}j\text{-}a$.

The distributed multiplication units $1501\text{-}i$ ($i=1, 2, \ldots, q_b-1$) have the same structure as the distributed multiplication units $1205\text{-}j\text{-}a$, $1206\text{-}j\text{-}a$ described above, and communicate with the other members' distributed multiplication units $1501\text{-}i$ ($i=1, 2, \ldots, q_b-1$) via secure channels 303 similar to the ones in FIG. 3.

The multiplication control unit 1502 receives the input $A_j$ to the distributed inverse element calculation unit $1203\text{-}j\text{-}a$ and the outputs from the distributed multiplication units $1501\text{-}i$ ($i=1, 2, \ldots, q_b-1$), $q_b$ values in all, and outputs each of the $q_b$ input values either as is or as the unit element (1), according to the following rule. If the output from distributed multiplication unit $1501\text{-}i$ ($i=1, 2, \ldots, q_b-1$) is denoted $A_{j,i+1}$, $q_b$ values $A_{j,i}$ ($i=1, 2, \ldots, q_b$) are input to the multiplication control unit 1502, where $A_{j,1}=A_j$. Next, q−2 is expressed in binary form. Since q−2 is expressed as a binary number with $q_b$ bits, the bits are denoted, from the most significant bit to the least significant bit, $b_{q b}, b_{(q b-1)}, \ldots, b_2, b_1$. If $b_i$ ($i=1, 2, \ldots, q_b$) is one, then the multiplication control unit 1502 outputs the value $A_{j,i}$; if $b_i$ is zero, then the multiplication control unit 1502 outputs one (1) instead. The $q_b$ output values are input to distributed multiplication unit 1503.

Distributed multiplication unit 1503 has the same structure as the distributed multiplication units $1202\text{-}j\text{-}a$, $1204\text{-}j\text{-}a$ described above, except for the number of distributed multiplication units: it has $q_b-1$ units instead of $t-2$. Distributed multiplication unit 1503 also has secure channels 303 over which it communicates with the other members' distributed multiplication units 1503.

Operation of the Third Embodiment

Figure 19:
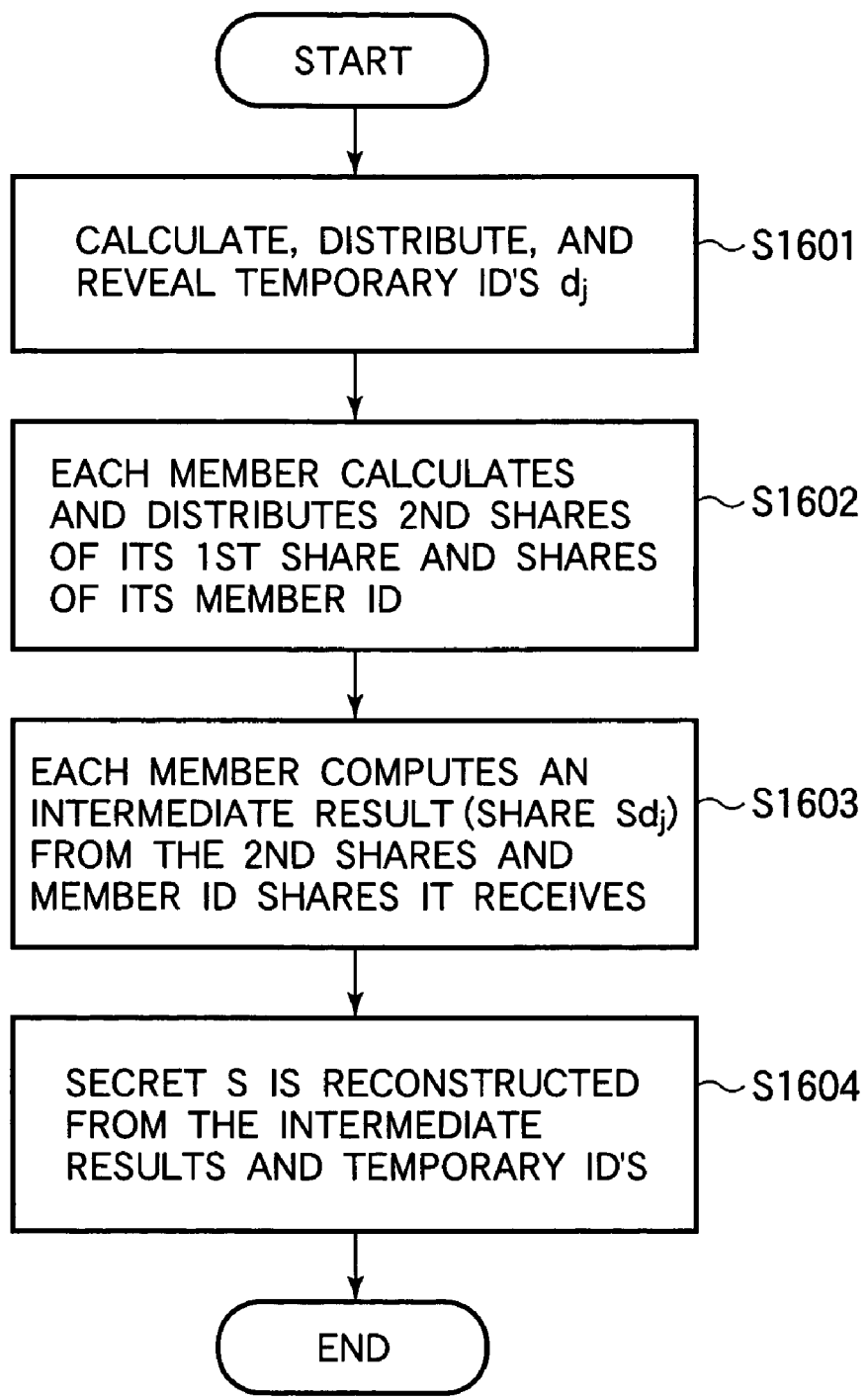
FIG. 19 is a flowchart illustrating the secret reconstruction method according to the third embodiment.

FIG. 19 is a flowchart illustrating the operation of the secret reconstruction method according to the third embodiment. The member IDs of the t collected members and the shares held secretly by the members will again be denoted $m'_1$, $m'_2, \ldots, m'_t$, and $Xm'_1, Xm'_2, \ldots, Xm'_t$, respectively.

As shown in FIG. 19, first the temporary member IDs $d_1, d_2, \ldots, d_t$ used for the sharing operation are generated and assigned to the collected members, and are distributed and revealed to the members (step S1601). Step S1601 indicates the operation of the temporary ID generator 901 in FIG. 12.

Next, the first shares and member IDs held secretly by the members are shared using the $(k', t)$ threshold secret sharing scheme and the resulting shares are distributed to the other members (step S1602). Step S1602 indicates the operation of the secret sharing operation unit 1001-$j$ in FIG. 13, in which the share $Xm'_j$ ($j=1, 2, \ldots, t$) held secretly by the member holding member ID $m'_j$ is shared using the above equation (29'), and the second share $Xm'_{j,p}$ ($p=1, 2, \ldots, t$) calculated by the above equation (30) is distributed to the member holding temporary member ID $d_p$. Similarly, the member ID $m'_j$ is shared using the above equation (31), and the share $m'_{j,p}$ calculated from the above equation (32) is distributed to the member holding temporary member ID $d_p$.

Next, each member calculates a share of the original secret information S using: the revealed temporary member IDs of the collected members; a second share of its own first share and a share of its own member ID, both of which it generated itself; and second shares of other members' first shares and shares of the other members' IDs, which it received from the other members (step S1603). Step S1603 indicates the operation of the distributed processor 1002-$j$ in FIG. 13, in which the member holding temporary member ID $d_j$ ($j=1, 2, \ldots, t$) carries out the operation for reconstructing the secret information given by the above equation (3) without revealing its member ID $m'_j$ ($j=1, 2, \ldots, t$) and first share $Xm'_j$, and finally obtains a share $Sd_j$ of the secret information S as an intermediate result from which the original secret information S can be reconstructed.

Finally, the original secret information S is reconstructed from the shares $Sd_j$ calculated by the members in step S1603 and the temporary member IDs (step S1604). Step S1604 indicates the operation of the secret reconstruction operation unit 903 in FIG. 12, in which the original secret information S is obtained by the computation in the equation (27) on the temporary member IDs $d_j$ and the results $Sd_j$ by the members holding temporary member IDs $d_j$ in step S1603.

Effects of the Third Embodiment

As described above, according to the third embodiment, as in the first and second embodiments, the original secret information S can be reconstructed without revealing the shares held secretly by the collected members to any other member or any third party. Accordingly, the shares held by the members can be reused the next time the secret information is reconstructed. In addition, these effects can be obtained without the need for a central secret reconstruction facility.

The third embodiment differs from the first embodiment in that, since it uses a $(k, n)$ threshold secret sharing scheme, the original secret information S can be reconstructed by a collection of k members ($k \leq n$), not necessarily requiring the participation of all n members.

The third embodiment differs from the second embodiment in that the secret information is reconstructed without revealing either the shares held by the members or the member IDs, so that all of the collected members can remain anonymous.

Furthermore, in the third embodiment, if a member (a device with computing and memory facilities) not holding a share of the secret information S tries to participate in the reconstruction of the secret information S, the reconstruction will fail as in the first and second embodiments. Therefore, the third embodiment provides an authentication scheme that can determine whether all members in a group comprising a plurality of collected members are valid members or not, thereby determining whether they are members to whom the shares of the secret information S were previously distributed or not. Furthermore, in the third embodiment, since the first shares are reusable as described above, the authentication scheme can be used repeatedly without updating the first shares of the secret information S. The authentication scheme is also very robust under attack by an attacker who pretends to be a member by wiretapping because the information exchanged among the collected members varies every time the authentication is carried out or the original secret information S is reconstructed.

In particular, the third embodiment has the following two effects: (1) it is not necessary to collect all members holding the shares of the original secret information; it suffices to collect a number of members equal to or greater than a threshold value; and (2) anonymity is preserved. Therefore, it is possible to authenticate all members in a group comprising a plurality of collected members as valid members without identifying the collected members.

The authentication scheme described above has features that cannot be achieved by simply combining the secret reconstruction features of the secret sharing scheme and the shared operation features of the multiparty protocol. As described in the first and second embodiments, the above authentication scheme makes use of the original secret information S as registered information that is compared with the reconstruction result to decide if the authentication is valid or not, so it is not necessary for the original secret information S to be kept secret from the members.

Fourth Embodiment

General Description

As the multiparty protocol used to reconstruct the original secret information S in the third embodiment is a multiparty protocol of the first type described above, any two of the collected members communicate over a secure channel that does not reveal the content of their communication to any of the other members. In contrast, the fourth embodiment employs a multiparty protocol of the second type described above: the collected member communicate over oblivious transfer channels as well as over secure channels. The extra communication channels enable the fourth embodiment to provide effects similar to those of the third embodiment while eliminating the restriction on the threshold $k'$ of the $(k', t)$ threshold secret sharing scheme used in the third embodiment.

In the third embodiment, the threshold k' was restricted by the following inequality (29).

$$k' \leq (t+1)/2 \quad (29)$$

In the fourth embodiment, the range of the threshold k' can be widened to $k' \leq t$.

Structure of the Fourth Embodiment

The structure embodying the secret reconstruction method of the fourth embodiment (a secret reconstruction system according to the fourth embodiment) is similar to that of the third embodiment, except that since the fourth embodiment employs the aforementioned second type of multiparty protocol, there is a difference in the structure of distributed multiplication units 1205-*j*-*a*, 1206-*j*-*a* in FIG. 16. In the following description of the fourth embodiment, only the part of the structure that differs from the third embodiment, namely, the structure of the distributed multiplication units 1205-*j*-*a*, 1206-*j*-*a*, will be described.

Figure 20:
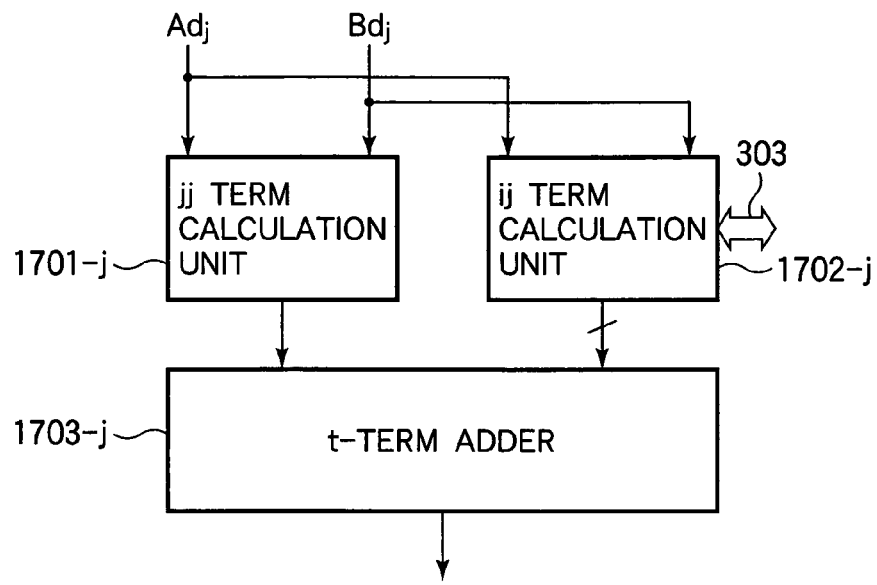
FIG. 20 is a block diagram illustrating the structure of a distributed multiplication unit used in a fourth embodiment of the invention.

FIG. 20 is a block diagram illustrating the structure of the distributed multiplication units 1205-*j*-*a*, 1206-*j*-*a* used in the secret reconstruction method according to the fourth embodiment of the invention. It is this structure, and the use of the second type of multiparty protocol described above, that eliminates the restriction shown in the above inequality (29) and enlarges the range of thresholds k' to $k' \leq t$.

The structure of the distributed multiplication units 1205-*j*-*a*, 1206-*j*-*a* in the fourth embodiment will now be described. As shown in FIG. 20, each of the distributed multiplication units 1205-*j*-*a*, 1206-*j*-*a* comprises a jj-term calculation unit 1701-*j*, an ij-term calculation unit 1702-*j* and a t-term adder 1703-*j*. The two inputs $Ad_j$, $Bd_j$ to each of the distributed multiplication units 1205-*j*-*a*, 1206-*j*-*a* are input to both the jj-term calculation unit 1701-*j* and the ij-term calculation unit 1702-*j*. The outputs from the jj-term calculation unit 1701-*j* and ij-term calculation unit 1702-*j* are input to the t-term adder 1703-*j*. The output of the t-term adder 1703-*j* becomes the output from the distributed multiplication unit 1205-*j*-*a* or 1206-*j*-*a*.

The jj-term calculation unit 1701-*j* receives the two inputs $Ad_j$, $Bd_j$ to the distributed multiplication unit 1205-*j*-*a* or 1206-*j*-*a*, multiplies them, multiplies the result by a coefficient $rd_j$ calculated from the following equation (41), and outputs the final result to the t-term adder 1703-*j*.

$$rd_j = (d_1 \times d_2 \times \ldots \times d_t / d_j) / ((d_1 - d_j) \times (d_2 - d_j) \times \ldots \times \\ (d_{j-1} - d_j) \times (d_{j+1} - d_j) \times \ldots \times (d_t - d_j)) \\ = \prod_{\substack{i=1 \\ i \neq j}}^{t} d_i / (d_i - d_j) \quad (41)$$

More specifically, the jj-term calculation unit 1701-*j* calculates $Ad_j \times Bd_j$, then calculates $rd_j(Ad_j \times Bd_j)$ using the coefficient $rd_j$ obtained from the above equation (41), and finally outputs the result.

The ij-term calculation unit 1702-*j* receives the two inputs $Ad_j$, $Bd_j$ to the distributed multiplication unit 1205-*j*-*a*, 1206-*j*-*a* and performs a calculation involving both $Ad_j$ and $Bd_j$ and information received from the other members through the secure channels 303 to obtain the result of what is in effect a multiplication by the other members' values. Thus while the member having temporary member ID $d_j$ directly performs the multiplication operation $Ad_j \times Bd_j$ in the ii-term calculation unit 1701-*j*, in the ij-term calculation unit 1702-*j* it performs an operation analogous to multiplication of $Ad_j$ and $Bd_j$ by the values input to the members having member IDs $d_j$ (j=1, 2, . . . , t, p≠j) to obtain results analogous to $Ad_j \times Bd_p$ and $Ad_p \times Bd_j$.

The operation performed by the ij-term calculation unit 1702-*j* satisfies the following equations (42) and (42').

$$Ad_j \times Bd_p = Dd_j + Dd_p \quad (42)$$

$$Ad_p \times Bd_j = Ed_j + Ed_p \quad (42')$$

The member having temporary member ID $d_j$ can accordingly hold $Dd_j$ and $Ed_j$, and the member having temporary member ID $d_p$ can hold $Dd_p$ and $Ed_p$.

Figure 21:
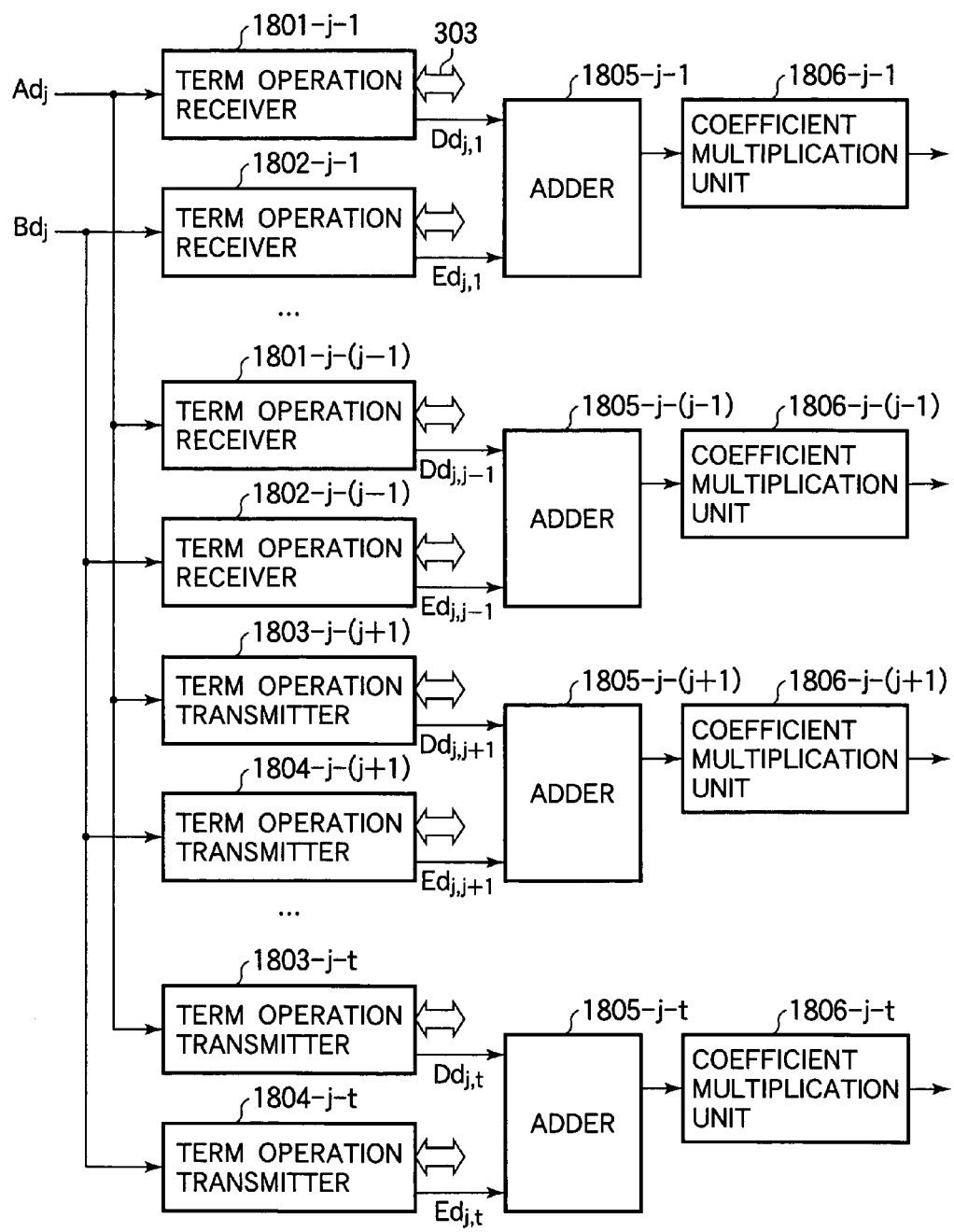
FIG. 21 is a block diagram illustrating the structure of the ij-term calculation unit in FIG. 20.

FIG. 21 is a block diagram illustrating the structure of the ij-term calculation unit 1702-*j* in FIG. 20. The ij-term calculation unit 1702-*j* will be described with reference to FIG. 21. The ij-term calculation unit 1702-*j* comprises: j−1 term operation receivers 1801-*j*-*p* (p=1, 2, . . . , j−1); j−1 term operation receivers 1802-*j*-*p* (P=1, 2, . . . , j−1); t−j term operation transmitters 1803-*j*-*p* (p=j+1, j+2, . . . , t); t−j term operation transmitters 1804-*j*-*p* (p=j+1, j+2, . . . , t); t−1 adders 1805-*j*-*p* (p=1, 2, . . . , t, p≠j); and t−1 coefficient multiplication units 1806-*j*-*p* (p=1, 2, . . . , t, p≠j).

One of the two inputs to the ij-term calculation unit 1702-*j* is input to term operation receivers 1801-*j*-*p* (p=1, 2, . . . , j−1) and term operation transmitters 1803-*j*-*p* (p=i+1, j+2, . . . , t), and the other is input to term operation receivers 1802-*j*-*p* (P=1, 2, . . . , j−1) and term operation transmitters 1804-*j*-*p* (p=j+1, j+2, . . . , t). The outputs from term operation receivers 1801-*j*-*p* and 1802-*j*-*p* (p=1, 2, . . . , j−1) are input to adders 1805-*j*-*p* (p=1, 2, . . . , j−1); the outputs from term operation transmitters 1803-*j*-*p* and 1804-*j*-*p* (p=j+1, j+2, . . . , t) are input to adders 1805-*j*-*p* (p=j+1, j+2, . . . , t). The outputs from the adders 1805-*j*-*p* (p=1, 2, . . . , t, p≠j) are input to the coefficient multiplication units 1806-*j*-*p* (p=1, 2, . . . , t, p≠j).

The outputs (t−1 outputs in total) from the coefficient multiplication units 1806-*j*-*p* (p=1, 2, . . . , t, p≠j) become the outputs from the ij-term calculation unit 1702-*j*. The term operation receivers 1801-*j*-*p*, 1802-*j*-*p* (p=1, 2, . . . , j−1) and term operation transmitters 1803-*j*-*p*, 1804-*j*-*p* (p=j+1, j+2, . . . , t) exchange information with the other members via secure channels 303 similar to the ones in FIG. 3, and, as described above, essentially carry out multiplication operations with the values of the other members having member IDs $d_p$ (p=1, 2, . . . , t, p≠j) to obtain results not exactly equal to, but equivalent to, $Ad_j \times Bd_p$ and $Ad_p \times Bd_j$. In this case, an oblivious transfer is used so that the values $Ad_j$ and $Bd_j$ held by the member with ID $d_j$ and the values $Ad_p$ and $Bd_p$ held by the other members are kept secret. An oblivious transfer is a transmission method in which M information values are encoded (encrypted) at the transmitter and sent to the receiver, but only one of them can be received, or successfully decoded, by the receiver and the transmitter cannot know which value the receiver has received, or successfully decoded. In this embodiment, the oblivious transfer is based on the difficulty of computing discrete logarithms modulo q.

Whether a member j has term operation receivers 1801-*j*-*p*, 1802-*j*-*p* (p=1, 2, . . . , j−1) or term operation transmitters 1803-*j*-*p*, 1804-*j*-*p* (p=j+1, j+2, . . . , t) depends on the value of j. For j=1, for example, member j does not have term operation receivers, but has 2×(t−1) term operation transmitters. For j=t, member j does not have term operation transmitters, but has 2×(t−1) term operation receivers. Information is transmitted and received among the members so that the information from the term operation transmitters 1803-*j*-*p*, 1804-*j*-*p* (p=j+1, j+2, . . . , t) of the member having temporary member ID $d_j$ is transferred through the secure channels 303 to the term operation receivers 1802-*p-j*, 1801-*p-j* of the member having temporary member ID $d_p$. This will be described later with reference to FIGS. 22 and 23.

Adder 1805-*j-p* (p=1, 2, ..., t, p≠j) receives the outputs from term operation receivers 1801-*j-p*, 1802-*j-p* (p=1, 2, ..., j−1) or term operation transmitters 1803-*j-p*, 1804-*j-p* (p=j+1, j+2, ..., t), adds these outputs, and outputs the sum to coefficient multiplication unit 1806-*j-p* (p=1, 2, ..., t, p≠j). If the output from term operation receiver 1801-*j-p* or term operation transmitter 1803-*j-p* is denoted $Dd_{j,p}$ and the output from term operation receiver 1802-*j-p* or term operation transmitter 1804-*j-p* is denoted $Ed_{j,p}$, then adder 1805-*j-p* calculates $Dd_{j,p}+Ed_{j,p}$ and outputs the result to the coefficient multiplication unit 1806-*j-p*.

Coefficient multiplication unit 1806-*j-p* (p=1, 2, ..., t, p≠j) receives the output from adder 1805-*j-p* (p=1, 2, ..., t, p≠j), multiplies it by a coefficient calculated from the following equation (43), and outputs the result.

$$rd_p = (d_1 \times d_2 \times \ldots \times d_t / d_p) / ((d_1 - d_p) \times (d_2 - d_p) \times \ldots \times \quad (43)$$
$$(d_{p-1} - d_p) \times (d_{p+1} - d_p) \times \ldots \times (d_t - d_p))$$
$$= \prod_{\substack{i=1 \\ i \neq p}}^{t} d_i / (d_i - d_p)$$

More specifically, if the output from adder 1805-*j-p* is denoted $Fd_{j,p}$, then coefficient multiplication unit 1806-*j-p* calculates $rd_p \times Fd_{j,p}$ and outputs the result. The outputs (t−1 outputs in total) from the coefficient multiplication units 1806-*j-p* (p=1, 2, ..., t, p≠j) become the outputs of the ij-term calculation unit 1702-*j*.

Figure 22:
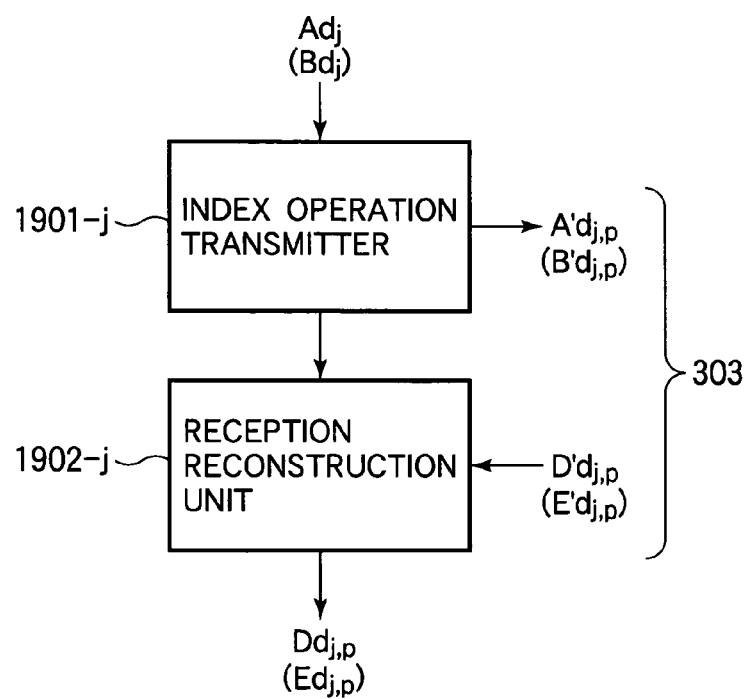
FIG. 22 is a block diagram illustrating the structure of the term operation receiver in FIG. 21.

Next, the term operation receivers 1801-*j-p*, 1802-*j-p* (p=1, 2, ..., j−1) will be described with reference to FIG. 22. Each of the term operation receivers 1801-*j-p*, 1802-*j-p* (p=1, 2, ..., j−1) comprises an index operation transmitter 1901-*j* and a reception reconstruction unit 1902-*j*. As described above, term operation receiver 1801-*j-p* receives one of the two inputs to the ij-term calculation unit 1702-*j* and term operation receiver 1802-*j-p* receives the other input. The inputs to these term operation receivers 1801-*j-p* and 1802-*j-p* will now be denoted $Ad_j$ and $Bd_j$, respectively. Since term operation receivers 1801-*j-p* and 1802-*j-p* have the same internal structure, the following descriptions will be given for term operation receiver 1801-*j-p*, and information pertaining to the term operation receiver 1802-*j-p* will be given in parentheses. The input to the term operation receiver 1801-*j-p* (or 1802-*j-p*) is input to the index operation transmitter 1901-*j*. The output from the index operation transmitter 1901-*j* is input to the reception reconstruction unit 1902-*j*. The output of the reception reconstruction unit 1902-*j* becomes the output from the term operation receiver 1801-*j-p* (or 1802-*j-p*).

The index operation transmitter 1901-*j* receives the input $Ad_j$ (or $Bd_j$) to the term operation receiver 1801-*j-p* (or 1802-*j-p*), calculates $A'd_{j,p}$ (or $B'd_{j,p}$) by the following equation (44) (or (44')), and transmits $A'd_{j,p}$ (or $B'd_{j,p}$) to the term operation transmitter 1804-*p-j* (or 1803-*p-j*) of the members having temporary member IDs $d_p$ (p=1, 2, ..., j−1) over secure channels 303 similar to the ones in FIG. 3.

$$A'd_{j,p}=g^{rA_{j,p}}h^{Ad_j} \quad (44)$$

$$B'd_{j,p}=g^{rB_{j,p}}h^{Bd_j} \quad (44')$$

In the above equations (44) and (44'), h and g are two generators in the finite field and $rA_{j,p}$, $rB_{j,p}$ are random elements selected from the finite field. The index operation transmitter 1901-*j* outputs the value $rA_{j,p}$ (or $rB_{j,p}$) used in the above equation (44) (or (44')) to the reception reconstruction unit 1902-*j*.

The reception reconstruction unit 1902-*j* receives q inputs of information from the term operation transmitter 1804-*p-j* (or 1803-*p-j*) of the members holding temporary member IDs $d_p$ (p=1, 2, ..., j−1), where q is the order of the finite field GF(q), and calculates the equation (45) (or (45')) below using the $(Ad_j+1)$-th information $D'd_{j,p}$ (or $(Bd_j+1)$-th information $E'd_{j,p}$) to obtain the final value $Dd_{j,p}$ (or $Ed_{j,p}$). The other received inputs of information appear as random numbers to the member holding temporary member ID $d_j$. It is assumed here that $D'd_{j,p}$ (or $E'd_{j,p}$) includes two information data values $D'_1 d_{j,p}$ and $D'_2 d_{j,p}$ (or $E'_1 d_{j,p}$ and $E'_2 d_{j,p}$).

$$Dd_{j,p}=D'_2 d_{j,p}/((D'_1 d_{j,p})^{rA_{j,p}}) \quad (45)$$

$$Ed_{j,p}=E'_2 d_{j,p}/((E'_1 d_{j,p})^{rB_{j,p}}) \quad (45')$$

The value $Dd_{j,p}$ (or $Ed_{j,p}$) calculated by the above equation (45) (or (45')) is output from the reception reconstruction unit 1902-*j* and becomes the output of the term operation receiver 1801-*j-p* (or 1802-*j-p*).

Figure 23:
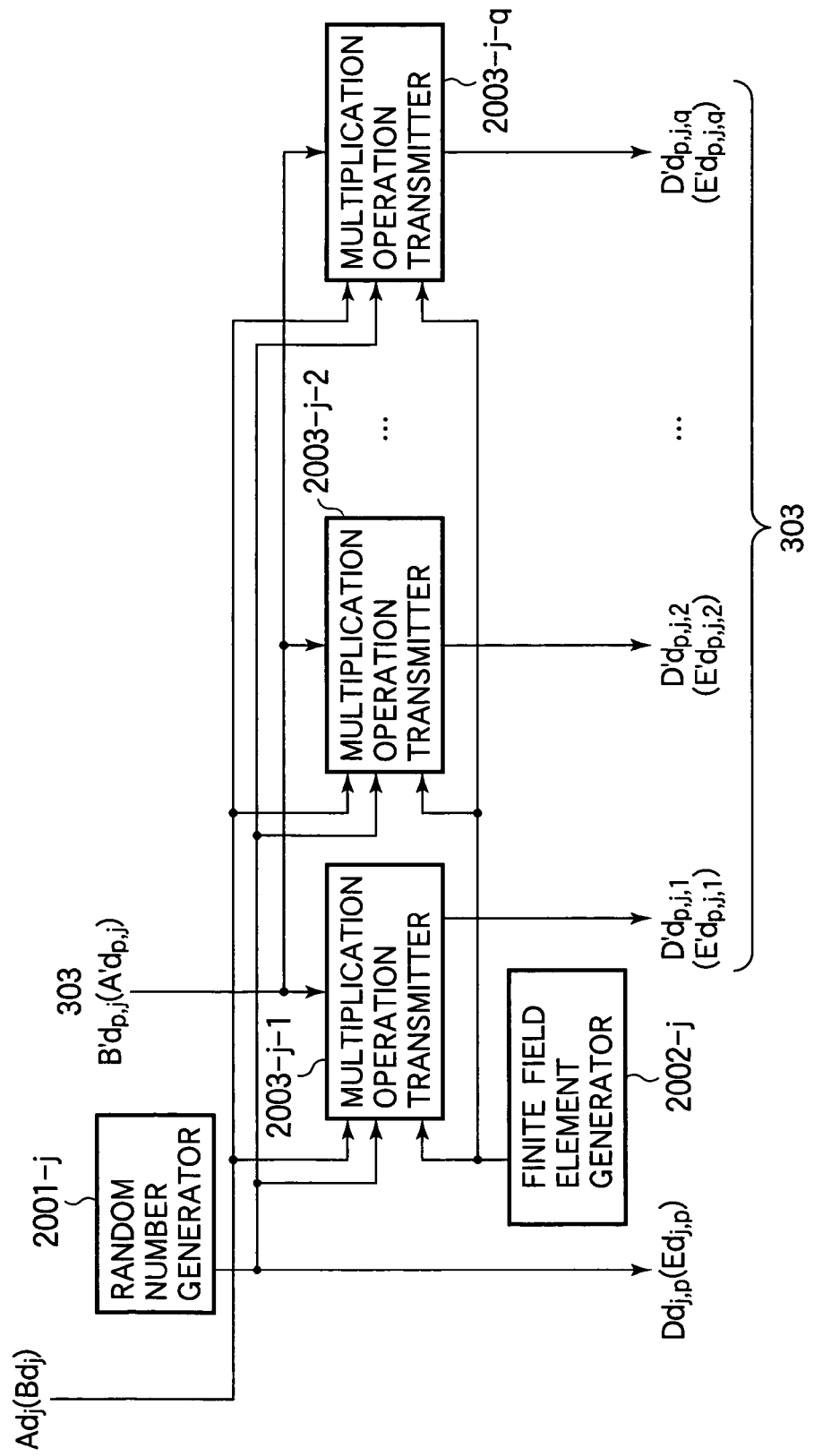
FIG. 23 is a block diagram illustrating the structure of the term operation transmitter in FIG. 21.

The structure of the term operation transmitters 1803-*j-p*, 1804-*j-p* (p=j+1, j+2, ..., t) will now be described with reference to FIG. 23. As shown in FIG. 23, each of the term operation transmitters 1803-*j-p*, 1804-*j-p* comprises a random number generator 2001-*j*, a finite field element generator 2002-*j*, and multiplication operation transmitters 2003-*j-a* (a=1, 2, ..., q). The input to the term operation transmitter 1803-*j-p* or 1804-*j-p* is input to the multiplication operation transmitters 2003-*j-a* together with outputs from the random number generator 2001-*j* and finite field element generator 2002-*j*. The output of the random number generator 2001-*j* becomes the output from the term operation transmitter 1803-*j-p* or 1804-*j-p*. The term operation transmitter 1803-*j-p* receives one of the two inputs to the ij-term calculation unit 1702-*j*, and the term operation transmitter 1804-*j-p* receives the other input. The inputs to the term operation transmitters 1803-*j-p* and 1804-*j-p* will now be denoted $Ad_j$ and $Bd_j$, respectively. Since the term operation transmitters 1803-*j-p* and 1804-*j-p* have the same internal structure, the following description will confined to the term operation transmitter 1803-*j-p* but information for the term operation transmitter 1804-*j-p* will be given in parentheses.

The random number generator 2001-*j* generates and outputs a random element in the finite field GF(q). The same random element is output to the multiplication operation transmitters 2003-*j-a* (a=1, 2, ..., q). As described above, the output from the random number generator 2001-*j* corresponds to the output from the term operation transmitter 1803-*j-p* (or 1804-*j-p*), where p=j+1, j+2, ..., t.

The finite field element generator 2002-*j* generates q values 0, 1, ..., q−1 in sequence in the finite field, and outputs each of them to each of the multiplication operation transmitters 2003-*j-a* (a=1, 2, ..., q) in sequence from a=1 to q. That is, it outputs 0 to multiplication operation transmitter 2003-*j*-1, 1 to multiplication operation transmitter 2003-*j*-2, i−1 to multiplication operation transmitter 2003-*j-i*, and q−1 to multiplication operation transmitter 2003-*j-q*.

Multiplication operation transmitter 2003-*j-a* (a=1, 2, ..., q) receives: the input $Ad_j$ (or $Bd_j$) to the term operation transmitter 1803-*j-p* (or 1804-*j-p*) (p=j+1, J+2, ..., t); the random element from the random number generator 2001-*j*; a corresponding finite field element a−1 from the finite field element generator 2002-*j*; and the output B'd$_{p,j}$ (or A'd$_{p,j}$) from the index operation transmitter 1901-*p* in the term operation receiver 1802-*p*-*j* (or 1801-*p*-*j*) of the other member holding temporary member ID d$_p$ (p=j+1, j+2, . . . , t) via a secure channel 303. It then performs a calculation on these received data and outputs the result. The q outputs from the multiplication operation transmitters 2003-*j*-*a* (a=1, 2, . . . , q) are transmitted over secure channels 303 to the term operation receiver 1802-*p*-*j* (or 1801-*p*-*j*) of the members holding temporary member IDs d$_p$ (p=j+1, j+2, . . . , t) in ascending order of a.

The output from the random number generator 2001-*j* will now be denoted Dd$_{j,p}$ (or Ed$_{j,p}$) and the value received through the secure channel 303 will again be denoted B'd$_{p,j}$ (or A'd$_{p,j}$) Multiplication operation transmitter 2003-*j*-*a* (a=1, 2, . . . , q) receives a−1 from the finite field element generator 2002-*j*. The multiplication operation transmitter 2003-*j*-*a* performs the calculation in the following equations (46) (or (46')), (47) (or (47')), and (48) (or (48')) to obtain D'd$_{p,j,a}$ (or E'd$_{p,j,a}$) which consists of the two values as shown in the above equation (45) (or (45')), and transmits these values over the secure channel 303 to the term operation receiver 1802-*p*-*j* (or 1801-*p*-*j*) of the members holding temporary member IDs d$_p$ (p=j+1, j+2, . . . , t) in order of a=1, 2, . . . , q.

$$D'_1 d_{p,j,a} = g_{kA}{}^a \tag{46}$$

$$E'_1 d_{p,j,a} = g^{kB_a} \tag{46'}$$

$$D'_2 d_{p,j,a} = (Ad_j(a-1) - Dd_{j,p})(B'd_{p,j}/h^a)^{kA_a} \tag{47}$$

$$E'_2 d_{p,j,a} = (Bd_j(a-1) - Ed_{j,p})(A'd_{p,j}/h^a)^{kB_a} \tag{47'}$$

$$D'd_{p,j,a} = (D'_1 d_{p,j,a}, D'_2 d_{p,j,a}) \tag{48}$$

$$E'd_{p,j,a} = (E'_1 d_{p,j,a}, E'_2 d_{p,j,a}) \tag{48'}$$

In the above equations, the values kA$_a$ (or kB$_a$) (a=1, 2, . . . , q) are q random elements in the finite field. If the term operation receiver 1801-*p*-*j* of the member holding temporary member ID d$_p$ (p=j+1, j+2, . . . , t) receives these outputs D'd$_{p,j,a}$ or E'd$_{p,j,a}$ via the secure channels 303, the member can decode the (a+1)-th value of the information D'd$_{p,j}$=D'd$_{p,j,a}$ (E'd$_{p,j}$=E'd$_{p,j,a}$) given by a=B'd$_{p,j}$ (or A'd$_{p,j}$) by using equation (45); the other received values of information appear as random numbers to the member holding temporary member ID d$_p$.

When the structures shown in FIGS. 20 to 23 are employed, the restriction given by the inequality (29) in the operation of the distributed multiplication units 1205-*j*-*a*, 1206-*j*-*a* can be eliminated, thereby widening the range of thresholds k' to k'≦t.

Operation of the Fourth Embodiment

The operation of the secret reconstruction method according to the fourth embodiment is substantially identical to that of the third embodiment, shown in the flowchart in FIG. 19. There is, however, a difference in the operation in step S1603 in FIG. 19. In the third embodiment, the distributed multiplication units 1205-*j*-*a*, 1206-*j*-*a* used for the calculation in step S1603 perform computations with the structure shown in FIG. 16, whereas in the fourth embodiment, they perform computations with the structure shown in FIG. 20.

Effects of the Fourth Embodiment

As described above, according to the fourth embodiment, as in the first to third embodiments, the original secret information S can be reconstructed without revealing the shares held secretly by the collected members to any other member or any third party. Accordingly, the shares held by the members can be reused the next time the secret information is reconstructed. In addition, these effects can be obtained without the need for a central secret reconstruction facility.

Further, in the fourth embodiment, in addition to obtaining the same effects as in the third embodiment, the following restriction of the threshold k' of the (k', t) threshold secret sharing scheme used for the sharing operation in the third embodiment can be eliminated:

$$k' \leq (t+1)/2 \tag{29}$$

whereby the range of thresholds k' can be widened to k'≦t.

Fifth Embodiment

General Description

In the above third embodiment, the distributed inverse element calculation unit 1203-*j*-*a* (j=1, 2, . . . , t, a=1, 2, . . . , t) shown in FIG. 15 comprises q$_b$−1 distributed multiplication units 1501 as shown in FIG. 18. In the fifth embodiment described below, the number of distributed multiplication units 1501 in the distributed inverse element calculation unit 1203-*j*-*a* is reduced.

The inputs to the distributed inverse element calculation unit 1203-*j*-*a* and to the other members' distributed inverse element calculation units 1203-*p*-*a* will again be denoted A$_j$ and A$_p$ (p=1, 2, . . . , t, p≠j), respectively. If the original secret information reconstructable from these t values A$_p$ (p=1, 2, . . . , t) is denoted A, the distributed inverse element calculation unit 1203-*j*-*a* calculates share C$_j$ of the inverse element of A, i.e., C=A$^{-1}$, in the finite field GF(q), which becomes the share for the member having temporary member ID d$_j$. In the fifth embodiment, the distributed multiplication is performed on the value A$_j$ (j=1, 2, . . . , t) input to the distributed inverse element calculation unit 1203-*j*-*a* by using a random element B$_j$ (j=1, 2, . . . , t) generated by each member, whereby the value U$_j$ (j=1, 2, . . . , t), which is generated by the distributed multiplication of this random element B$_j$, is revealed as a share of the original secret U while the input value A$_j$ is kept secret and then the original secret U is reconstructed. That is, the inverse element U$^{-1}$ of the original secret information U is calculated, and then the shares U$^{-1}{}_j$ of the inverse element U$^{-1}$ are distributed to the other members. Each member obtains the required value C$_j$=A$^{-1}{}_j$ from the received share U$^{-1}{}_j$ and the random element B$_j$ it generated itself.

Structure of the Fifth Embodiment

The structure embodying the secret reconstruction method of the fifth embodiment (secret reconstruction system according to the fifth embodiment) is the same as in the third embodiment except for a difference in the structure of the distributed inverse element calculation unit 1203-*j*-*a* (j=1, 2, . . . , t, a=1, 2, . . . , t). Therefore, only the structure of the distributed inverse element calculation unit 1203-*j*-*a* will be described below.

The structure of the distributed inverse element calculation unit 1203-*j*-*a* (j=1, 2, . . . , t, a=1, 2, . . . , t) according to the fifth embodiment will be described with reference to FIGS. 24A and 24B. FIG. 24A illustrates the structure of the distributed inverse element calculation unit 1203-*j*-*a* (a=1, 2, . . . , t) of a representative member selected from the collected members, where it is assumed that the representative member holds temporary member ID $d_j$. The representative member may be selected in any way; for example, the member holding the smallest (or largest) temporary member ID may be the representative member. FIG. 24B illustrates the structure of the distributed inverse element calculation unit 1203-*i*-*a* (a=1, 2, . . . , t) of each member other than the representative member (the members holding temporary member IDs $d_i$, where i=1, 2, . . . , t and i≠j).

First the distributed inverse element calculation unit 1203-*j*-*a* of the representative member will be described with reference to FIG. 24A. As shown in FIG. 24A, the distributed inverse element calculation unit 1203-*j*-*a* of the representative member comprises: a random number generator 2101-*j*; a distributed multiplication unit 2102-*j*; a distributed multiplication unit 2106-*j*; a linear combination operation unit 2103-*j*; an inverse element operation unit 2104-*j*; and a secret sharing operation unit 2105-*j*. The input $Ad_j$ to the distributed inverse element calculation unit 1203-*j*-*a* is input to the distributed multiplication unit 2102-*j* together with the output from the random number generator 2101-*j*. The output from the distributed multiplication unit 2102-*j* is input to the linear combination operation unit 2103-*j*; the output from the linear combination operation unit 2103-*j* is input to the inverse element operation unit 2104-*j*; and the output from the inverse element operation unit 2104-*j* is input to the secret sharing operation unit 2105-*j*. The output from the secret sharing operation unit 2105-*j* is input to the distributed multiplication unit 2106-*j* together with the output from the random number generator 2101-*j*. The output of the distributed multiplication unit 2106-*j* becomes the output from the distributed inverse element calculation unit 1203-*j*-*a* of the representative member.

The random number generator 2101-*j* generates and outputs a random element from values in a finite field GF(q), and provides both distributed multiplication units 2102-*j* and 2106-*j* with the same random element.

The distributed multiplication unit 2102-*j* receives the input $Ad_j$ to the distributed inverse element calculation unit 1203-*j*-*a* and the output from the random number generator 2101-*j* as its inputs, performs a computation on these inputs using the information received through secure channels 303 similar to the ones in FIG. 3, and then outputs the result to the linear combination operation unit 2103-*j*. The distributed multiplication unit 2102-*j* in the fifth embodiment has the same structure as the distributed multiplication units 1205-*j*-*a*, 1206-*j*-*a* in FIG. 16 or the distributed multiplication units 1205-*j*-*a*, 1206-*j*-*a* in FIG. 20.

The linear combination operation unit 2103-*j* receives the output from the distributed multiplication unit 2102-*j* and the outputs from the other members' distributed multiplication units 2102-*i* (described in FIG. 24B below, where i=1, 2, . . . , t and i≠j) via secure channels 303, performs a linear combination operation, and outputs the result to the inverse element operation unit 2104-*j*. The linear combination operation unit 2103-*j* in the fifth embodiment has a structure similar to the linear combination operation unit 702-*j* in FIG. 9. If the output result from the distributed multiplication unit 2102-*j* is denoted $Ud_j$ and the output results received from the other members' distributed multiplication units 2102-*i* via the secure channels 303 are denoted $Ud_i$ (i=1, 2, . . . , t, i≠j), the linear combination operation unit 2103-*j* performs the calculations in the following equations (49) and (50), which are similar to the above equations (25) and (26), and outputs the result U to the inverse element operation unit 2104-*j*.

$$U = rd_1 U d_1 + rd_2 U d_2 + \ldots + rd_t U d_t \qquad (49)$$

$$= \sum_{p=1}^{t} rd_p U d_p$$

$$rd_p = (d_1 \times d_2 \times \ldots \times d_t / d_p) / \qquad (50)$$
$$((d_1 - d_p) \times (d_2 - d_p) \times \ldots \times (d_{p-1} - d_p) \times$$
$$(d_{p+1} - d_p) \times \ldots \times (d_t - d_p))$$

$$= \prod_{\substack{i=1 \\ i \neq p}}^{t} d_i / (d_i - d_p)$$

The inverse element operation unit 2104-*j* receives the output U from the linear combination operation unit 2103-*j*, calculates its inverse element $U^{-1}$, and outputs the result to the secret sharing operation unit 2105-*j*. The inverse of an element in the finite field GF(q) can be calculated by the following equation (51), in which the (q−2)-th power of the element is calculated.

$$U^{-1} = U^{q-2} \qquad (51)$$

This calculation can also be carried out by using the Euclidean algorithm.

The secret sharing operation unit 2105-*j* receives the output $U^{-1}$ from the inverse element operation unit 2104-*j*, generates shares of the output $U^{-1}$, and distributes the shares to the other members through the secure channels 303. The secret sharing operation unit 2105-*j* in the fifth embodiment has a structure similar to the secret sharing operation unit 1302-*j* in FIG. 16. The secret sharing operation unit 2105-*j* generates polynomials $f_4(x)$ of degree k'−1 as shown in the following equation (52):

$$f_4(x) = U^{-1} + R_{4,1} x + R_{4,2} x^2 + \ldots + R_{4,k'-1} x^{k'-1} \qquad (52)$$

where $R_{4,1}, R_{4,2}, \ldots, R_{4,k'-1}$ are k'−1 random elements selected from the finite field GF(q).

The secret sharing operation unit 2105-*j* calculates the share $U^{-1} d_p$ to be distributed to the member holding temporary member ID $d_p$ (p=1, 2, . . . , t) using the above equation (52) as shown in the following equation (53).

$$U^{-1} d_p = f_4(d_p) \qquad (53)$$
$$= U^{-1} + R_{4,1}(d_p) + R_{4,2}(d_p)^2 + \ldots + R_{4,k'-1}(d_p)^{k'-1}$$

The secret sharing operation unit 2105-*j* outputs the share $U^{-1} d_j$ it generated itself to the distributed multiplication unit 2106-*j* and distributes the other shares $U^{-1} d_p$ (p=1, 2, . . . , t, p≠j) to the other members via the secure channels 303.

The distributed multiplication unit 2106-*j* receives the output from the random number generator 2101-*j* and the output $U^{-1} d_j$ from the secret sharing operation unit 2105-*j* as its inputs, performs a computation on these inputs using the information received through secure channels 303 similar to the ones in FIG. 3, and outputs the result of the computation. The distributed multiplication unit 2106-*j* in the fifth embodiment has a structure similar to the distributed multiplication units 1205-*j*-*a*, 1206-*j*-*a* in FIG. 16 or the distributed multiplication units 1205-*j*-*a*, 1206-*j*-*a* in FIG. 20. As shown in FIG. 24A, the output of the distributed multiplication unit 2106-$j$ becomes the output from the distributed inverse element calculation unit 1203-$j$-$a$.

Next, the structure of the distributed inverse element calculation unit 1203-$i$-$a$ ($a=1, 2, \ldots, t$) operated by each member (having temporary member ID $d_i$, where $i=1, 2, \ldots, t$, $i \neq j$) other than the representative member will be described with reference to FIG. 24B. As shown in FIG. 24B, the distributed inverse element calculation unit 1203-$i$-$a$ of each member other than the representative member comprises: a random number generator 2101-$i$; distributed multiplication units 2102-$i$, 2106-$i$; a revealed transmitter 2107-$i$; and a revealed receiver 2108-$i$. The output from the random number generator 2101-$i$ is input to the distributed multiplication unit 2102-$i$ together with the input $Ad_i$ to the distributed inverse element calculation unit 1203-$i$-$a$ of each member other than the representative member, and is also input to the distributed multiplication unit 2106-$i$. The output from the distributed multiplication unit 2102-$i$ is input to the revealed transmitter 2107-$i$. The output from the revealed receiver 2108-$i$ is input to the distributed multiplication unit 2106-$i$ together with the output from the random number generator 2101-$i$. The output of the distributed multiplication unit 2106-$i$ corresponds to the output from the distributed inverse element calculation unit 1203-$i$-$a$ of each member other than the representative member.

The random number generator 2101-$i$ in FIG. 24B has the same structure and operation as the random number generator 2101-$j$ in FIG. 24A. The distributed multiplication units 2102-$i$, 2106-$i$ in FIG. 24B also have the same structure and operation as the distributed multiplication units 2102-$j$, 2106-$j$ in FIG. 24A.

The revealed transmitter 2107-$i$ receives the output from the distributed multiplication unit 2102-$i$, and transmits it to the representative member over a secure channel 303. If the output from the distributed multiplication unit 2102-$i$ is denoted $Ud_i$, the revealed transmitter 2107-$i$ ($i=1, 2, \ldots, t, i \neq j$) of each member other than the representative member transmits the output $Ud_i$ to the linear combination operation unit 2103-$j$ of the representative member over the secure channel 303, so the linear combination operation unit 2103-$j$ of the representative member receives $t-1$ values $Ud_i$ ($i=1, 2, \ldots, t, i \neq j$) in all.

The revealed receiver 2108-$i$ receives $U^{-1}d_i$ from the secret sharing operation unit 2105-$j$ of the representative member via a secure channel 303, and sends it to the distributed multiplication unit 2106-$i$.

The distributed multiplication unit 2106-$i$ receives the output from the random number generator 2101-$i$ and the output from the revealed receiver 2108-$i$ as its inputs, performs a computation on these inputs using the information received through secure channels 303 similar to the ones in FIG. 3, and outputs the result. The distributed multiplication unit 2106-$i$ in the fifth embodiment has a structure similar to the distributed multiplication units 1205-$j$-$a$, 1206-$j$-$a$ in FIG. 16 or the distributed multiplication units 1205-$j$-$a$, 1206-$j$-$a$ in FIG. 20. As shown in FIG. 24B, the output of the distributed multiplication unit 2106-$i$ becomes the output from the distributed inverse element calculation unit 1203-$i$-$a$ of each member other than the representative member.

As described above, the structure in FIGS. 24A and 24B can reduce the number of the distributed multiplication units in the distributed inverse element calculation unit 1203-$i$-$a$ and simplify the operation.

Operation of the Fifth Embodiment

The operation of the secret reconstruction method according to the fifth embodiment is substantially identical to the operation of the third embodiment described in the flowchart in FIG. 19, but there is a difference in the operation in step S1603 shown in FIG. 19. In the distributed inverse element calculation unit 1203-$i$-$a$ of the third embodiment, the computation in step S1603 is performed with the structure shown in FIG. 18, but in the fifth embodiment, it is performed with the structure shown in FIG. 24A or FIG. 24B.

Effects of the Fifth Embodiment

As described above, according to the fifth embodiment, as in the first to third embodiments, the original secret information S can be reconstructed without revealing the shares held secretly by the collected members to any other member or any third party. Accordingly, the shares held by the members can be reused the next time the secret information is reconstructed. In addition, these effects can be obtained without the need for a central secret reconstruction facility.

Further, according to the fifth embodiment, in addition to obtaining the same effects as in the above third embodiment, the number of distributed multiplication units in the distributed inverse element calculation unit 1203-$j$-$a$ ($j=1, 2, \ldots, t$, $a=1, 2, \ldots, t$) used in the third embodiment can be greatly reduced.

Modifications

Modification of the First Embodiment

In the first embodiment, any two of the collected members have a secure channel over which they can communicate without revealing the content of their communication to any of the other members. Since the summation secret sharing scheme is employed as a secret sharing scheme based on the multiparty protocol, however, even a person who eavesdrops on all channels cannot reconstruct the secret information. Therefore, secure channels are not necessarily required. Insecure channels, at risk to wiretapping and other forms of interception, may therefore also be used.

Modification of the Second Embodiment

In the description of the second embodiment, each of the secret sharing operation unit 701-$j$ in the distributed secret reconstruction operation unit 601-$j$ and secret reconstruction operation unit 602 generates shares and reconstructs secret information by using the ($k'$, $t$) threshold secret sharing scheme, but the summation secret sharing scheme may also be used in place of this scheme. In this case, in the secret reconstruction operation unit 602, the following equation (54) is used in place of the above equations (22) and (4).

$$S = Sm'_1 + Sm'_2 + \ldots + Sm'_t = \sum_{j=1}^{t} Sm'_j \tag{54}$$

In addition, instead of using the above equations (23) and (24) used in the computing operation in the secret sharing operation unit 701-$j$, the shares $Xm'_{j,p}$ are obtained as follows: first, $t-1$ random elements are selected from the finite field and assigned to the shares $Xm'_{j,p}$ (p=1, 2, ..., t−1); then share $Xm'_{j,t}$ is obtained from the following equation (55).

$$Xm'_{j,t} = Xm'_j - (Xm'_{j,1} + Xm'_{j,2} + \ldots + Xm'_{j,t-1}) \tag{55}$$

Modification of the Third Embodiment

Figure 25:
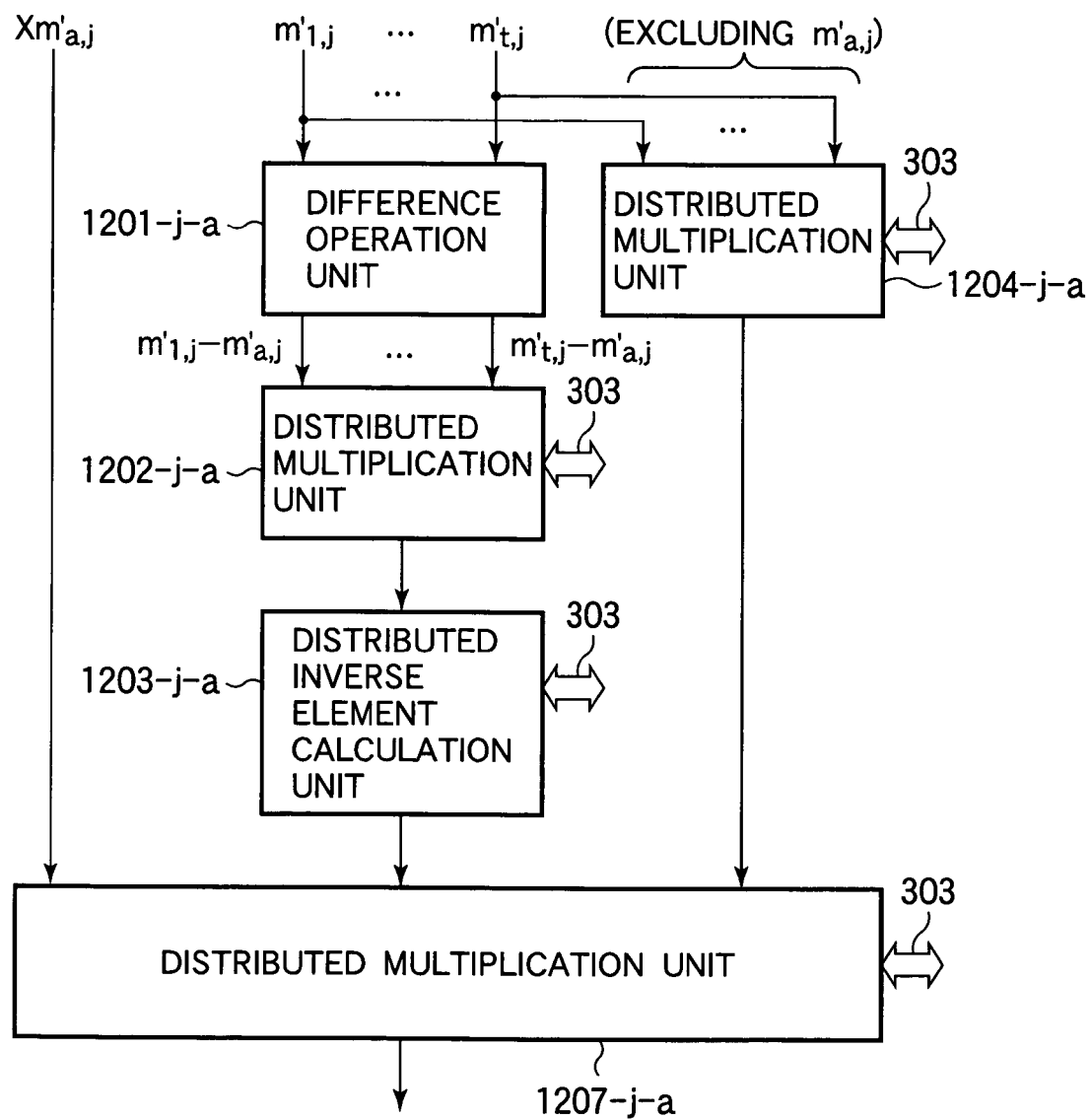
FIG. 25 is a block diagram illustrating the structure of a term calculation unit in a modification of the third embodiment.

In a modification of the third embodiment, the term calculation unit 1101-j-a has the structure shown in FIG. 25 instead of the structure shown in FIG. 15. In FIG. 15, the distributed multiplication units 1205-j-a, 1206-j-a performed a multiplication operation on the input $Xm'_{m,j}$ to the term calculation unit 1101-j-a, the output from the distributed inverse element calculation unit 1203-j-a, and the output from the distributed multiplication unit 1204-j-a in a sharing operation. It is possible, however, to replace the distributed multiplication units 1205-j-a, 1206-j-a in FIG. 15 with one distributed multiplication unit 1207-j-a having three inputs as shown in FIG. 25. This distributed multiplication unit 1207-j-a performs distributed multiplication on the three inputs, and is embodied by the same structure as the distributed multiplication units 1202-j-a and 1204-j-a (by letting t−1=3).

In the third embodiment as shown in FIG. 17, the distributed multiplication units 1202-j-a, 1204-j-a are constructed so as to perform distributed multiplication on the inputs A in order of their subscripts ($A_1, A_2, \ldots, A_{(t-1)}$). It is not necessary, however, for the distributed multiplication to follow this order; the order is permutable.

Modification of the Fourth Embodiment

Figure 26:
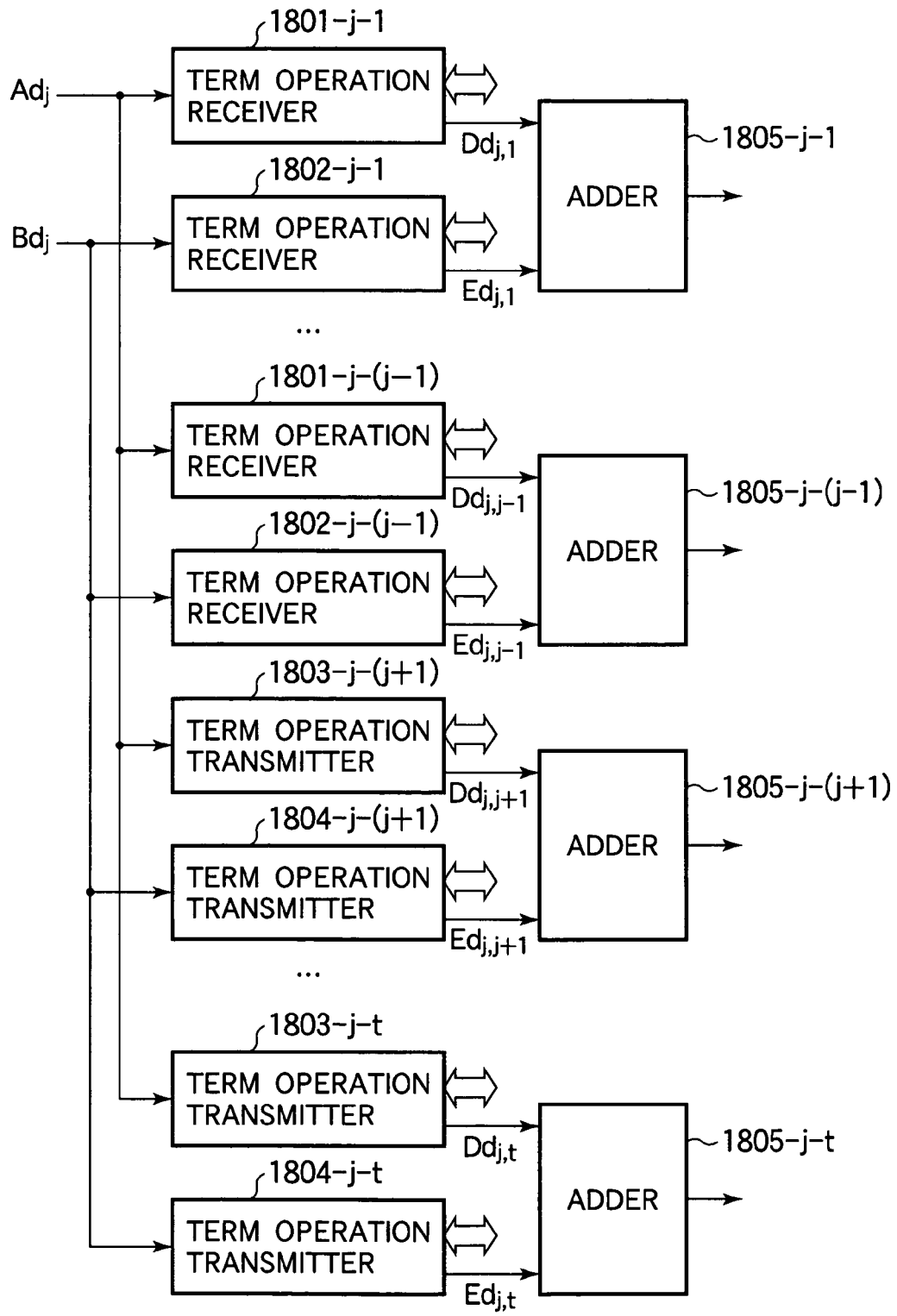
FIG. 26 is a block diagram illustrating the structure of an ij-term calculation unit in a modification of the fourth embodiment.

FIG. 26 is a block diagram illustrating the structure of the ij-term calculation unit 1702-j according to a modification of the fourth embodiment of the invention. In the fourth embodiment, since it is possible to eliminate the restriction given by inequality (29) on the threshold k' of the (k', t) threshold secret sharing scheme used in the secret reconstruction method according to the third embodiment, the summation secret sharing scheme can be used in place of the (k', t) threshold secret sharing scheme. The secret sharing scheme used in the sharing operation can be modified into the summation secret sharing scheme by modifying the computations performed in the secret sharing operation unit 1001-j of the distributed secret reconstruction operation unit 902-j and the secret reconstruction operation unit 903, and modifying both the computational operation and structure of the jj-term calculation unit 1701-j in the distributed multiplication units 1205-j-a, 1206-j-a. Instead of obtaining the shares $Xm'_{j,p}$ from the above equations (29') and (30), the operation of the secret sharing operation unit 1001-j of the distributed secret reconstruction operation unit 902-j is modified as follows: first, t−1 random elements are selected from the finite field and assigned to the shares $Xm'_{j,p}$ (p=1, 2, ..., t−1), and a final share $Xm'_{j,t}$ is obtained from the following equation (56).

$$Xm'_{j,t} = Xm'_j - (Xm'_{j,1} + Xm'_{j,2} + \ldots + Xm'_{j,t-1}) \tag{56}$$

Second, the above equations (27) and (28) used in the computation in the secret reconstruction operation unit 903 are changed to the following equation (57).

$$S = Sd_1 + Sd_2 + \ldots + Sd_t = \sum_{j=1}^{t} Sd_j \tag{57}$$

Third, in the fourth embodiment as shown in FIG. 21, the computation in the ij-term calculation unit 1702-j of the distributed multiplication units 1205-j-a, 1206-j-a is performed so that the two inputs $Ad_j$, $Bd_j$ to the distributed multiplication units 1205-j-a or 1206-j-a are received and multiplied together, and the product is multiplied by the coefficient $rd_j$ calculated by the equation (41). In the modification of the fourth embodiment, however, as shown in FIG. 26, the distributed multiplication units 1205-j-a, 1206-j-a are constructed so as to eliminate the multiplication by the coefficient $rd_j$. That is, in the modification of the fourth embodiment, the coefficient multiplication units 1806-j-i (i=1, 2, ..., j−1, j+1, ..., t) shown in FIG. 21 are removed and $Ad_j \times Bd_j$ is output as the result.

Modification of the Fifth Embodiment

Figure 27A:
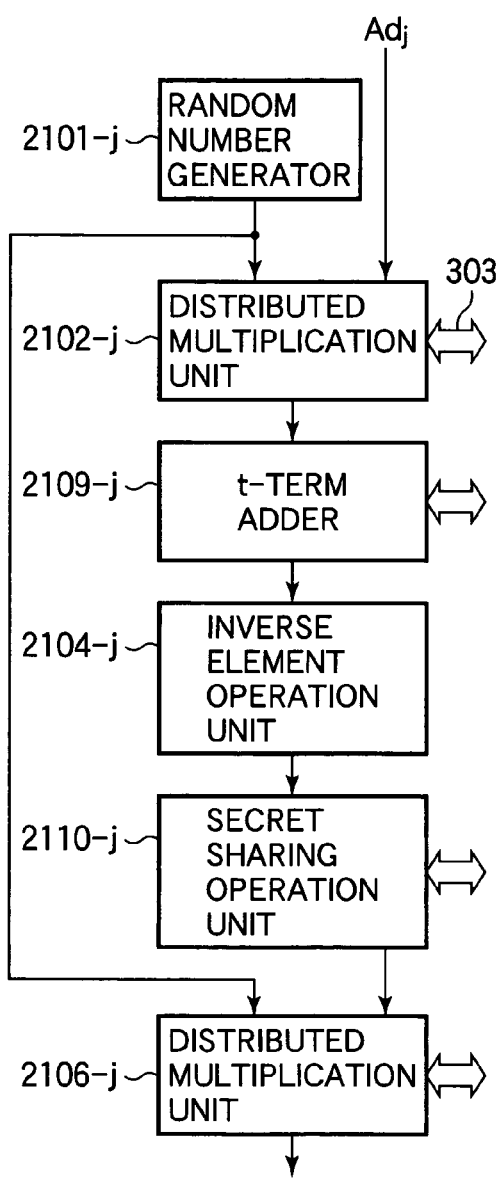
FIGS. 27A and 27B constitute a block diagram illustrating the structure of a distributed inverse element calculation unit in a modification of the fifth embodiment.
Figure 27B:
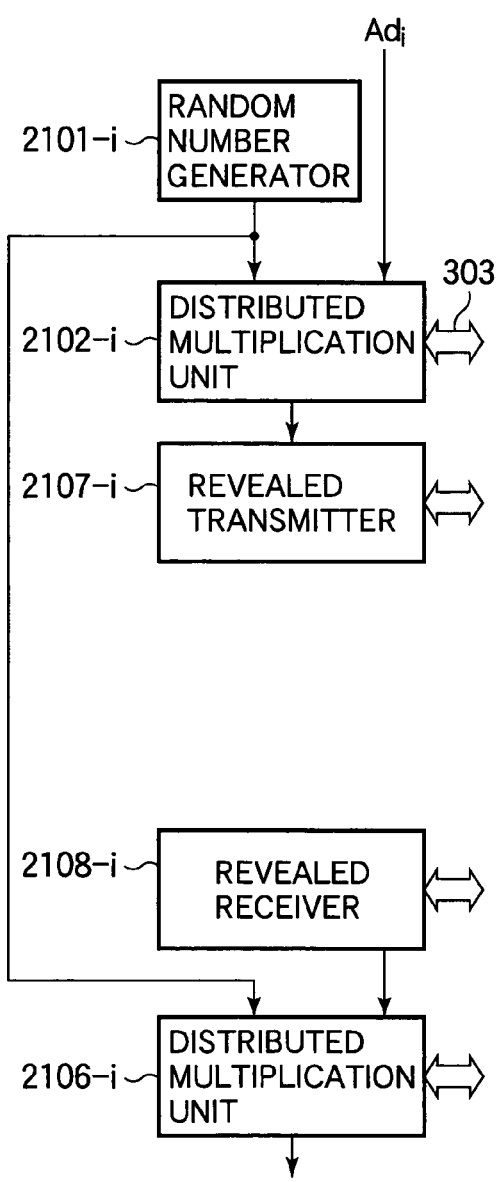

FIGS. 27A and 27B are block diagrams illustrating structures of distributed inverse element calculation units 1203-j-a and 1203-i-a, respectively, according to the modification of the fifth embodiment of the present invention. In the fifth embodiment, the restriction given by inequality (29) on the threshold k' of the (k', t) threshold secret sharing scheme used in the sharing operation in the secret reconstruction method according to the third embodiment is eliminated. Consequently, the summation secret sharing scheme can be used in place of the (k', t) threshold secret sharing scheme. This modification can be made by modifying the structure of the distributed inverse element calculation units 1203-j-a and 1203-i-a shown in FIGS. 24A and 24B to the structure shown in FIGS. 27A and 27B, in addition to the above-described modifications of the fourth embodiment, i.e., the modifications of the computing operations in the secret sharing operation unit 1001-j of the distributed secret reconstruction operation unit 902-j, secret reconstruction operation unit 903, and jj-term calculation unit 1701-j of the distributed multiplication units 1205-j-a, 1206-j-a, and the modification of the structure of the ij-term calculation unit 1702-j. The linear combination operation unit 2103-j is modified to a t-term adder 2109-j, and the computing operation in the secret sharing operation unit 2105-j is also modified. Since the operation in the secret sharing operation unit 2105-j is changed, its reference characters have been changed to 2110-j. The t-term adder 2109-j receives the output from the distributed multiplication unit 2102-j and the outputs from the other members' distributed multiplication units 2102-i (i=1, 2, ..., t, i≠j) via secure channels 303 similar to the ones in FIG. 3, adds all of them, and outputs the result to the inverse element operation unit 2104-j. If the output from the distributed multiplication unit 2102-j is denoted $Ud_j$ and the outputs received from the other members' distributed multiplication units 2102-i via the secure channels 303 are denoted $Ud_i$ (i=1, 2, ..., t, i≠j), whereas the linear combination operation unit 2103-j performed the computing operation using the equations (49) and (50), the t-term adder 2109-j calculates the quantity U in the following equation (58) and outputs U to the inverse element operation unit 2104-j.

$$U = Ud_1 + Ud_2 + \ldots + Ud_t = \sum_{p=1}^{t} Ud_p \tag{58}$$

The secret sharing operation unit 2110-j, the operation of which is modified from that of the secret sharing operation unit 2105-j, receives the output $U^{-1}$ from the inverse element operation unit 2104-j, generates shares from this output $U^{-1}$, and distributes them to the other members through the secure channels 303. Whereas the secret sharing operation unit

2105-$j$ performed the calculation in equations (52) and (53) to obtain the shares $U^{-1}d_p$ (p=1, 2, ..., t), the secret sharing operation unit 2110-$j$ obtains the shares $U^{-1}d_p$ as follows: first, t−1 random elements are selected from the finite field GF(q) and assigned to shares $U^{-1}d_p$ (p=1, 2, ..., t−1); then a final share $U^{-1}d_t$ is obtained from the following equation (59).

$$U^{-1}d_t = U^{-1} - (U^{-1}d_1 + U^{-1}d_2 + \ldots + U^{-1}d_{t-1}) \tag{59}$$

Other Modifications

In the distributed multiplication units 1205-$j$-$a$, 1206-$j$-$a$ of the fourth embodiment and the modification thereof described above, similar effects can also be obtained with a structure in which: (1) the term operation receivers 1801-$j$-$p$ (p=1, 2, ..., j−1) are replaced by term operation transmitters, and the term operation transmitters 1804-$j$-$p$ (p=j+1, j+2, ..., t) by term operation receivers; (2) the term operation receivers 1802-$j$-$p$ (p=1, 2, ..., j−1) are replaced by term operation transmitters, and the term operation transmitters 1803-$j$-$p$ (p=j+1, j+2, ..., t) by term operation receivers; or (3) all of the term operation receivers are replaced by term operation transmitters, and vice versa.

Further, in the distributed multiplication units 1205-$j$-$a$, 1206-$j$-$a$ of the fourth embodiment and its modification described above, the information exchanged between the term operation receivers 1801-$j$-$p$ (or 1802-$j$-$p$) and the term operation transmitters 1804-$p$-$j$ (or 1803-$p$-$j$) via the secure channels 303 is analogous to encrypted information as shown in equations (44) (or (44')) and (46) to (48) (or (46') to (48')), in which information to be transmitted is concealed on the basis of the difficulty of computing discrete logarithms modulo q. Therefore, secret communication is not necessarily required. In the equation (44) (or (44')), the information $Ad_j$ (or $Bd_j$) to be transmitted is concealed as a power of the generator h in the finite field, and necessary information $Ad_j$ (a−1)−$Dd_{j,p}$ (or $Bd_j$ (a−1)−$Ed_{j,p}$) to be obtained from the equations (46) to (48) cannot be obtained without knowing the random element $rB_{p,j}$ (or $rA_{p,j}$) used in equation (44') (or (44)). Accordingly, in the above-described communication, non-secure channels, such as broadcast-type channels or channels at risk of wiretapping, may be used.

In the distributed inverse element calculation unit 1203-$j$-$a$ of the fifth embodiment and its modification described above, the operations in the linear combination operation unit 2103-$j$ (and t-term adder 2109-$j$), inverse element operation unit 2104-$j$, and secret sharing operation unit 2105-$j$ (2110-$j$) in the distributed inverse element calculation unit 1203-$j$-$a$ of the representative member may be performed instead by a central facility that performs the operations of collecting the outputs from the other members' distributed multiplication units 2102-$i$, performing a linear combination operation (summation) on them, obtaining the inverse element of the result, sharing the resulting inverse element, and distributing the generated shares to the other members. In this case, the linear combination operation units 2103-$j$-$a$ of all collected members may have the structure shown in FIG. 24B.

In the distributed inverse element calculation unit 1203-$j$-$a$ of the fifth embodiment and its modification described above, information is exchanged between the representative member's linear combination operation unit 2103-$j$ (and the t-term adder 2109-$j$) and the secure channels 303 (or between the other members' revealed transmitters 2107-$i$ and the secure channels 303) and between the representative member's secret sharing operation unit 2105-$j$ and the secure channels 303 (or between the other members' revealed receivers 2108-$i$ and the secure channels 303), not necessarily by secret communication. Therefore, broadcast-type channels or channels at risk of wiretapping may be also used.

In the above first to fifth embodiments, a 'member' was described as a device with computing and memory facilities, but the secret reconstruction method according to the present invention can also be carried out by a plurality of human members who gather with their shares.

Further, as described in effects of the first to third embodiments, the first to fifth embodiments provide an authentication scheme that can determine whether all members (devices) in a group comprising a plurality of collected members are valid members or not, thereby determining whether they are the members to whom the shares of the secret information S were previously distributed or not. In this case, the original secret information S is used as reference secret information or registered information that is compared with the reconstruction result to decide if the authentication is valid or not, so the original secret information S does not have to be kept secret from the members.

Those skilled in the art will recognize that further variations are possible within the scope of the invention, which is defined in the appended claims.

What is claimed is:

1. A shared secret reconstruction apparatus for reconstructing a secret, used for a case where n first shares are generated from original secret information, n being an integer equal to or greater than two, by using a first threshold secret sharing scheme, in which the original secret information can be reconstructed by a collection of at least any k members from a group having n members ($2 \leq k \leq n$), and the n shares are distributed to the n members, t members collected from the n members separately possessing the shared secret reconstruction apparatus, t being an integer equal to or greater than k, the shared secret reconstruction apparatus thus operating together with t −1 other shared secret reconstruction apparatuses, the shared secret reconstruction apparatus comprising:

a secret sharing operation unit, when t members are collected from the n members, generating second shares from a first share held by the shared secret reconstruction apparatus by using a (t, t) threshold secret sharing scheme, in which original secret information can be reconstructed by a collection of t members from the collected t members, and distributing the second shares to the t shared secret reconstruction apparatuses of the collected t members including itself; and a secret reconstruction operation unit calculating an intermediate result for reconstructing the original secret information in a distributed computation by use of the output from the secret sharing operation unit and the second shares received from the t−1 other shared secret reconstruction apparatuses and transmitting the intermediate result;

wherein the secret sharing operation unit generates third shares from member ID held by the shared secret reconstruction apparatus by using a secret sharing scheme and distributes them to the t−1 other shared secret reconstruction apparatuses, the secret reconstruction operation unit thereby calculating an intermediate result for the secret reconstruction in the distributed computation by use of the second and third shares output from the secret sharing operation unit and received from the t−1 other shared secret reconstruction apparatuses;

wherein the secret reconstruction operation unit comprises:

a term calculation unit performing a distributed multiplication on the result of a distributed computation performed on a coefficient calculated from the third share to the second share and on this second share by use of the second and third shares output from the secret sharing operation unit and received from the t−1 other shared secret reconstruction apparatuses; and an adder summing all the outputs from the term calculation unit; and wherein the term calculation unit comprises:

a difference operation unit calculating differences between the different third shares;

a first multiple term distributed multiplication unit performing a distributed multiplication on the outputs from the difference operation unit;

a distributed inverse element calculation unit performing a distributed computation on the inverse element of the output from the first multiple term distributed multiplication unit;

a second multiple term distributed multiplication unit performing a distributed multiplication on the third shares; and a pair of two term distributed multiplication units performing a distributed multiplication on the output from the distributed inverse element calculation unit, the output from the second multiple term distributed multiplication unit and the corresponding second share.

2. The shared secret reconstruction apparatus of claim 1, further comprising a secret reconstruction unit reconstructing the original secret information from the output from the secret reconstruction operation unit and the outputs received from the t−1 other shared secret reconstruction apparatuses.

3. The shared secret reconstruction apparatus of claim 1, wherein the second secret sharing scheme generates shares in such a way that the original secret information is a sum of all the shares.

4. The shared secret reconstruction apparatus of claim 1, wherein the secret reconstruction operation unit comprises an adder summing the output from the secret sharing operation unit and the second shares received from the t−1 other shared secret reconstruction apparatuses.

5. The shared secret reconstruction apparatus of claim 1, wherein the secret sharing operation unit uses a threshold secret sharing scheme using member IDs.

6. The shared secret reconstruction apparatus of claim 1, wherein the secret reconstruction operation unit comprises a linear combination operation unit performing a linear combination operation on the output from the secret sharing operation unit and the second shares received from the t−1 other shared secret reconstruction apparatuses using coefficients calculated from member IDs, the second shares being received via secure channels.

7. The shared secret reconstruction apparatus of claim 1, wherein the secret sharing operation unit uses a threshold secret sharing scheme using temporary member IDs distributed to the shared secret reconstruction apparatus.

8. The shared secret reconstruction apparatus of claim 1, wherein each of the first and second multiple term distributed multiplication units comprises a number of two term distributed multiplication units each performing a distributed multiplication on two values, the number being one less than the number of values on which the distributed multiplication is performed.

9. The shared secret reconstruction apparatus of claim 8, wherein each of the two term distributed multiplication units comprises:

a multiplication unit multiplying two inputs;

a secret sharing unit generating fourth shares from the output from the multiplication unit by using a threshold secret sharing scheme using temporary member IDs and distributing them to the t−1 other shared secret reconstruction apparatuses via secure channels; and a linear combination operation unit performing a linear combination operation on the output from the secret sharing unit and the fourth shares received from the t−1 other shared secret reconstruction apparatuses, using coefficients calculated from the temporary member IDs via the secure channels.

10. The shared secret reconstruction apparatus of claim 8, wherein each of the two term distributed multiplication units comprises:

a first multiplication units each multiplying two inputs together and then multiplying the product by a coefficient calculated from temporary member IDs;

first communication operation units each multiplying a first input to itself and a second input to a corresponding term distributed multiplication unit in another shared secret reconstruction apparatus by performing an oblivious transfer via secure channels;

second communication operation units each multiplying a second input to itself and a first input to a corresponding term distributed multiplication unit in another shared secret reconstruction apparatus by performing an oblivious transfer via secure channels;

first adders each summing the outputs from the first and second communication operation units;

second multiplication units each multiplying the output from one of the first adders by a coefficient calculated from temporary member IDs; and a second adder summing all the results of the first and second multiplication units.

11. The shared secret reconstruction apparatus of claim 8, wherein each of the two term distributed multiplication unit comprises:

a first multiplication unit multiplying first and second inputs to itself;

first communication operation units each multiplying the first input to itself and a second input to a corresponding term distributed multiplication unit in another shared secret reconstruction apparatuses by performing an oblivious transfer via secure channels;

second communication operation units each multiplying the second input to itself and a first input to a corresponding term distributed multiplication unit in another shared secret reconstruction apparatus by performing an oblivious transfer via the secure channels;

first adders each summing the outputs from the first and second communication operation units; and a second adder summing all the results of the first multiplication unit and the first adders.

12. The shared secret reconstruction apparatus of claim 1, wherein the distributed inverse element calculation unit comprises:

a number of distributed multiplication units performing a distributed multiplication on two values, the number being calculated from a size of a finite field used in the distributed multiplication; and a multiple term distributed multiplication unit performing distributed multiplication on a number of values calculated from the size of the finite field used in the distributed multiplication, the multiple term distributed multiplication unit including a number of two term distributed multiplication unit performing a distributed multiplication on two values, the number of the two term distributed multiplication unit being one less than the number of values on which the distributed multiplication is performed.

13. The shared secret reconstruction apparatus of claim 1, wherein the distributed inverse element calculation unit comprises:
- a random number generation unit generating a random number;
- a first two term distributed multiplication unit performing a distributed multiplication on a first value and the output from the random number generation unit;
- a linear combination operation unit performing a linear combination operation on the output from the first two term distributed multiplication unit and output received from the corresponding two term distributed multiplication unit in the t−1 other shared secret reconstruction apparatuses, using coefficients calculated from temporary member IDs, the output being received via a secure channel;
- an inverse element operation unit calculating the inverse element of the output from the linear combination operation unit in finite field;
- a secret sharing unit generating fifth shares from the output from the inverse element operation unit and distributing them to the t−1 other shared secret reconstruction apparatuses via secure channels; and
- a second two term distributed multiplication unit receiving the fifth share from the secret sharing unit and the output from the random number generation unit as inputs and having the same structure as the first two term distributed multiplication unit.

14. The shared secret reconstruction apparatus of claim 1, wherein the distributed inverse element calculation unit comprises:
- a random number generation unit generating a random number;
- a first two term distributed multiplication unit performing a distributed multiplication on a first value and the output from the random number generation unit;
- an adder summing the output from the first two term distributed multiplication unit and the outputs received from the corresponding first two term distributed multiplication unit in the t−1 other shared secret reconstruction apparatuses, the outputs being received via secure channels;
- an inverse element operation unit calculating the inverse element of the output from the adder in finite field;
- a secret sharing unit generating fifth shares from the output from the inverse element operation unit and distributing them to the t−1 other shared secret reconstruction apparatuses via secure channels; and
- a second two term distributed multiplication unit receiving the fifth share from the secret sharing unit and the output from the random number generation unit as inputs and having the same structure as the first two term distributed multiplication unit.

15. The shared secret reconstruction apparatus of claim 1, wherein the distributed inverse element calculation unit comprises:
- a random number generation unit generating a random number;
- a first two term distributed multiplication unit performing a distributed multiplication on a first value and the output from the random number generation unit;
- a transmission unit transmitting the result of the first two term distributed multiplication unit to a shared secret reconstruction apparatus;
- a receiving unit for receiving the fifth share from the shared secret reconstruction apparatus; and
- a second two term distributed multiplication unit performing a distributed multiplication on the received fifth share and the output from the random number generation unit.

16. A secret reconstruction system for carrying out a secret reconstruction method for reconstructing a secret in a secret sharing scheme that generates n first shares from the secret information, n being an integer equal to or greater than two, the n shares being distributed to a group having n members in such a way that the original secret information can be reconstructed by a collection of any t members (2≦t≦n), the secret reconstruction system comprising: a plurality of shared secret reconstruction apparatuses, wherein each shared secret reconstruction apparatus for reconstructing a secret, used for a case where n first shares are generated from original secret information, n being an integer equal to or greater than two, by using a first threshold secret sharing scheme, in which the original secret information can be reconstructed by a collection of at least any k members from a group having n members (2≦k≦n), and the n shares are distributed to the n members, t members collected from the n members separately possessing the shared secret reconstruction apparatus, t being an integer equal to or greater than k, the shared secret reconstruction apparatus thus operating together with t−1 other shared secret reconstruction apparatuses, the shared secret reconstruction apparatus comprising:
- a secret sharing operation unit, when t members are collected from the n members, generating second shares from a first share held by the shared secret reconstruction apparatus by using a (t, t) threshold secret sharing scheme, in which original secret information can be reconstructed by a collection of t members from the collected t members, and distributing the second shares to the t shared secret reconstruction apparatuses of the collected t members including itself; and a secret reconstruction operation unit calculating an intermediate result for reconstructing the original secret information in a distributed computation by use of the output from the secret sharing operation unit and the second shares received from the t−1 other shared secret reconstruction apparatuses and transmitting the intermediate result; wherein the secret sharing operation unit generates third shares from member ID held by the shared secret reconstruction apparatus by using a secret sharing scheme and distributes them to the t−1 other shared secret reconstruction apparatuses, the secret reconstruction operation unit thereby calculating an intermediate result for the secret reconstruction in the distributed computation by use of the second and third shares output from the secret sharing operation unit and received from the t−1 other shared secret reconstruction apparatuses;
- wherein the secret reconstruction operation unit comprises: a term calculation unit performing a distributed multiplication on the result of a distributed computation performed on a coefficient calculated from the third share to the second share and on this second share by use of the second and third shares output from the secret sharing operation unit and received from the t−1 other shared secret reconstruction apparatuses; and
- an adder summing all the outputs from the term calculation unit; and wherein the term calculation unit comprises: a difference operation unit calculating differences between the different third shares;
- a first multiple term distributed multiplication unit performing a distributed multiplication on the outputs from the difference operation unit;

a distributed inverse element calculation unit performing a distributed computation on the inverse element of the output from the first multiple term distributed multiplication unit; a second multiple term distributed multiplication unit performing a distributed multiplication on the third shares; and a pair of two term distributed multiplication units performing a distributed multiplication on the output from the distributed inverse element calculation unit, the output from the second multiple term distributed multiplication unit and the corresponding second share; and a secret reconstruction apparatus reconstructing the original secret information from the outputs of the plurality of shared secret reconstruction apparatuses.

17. The secret reconstruction system of claim 16, wherein the secret reconstruction apparatus is included in one of the plurality of shared secret reconstruction apparatuses.

18. The secret reconstruction system of claim 16, wherein the secret reconstruction apparatus reconstructs the original secret information by summing the outputs of all of the plurality of shared secret reconstruction apparatuses.

19. The secret reconstruction system of claim 16, wherein the secret reconstruction apparatus reconstructs the original secret information by using a reconstruction method of a threshold secret sharing scheme using temporary member IDs.

20. The secret reconstruction system of claim 16, further comprising a temporary member ID generation unit generating mutually distinct temporary member IDs to the shared secret reconstruction apparatuses operated by the collected members, and distributing and revealing them to the shared secret reconstruction apparatuses.

21. The secret reconstruction system of claim 20, wherein the first shares are generated in such a way that the original secret information is a sum of all the first shares.

22. The secret reconstruction system of claim 20, wherein the first shares are generated by using a threshold secret sharing scheme using member IDs.

* * * * *